US007303641B2

(12) United States Patent
Swiszcz et al.

(10) Patent No.: US 7,303,641 B2
(45) Date of Patent: Dec. 4, 2007

(54) METHOD FOR FABRICATING CELLULAR STRUCTURAL PANELS

(75) Inventors: Paul G. Swiszcz, Boulder, CO (US); Ko Kuperus, Boulder, CO (US); Tim Jeske, Centennial, CO (US); Eugene Ballard, Arvada, CO (US); Stephen Cook, Brighton, CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 381 days.

(21) Appl. No.: 10/309,944

(22) Filed: Dec. 3, 2002

(65) Prior Publication Data

US 2004/0103980 A1 Jun. 3, 2004

(51) Int. Cl.
*B32B 37/22* (2006.01)

(52) U.S. Cl. ........................ 156/201; 156/65; 156/204; 156/227; 156/301; 156/302; 29/24.5; 160/84.05; 160/130; 160/166.1; 52/793.1

(58) Field of Classification Search .................. 156/65, 156/197, 199, 200, 201, 203, 204, 227, 322, 156/301, 302, 303; 428/77, 116, 188, 190; 29/24.5; 160/84.05, 130, 136, 166.1
See application file for complete search history.

(56) References Cited

U.S. PATENT DOCUMENTS 1,651,539 A 12/1927 Olson (Continued)

FOREIGN PATENT DOCUMENTS

AU 80566 82 A 8/1982

(Continued)

OTHER PUBLICATIONS

Gubenko, A.B., "Building Structures Wherein Plastics Are Used", Building Structures With the Use of Plastic Materials, Moscow, Publishing House for Literature on the Civil Engineering, pp. 35, 38, 39, and 46, (1970).

*Primary Examiner*—Jessica Ward
(74) *Attorney, Agent, or Firm*—Dorsey & Whitney LLP

(57) ABSTRACT

An apparatus for manufacturing cellular laminate structural panels includes one or more supply stations of a flexible strip material including folding rollers for sequentially folding the strip material into cellular structures and feeding the cellular structures into a conveyor where the cellular structures are held in compression. The apparatus further includes a laminating station where the folded cellular structures are laminated to an upper and/or lower sheet material to which lines of a bonding medium have been applied prior to engagement with the cellular structures. The folded cellular structures are heated before engaging the sheet material so as to enhance the bonding of the sheet material to the cellular structures and subsequent to bonding, the laminate is passed through a cooling station to set the bonding medium. Downstream from the laminating station, the laminate passes through a side edge folding station where edges of the sheet material are folded over side edges of the laminate to finish the side edges of the laminate and subsequently the laminate is passed into a cutter for cutting the continuous laminate into predetermined lengths. Ends of the cut panels then receive rigid edge strips to fully finish the panel. The method of the invention includes the steps performed by the components of the apparatus.

6 Claims, 56 Drawing Sheets

U.S. PATENT DOCUMENTS

| | | | | |
|---|---|---|---|---|
| 2,101,836 | A | 12/1937 | Benedict | |
| 2,220,596 | A | 11/1940 | Bernhardt | 428/186 |
| 2,333,343 | A | 11/1943 | Sendzimir | 228/118 |
| 2,419,971 | A | 5/1947 | Rumpf et al. | 428/188 |
| 2,779,851 | A | 1/1957 | Vogt | |
| 2,786,004 | A | 3/1957 | Schwartz et al. | |
| 2,879,554 | A | 3/1959 | Wheeler | |
| 3,024,879 | A | 3/1962 | Kandra | |
| 3,112,533 | A | 12/1963 | Hauer | 52/674 |
| 3,314,846 | A | 4/1967 | Niwa | 428/12 |
| 3,381,438 | A | 5/1968 | Bohnsack | |
| 3,384,519 | A * | 5/1968 | Froget | 156/65 |
| 3,390,034 | A | 6/1968 | Hull | |
| 3,413,765 | A | 12/1968 | Williams | 52/99 |
| 3,432,379 | A | 3/1969 | Anderson | 428/116 |
| 3,461,632 | A | 8/1969 | Kuhne | |
| 3,528,875 | A | 9/1970 | MacDonald et al. | |
| 3,542,636 | A | 11/1970 | Wandel | 428/178 |
| 3,669,820 | A | 6/1972 | Fredericks | |
| 3,689,345 | A | 9/1972 | Figge | 156/219 |
| 3,738,083 | A | 6/1973 | Shimano | |
| 3,741,859 | A | 6/1973 | Wandel | 428/114 |
| 3,749,636 | A | 7/1973 | Tranquillitsky | 428/51 |
| 3,762,977 | A | 10/1973 | Langfeldt | |
| 3,789,567 | A | 2/1974 | Rae et al. | |
| 3,819,465 | A | 6/1974 | Parsons et al. | |
| 3,819,466 | A | 6/1974 | Winfield et al. | |
| 3,892,898 | A | 7/1975 | Yasui | 428/116 |
| 3,974,607 | A | 8/1976 | Balinski | |
| 4,020,205 | A | 4/1977 | Haselbauer | 428/116 |
| 4,034,135 | A | 7/1977 | Passmore | 428/184 |
| 4,086,739 | A | 5/1978 | Hall | |
| 4,103,467 | A | 8/1978 | Lindal | 52/404.1 |
| 4,137,111 | A * | 1/1979 | Hansen | 156/65 |
| 4,197,151 | A | 4/1980 | Muzik | |
| 4,221,373 | A | 9/1980 | Hans | 493/423 |
| 4,223,053 | A | 9/1980 | Brogan | 428/34.5 |
| 4,237,663 | A | 12/1980 | Storer | |
| 4,315,962 | A | 2/1982 | Skoien | 428/12 |
| 4,353,947 | A | 10/1982 | Northcutt | |
| 4,384,178 | A | 5/1983 | Nagai et al. | |
| 4,412,687 | A | 11/1983 | Andre | |
| 4,438,613 | A | 3/1984 | Hintsa et al. | |
| 4,530,197 | A | 7/1985 | Rainville | |
| 4,546,584 | A | 10/1985 | Mieyal et al. | |
| 4,595,187 | A | 6/1986 | Bober | 270/37 |
| 4,672,780 | A | 6/1987 | Lockwood | 52/82 |
| 4,709,435 | A | 12/1987 | Stemier et al. | 14/73 |
| 4,738,083 | A | 4/1988 | Kawai et al. | |
| 4,838,380 | A | 6/1989 | Lassiter | |
| 4,840,828 | A | 6/1989 | Bottger et al. | 428/120 |
| 4,852,316 | A | 8/1989 | Webb | |
| 4,909,003 | A | 3/1990 | Hennigan | |
| 4,916,027 | A | 4/1990 | DelMundo | |
| 4,921,744 | A | 5/1990 | Mitsui et al. | |
| 4,991,373 | A | 2/1991 | Shaub | |
| 5,024,131 | A | 6/1991 | Weidman | |
| 5,028,474 | A | 7/1991 | Czaplicki | 428/178 |
| 5,128,195 | A | 7/1992 | Hegedus | 428/174 |
| 5,147,710 | A | 9/1992 | Bopp et al. | |
| 5,182,158 | A | 1/1993 | Schaeffer | 428/178 |
| 5,228,936 | A * | 7/1993 | Goodhue | 156/260 |
| 5,240,533 | A | 8/1993 | Bottger et al. | 156/148 |
| 5,256,467 | A | 10/1993 | Kato | 428/182 |
| 5,270,092 | A | 12/1993 | Griffith et al. | |
| 5,270,095 | A | 12/1993 | Ito et al. | 428/116 |
| 5,366,787 | A | 11/1994 | Yasui et al. | |
| 5,413,658 | A * | 5/1995 | Ruggles et al. | 156/204 |
| 5,424,113 | A | 6/1995 | Ray et al. | 428/178 |
| 5,433,053 | A | 7/1995 | Tulloch | |
| 5,452,830 | A | 9/1995 | Hopkins et al. | |
| 5,459,291 | A | 10/1995 | Haines et al. | |
| 5,482,750 | A | 1/1996 | Colson et al. | |
| 5,485,704 | A | 1/1996 | Sandor, Sr. | |
| 5,543,204 | A | 8/1996 | Ray | 428/179 |
| 5,567,504 | A | 10/1996 | Schakel et al. | |
| 5,670,220 | A | 9/1997 | Skoien | |
| 5,685,124 | A | 11/1997 | Jandl, Jr. | |
| 5,715,644 | A | 2/1998 | Yasui | |
| 5,768,851 | A | 6/1998 | Nagaoka | |
| 5,791,118 | A | 8/1998 | Jordan | 52/783.11 |
| 5,792,539 | A | 8/1998 | Hunter | |
| 5,824,973 | A | 10/1998 | Haines et al. | |
| 5,830,548 | A | 11/1998 | Andersen et al. | |
| 5,832,685 | A | 11/1998 | Hermanson | |
| 5,833,332 | A | 11/1998 | Marshall et al. | |
| 5,840,413 | A | 11/1998 | Kajander | 428/292.1 |
| 5,846,038 | A | 12/1998 | Bostelman | |
| 5,875,609 | A | 3/1999 | Quinif | 52/784.14 |
| 5,876,835 | A | 3/1999 | Noble et al. | 428/156 |
| 5,942,080 | A * | 8/1999 | Mortellite et al. | 156/461 |
| 5,942,288 | A | 8/1999 | Kajander | 427/389.7 |
| 5,972,434 | A | 10/1999 | Kajander | 427/389.8 |
| 5,992,127 | A | 11/1999 | Quinif | |
| 6,052,966 | A | 4/2000 | Colson et al. | |
| 6,067,764 | A | 5/2000 | Johansen | 52/302.1 |
| 6,079,172 | A | 6/2000 | Chenel | 52/239 |
| 6,080,495 | A | 6/2000 | Wright | 428/623 |
| 6,103,336 | A | 8/2000 | Swiszcz | 428/116 |
| 6,158,179 | A | 12/2000 | Ackerly et al. | |
| 6,171,654 | B1 | 1/2001 | Salsman et al. | |
| 6,199,337 | B1 | 3/2001 | Colson et al. | |
| 6,209,273 | B1 | 4/2001 | Jeffers et al. | 52/220.7 |
| 6,296,469 | B1 | 10/2001 | Suzuki | |
| 6,345,486 | B1 | 2/2002 | Colson et al. | 52/793.1 |
| 6,416,842 | B1 | 7/2002 | Swiszcz et al. | |
| 6,443,257 | B1 | 9/2002 | Wiker et al. | |
| 6,461,464 | B1 | 10/2002 | Swiszcz | 156/221 |
| 6,511,730 | B1 | 1/2003 | Blair et al. | |
| 6,550,622 | B2 | 4/2003 | Koslow | |
| 6,656,858 | B1 | 12/2003 | Cahill | |
| 6,662,503 | B2 | 12/2003 | Cowell et al. | |
| 6,673,057 | B1 | 1/2004 | Ehrnsperger et al. | |
| 6,673,136 | B2 | 1/2004 | Gillingham et al. | |
| 6,712,747 | B1 | 3/2004 | Ballard | |
| 6,740,279 | B2 | 5/2004 | West et al. | |
| 6,797,167 | B2 | 9/2004 | Koslow | |
| 6,870,092 | B2 | 3/2005 | Lambert et al. | |
| 6,878,433 | B2 | 4/2005 | Curro et al. | |
| 6,946,528 | B2 | 9/2005 | Domine et al. | |
| 6,982,020 | B2 | 1/2006 | Swiszcz et al. | |
| 7,047,705 | B2 | 5/2006 | Foster | |
| 7,051,489 | B1 | 5/2006 | Swiszcz et al. | |
| 7,146,779 | B2 * | 12/2006 | Swiszcz et al. | 53/438 |
| 7,194,846 | B2 * | 3/2007 | Swiszcz et al. | 52/793.11 |
| 7,207,151 | B2 * | 4/2007 | Swiszcz et al. | 52/793.11 |
| 2002/0020142 | A1 * | 2/2002 | Swiszcz et al. | 52/783.1 |
| 2002/0053176 | A1 * | 5/2002 | Colson et al. | 52/506.06 |
| 2003/0154679 | A1 * | 8/2003 | Swiszcz et al. | 52/506.07 |
| 2005/0095936 | A1 | 5/2005 | Jones et al. | |
| 2006/0112655 | A1 | 6/2006 | Swiszcz et al. | |
| 2006/0254178 | A1 * | 11/2006 | Swiszcz et al. | 52/506.06 |
| 2006/0254179 | A1 * | 11/2006 | Swiszcz et al. | 52/506.06 |
| 2006/0254204 | A1 * | 11/2006 | Swiszcz et al. | 52/793.1 |
| 2006/0254205 | A1 * | 11/2006 | Swiszcz et al. | 52/793.1 |
| 2006/0254206 | A1 * | 11/2006 | Swiszcz et al. | 52/793.1 |
| 2006/0260269 | A1 * | 11/2006 | Swiszcz et al. | 52/783.1 |
| 2006/0260270 | A1 * | 11/2006 | Swiszcz et al. | 52/783.1 |

FOREIGN PATENT DOCUMENTS

| | | |
|---|---|---|
| AU | A 80 566/82 | 8/1982 |
| CA | 595285 | 3/1958 |
| CA | 920763 | 2/1973 |

| | | | |
|---|---|---|---|
| CH | 362824 | | 8/1962 |
| CH | 383429 | | 1/1965 |
| CH | 466538 | | 1/1969 |
| DE | 221 364 | C | 4/1910 |
| DE | 525 253 | | 5/1931 |
| DE | 684202 | | 11/1939 |
| DE | 1 123 100 | | 2/1962 |
| DE | 1 941 054 | | 6/1966 |
| DE | 1 609 661 | | 5/1970 |
| DE | 2 243 528 | | 3/1974 |
| DE | 23 53 927 | | 5/1975 |
| DE | 28 07 503 | A1 | 8/1978 |
| DE | 92 05 226.6 | | 9/1993 |
| DE | 196 01 172 | A1 | 1/1997 |
| DE | 197 36 839 | | 2/1999 |
| EP | 0 211 172 | A2 | 2/1987 |
| EP | 0 265 562 | | 5/1988 |
| EP | 0 335 321 | | 10/1989 |
| EP | 0 418 968 | | 3/1991 |
| EP | 0 459 938 | | 12/1991 |
| EP | 0 465 712 | | 1/1992 |
| EP | 0 602 334 | A1 | 6/1994 |
| EP | 0 512 431 | | 12/1996 |
| EP | 0 551 415 | | 1/1997 |
| EP | 0 786 331 | | 7/1997 |
| FI | 23939 | | 5/1950 |
| FR | 874 638 | | 8/1942 |
| FR | 1 116 248 | | 5/1956 |
| FR | 1 294 807 | | 4/1962 |
| FR | 2 164 463 | | 8/1973 |
| FR | 2 509 223 | | 1/1983 |
| FR | 2 626 599 | | 8/1989 |
| FR | 2 630 478 | | 10/1989 |
| FR | 2 727 711 | | 6/1996 |
| GB | 1 198 732 | A | 7/1970 |
| GB | 1 318 693 | | 5/1973 |
| GB | 1 384 577 | | 2/1975 |
| GB | 1481980 | | 8/1977 |
| GB | 2050547 | | 1/1981 |
| NL | 272341 | | 8/1964 |
| NL | 7007693 | | 12/1970 |
| NL | 7315664 | | 5/1974 |
| NL | 7402604 | | 8/1974 |
| RU | 1822898 | | 6/1993 |
| SU | 102898 | | 3/1953 |
| WO | WO89/00897 | | 2/1989 |
| WO | WO90/12934 | | 11/1990 |
| WO | WO91/19866 | | 12/1991 |
| WO | WO97/11825 | | 4/1997 |
| WO | WO98/52744 | | 11/1998 |
| WO | WO 01/12911 | A2 | 2/2001 |

* cited by examiner

METHOD FOR FABRICATING CELLULAR STRUCTURAL PANELS

CROSS REFERENCE TO RELATED APPLICATIONS

This application relates to co-pending application Ser. No. 10/309,939 filed on the same date as this application and entitled Compressible Structural Panel, which is hereby incorporated by reference as if fully disclosed herein.

BACKGROUND OF THE INVENTION

1. Field of the Invention

An apparatus for fabricating a cellular structural panel includes a plurality of supply stations for rolls of strip material and a folding station associated with each supply station for progressively folding each strip of material into a compressible cellular structure, a laminating station that includes a pair of supply rolls of sheet material positioned adjacent opposite sides of the cellular structures, a bonding material applicator station for applying beads of a bonding medium to the sheet material prior to engaging the sheet material with the cellular structures, heating stations disposed adjacent both sides of the cellular structures for preheating the cellular structures before their engagement with the sheet material in the laminating station, side forming station for folding one of the said sheet materials around lateral sides of said panels, a cutter station for cutting the formed cellular laminate into panels of predetermined lengths, and an edge strip applicator station for connecting rigid side edging to opposite ends of panels. The method of the present invention comprises the steps followed in the use of the apparatus.

2. Description of the Relevant Art

Structural panels used in the finish or decoration of building structures have taken numerous forms from drywall to decorative or acoustical ceiling panels. All such panels, obviously, have different physical, acoustical and aesthetic characteristics. The panels, however, have had numerous shortcomings, such as from a weight standpoint, a shipping standpoint, a lack of aesthetic or acoustical variety, and the like.

A panel overcoming the shortcomings of most prior art structural panels used in the finish or decoration of building structures is described in co-pending application Ser. No. 09/719,899 entitled Ceiling System with Replacement Panels. The panel described in that application is of cellular construction. Apparatus for manufacturing prior art structural panels of the drywall or acoustical panel type do not deal with cellular structures and, accordingly, are quite distinct from apparatus that would be used to fabricate a cellular panel.

The panel described in the aforenoted application includes a plurality of cellular structures that are bonded on at least one side to a sheet of material and on the other side to a connector which may be in the form of another sheet of material, elongated fibers or the like. To applicant's knowledge, apparatus for fabricating panels of that type are not known in the art even though apparatus has been developed for manufacturing corrugated or cellular structures where the cells are formed integrally in a single piece of material and may or may not thereafter be secured to other sheets of material.

Furthermore, in most structures utilizing corrugated sheets to form cells between other sheets of material, the structure is designed to be rigid and incompressible. Such structures may be found in use for dunnage or the like. The panel described in the aforenoted application is compressible for at least some period of time and accordingly a method and apparatus for fabricating the panel out of specified materials needs to be unique in design so as to accommodate a desired folding of the strips of material into cellular structures and for heat treating those folded cellular structures for desired bonding to sheets or strands of material that interconnect the individual cellular structures. Furthermore, in manufacturing a panel of the aforenoted type, the folded cellular structures must be maintained in a folded condition prior to being bonded to the sheets or strands of material even though the material from which the cellular structures are made is biased toward an unfolded or flat condition.

It was in an effort to design a machine for making a uniquely designed panel of the type disclosed in the aforenoted application that the present invention has been made.

SUMMARY OF THE INVENTION

The apparatus of the present invention is an in-line continuously operable apparatus having at its upstream end one or more strip material supply stations at which roles of flexible material are stored. The strip material is pulled through the apparatus by drive rollers downstream from the strip supply stations. As the strips of material are fed from a supply roll in the downstream direction, they are passed through a folding station of the machine where a plurality of rollers fold the material into compressible cellular structures. After being folded in the folding station, the strips of material are passed in side-by-side relationship with other folded cellular structures along a plurality of idler rollers that hold the strips in the folded cellular structure condition until they reach a laminating station.

Prior to reaching the laminating station, the cellular structures are preheated to condition them for bonding or otherwise securing them to one or more sheets of material that receive beads of a bonding medium prior to being moved into engagement with the preheated cellular structures. The sheet material is engaged with one or both sides of the cellular structures at the laminating station so that the cellular structures are bonded to the sheet material in parallel side-by-side relationship. The cellular structures are maintained in an at least partially compressed condition even after having been laminated to the sheet material and the laminated structure is thereafter fed into a side edge forming station where a sheet of material in the laminate is folded over the side edges of the laminate to finish the side edges. Thereafter, the laminate structure is passed to a cutting station where the laminate is cut into panels of predetermined length. Finally, the cut panels are fed to an edge strip applicator station where edge strips are attached to the ends of the panels.

The method of the present invention comprises the steps of providing a plurality of strips of flexible material positioned in parallel relationship for downstream movement along a path of travel, providing at least one supply of sheet material adjacent to said path of travel, advancing the plurality of strips of material in a downstream direction, providing a plurality of folding rollers for engagement with each strip of material with the rollers progressively folding the strips into side-by-side expandable cellular structures, applying beads of a bonding material to the sheet material and feeding the sheet material into engagement with the side-by-side cellular structures so as to secure the sheet material to the cellular structure to form a laminate, folding the sheet material over lateral sides of the panel to finish the sides, cutting the laminate into panels of predetermined length, and securing edge strips to the opposite ends of the panels.

Other aspects, features and details of the present invention can be more completely understood by reference to the following detailed description of a preferred embodiment taken in conjunction with the drawings and the appended claims.

DESCRIPTION OF THE PREFERRED EMBODIMENT

Figure 1A:
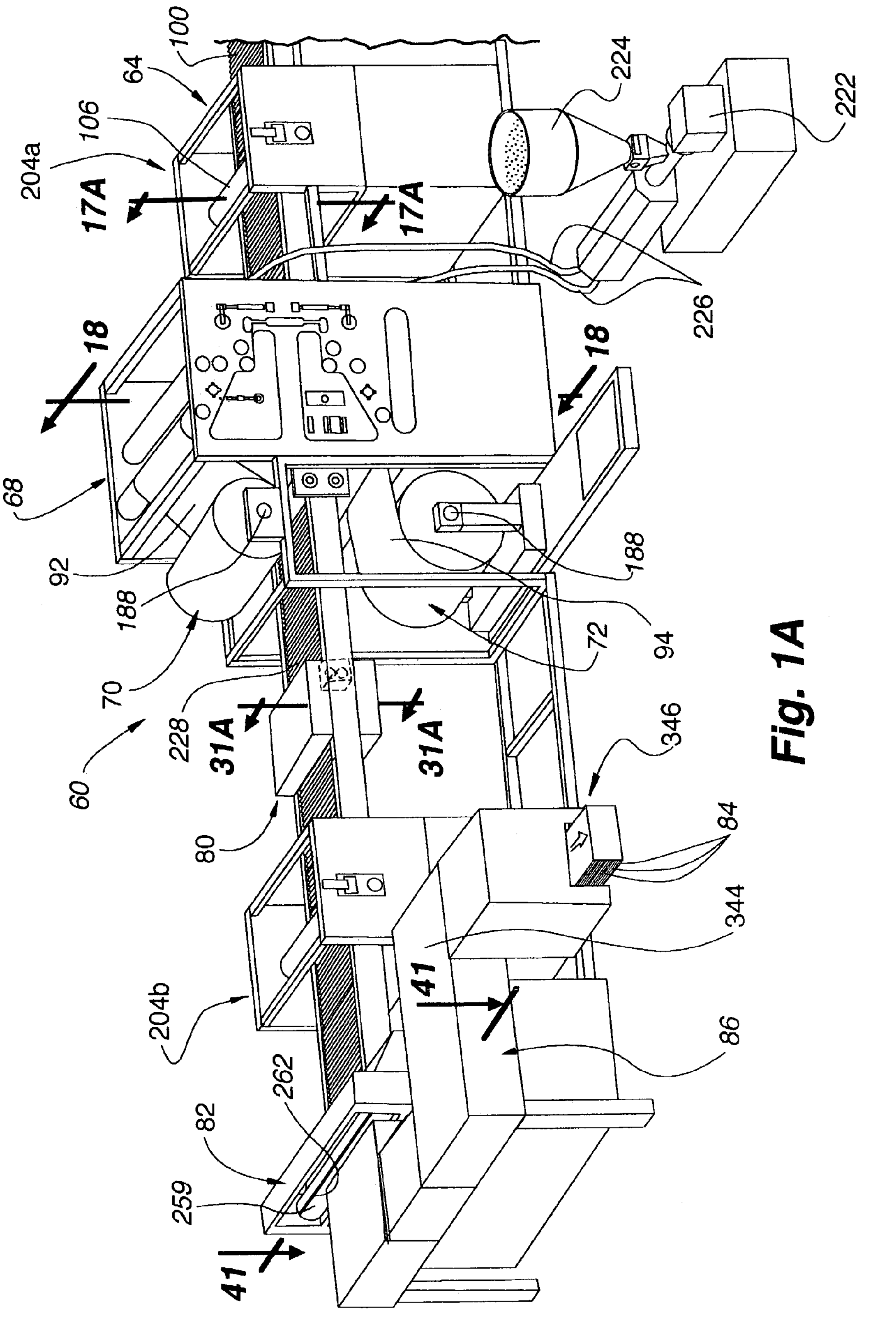
In FIG. 1A is an isometric view looking at the downstream end of the apparatus of the present invention.
Figure 1B:
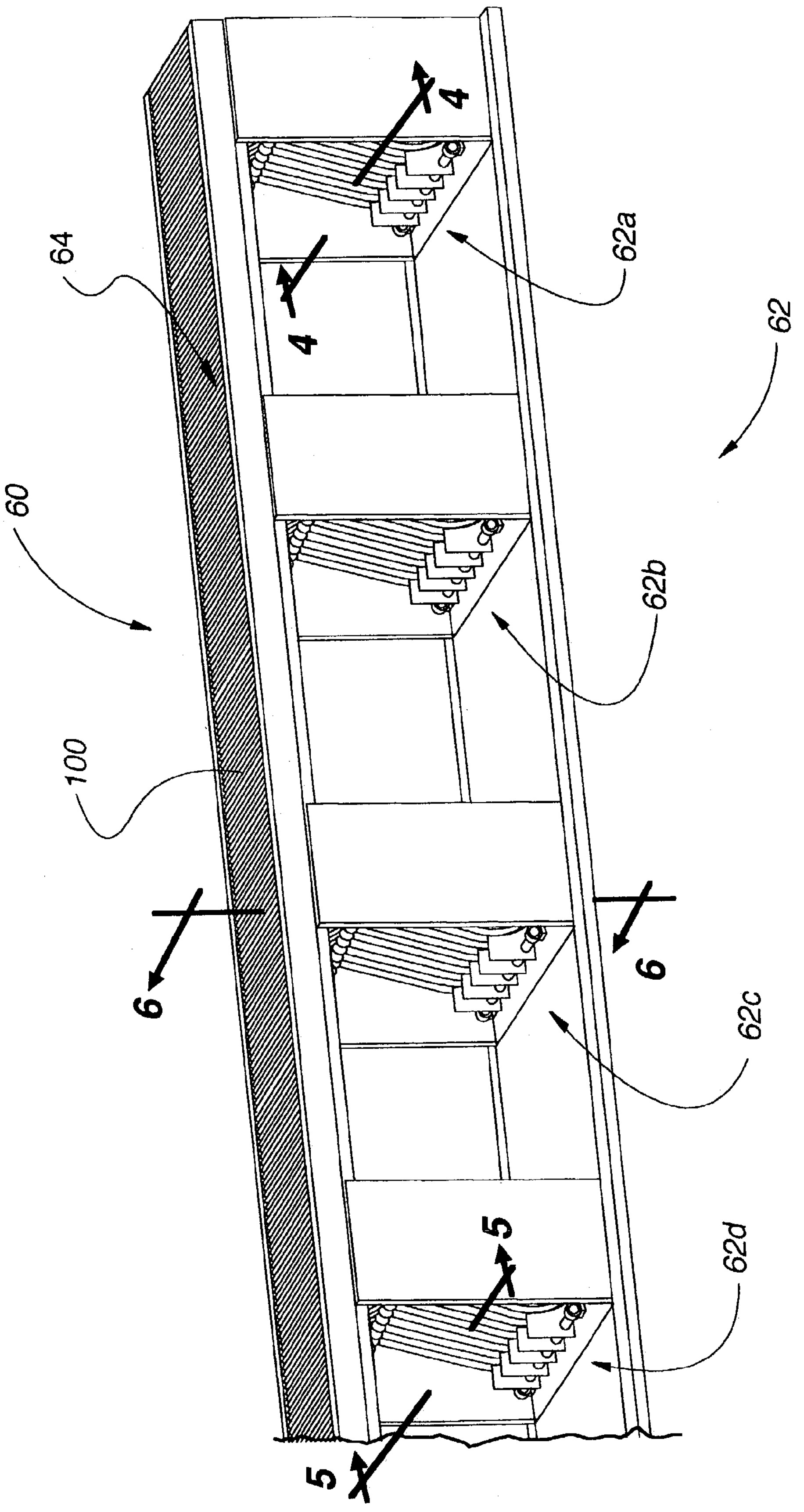
FIG. 1B is an isometric view looking at the upstream end of the apparatus of the present invention.
Figure 2:
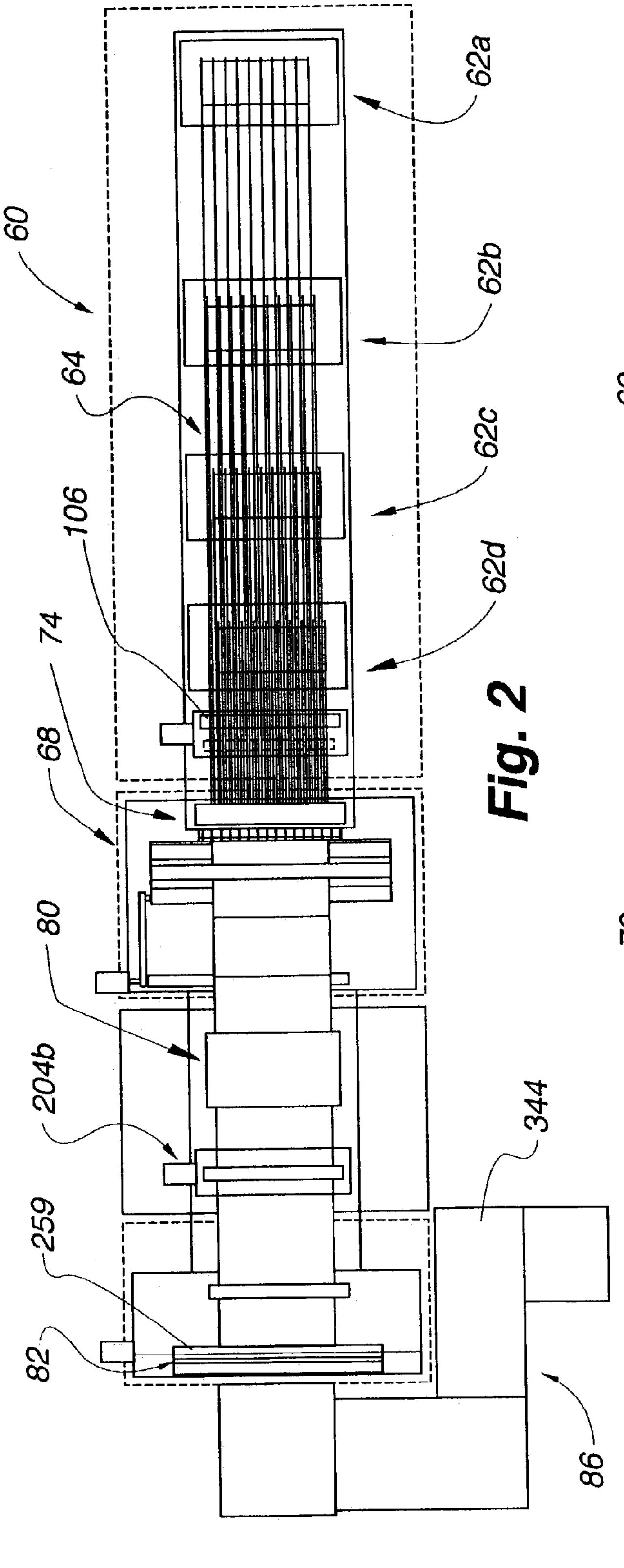
FIG. 2 is a diagrammatic top plan view of the apparatus of the present invention.

The apparatus 60 of the present invention is broadly seen in the aggregate of FIGS. 1A and 1B, with FIG. 1A showing the downstream end of the apparatus and FIG. 1B showing the upstream end. The apparatus is also shown diagrammatically in FIGS. 2 and 3 in top plan view and elevation, respectively.

The apparatus can generally be seen to include a plurality of strip material supply stations 62 at the upstream end of the apparatus with the stations being longitudinally spaced from each other along a path of travel 61, a folding station 66 associated with each supply station for folding the strips of material into expandable cellular structures, a laminating station 68 where upper and lower supplies of sheet material 70 and 72, respectively, are provided adjacent opposite faces of the cellular structures, a bonding material application station 74 for applying a bonding medium to the sheet material, heating stations 76 and 78 for preheating the cellular structures so they can be desirably bonded to the sheet material, a side edge folding station 80 for folding one of said sheet materials over side edges of the panels, a cutting station 82 for cutting the sheet material/cellular structure laminate into panels 84 (FIG. 56) of predetermined length, and an edge strip applicator station 86 for connecting edging or clips 88 (FIGS. 46 through 50) to the ends of the panels.

Figure 56:
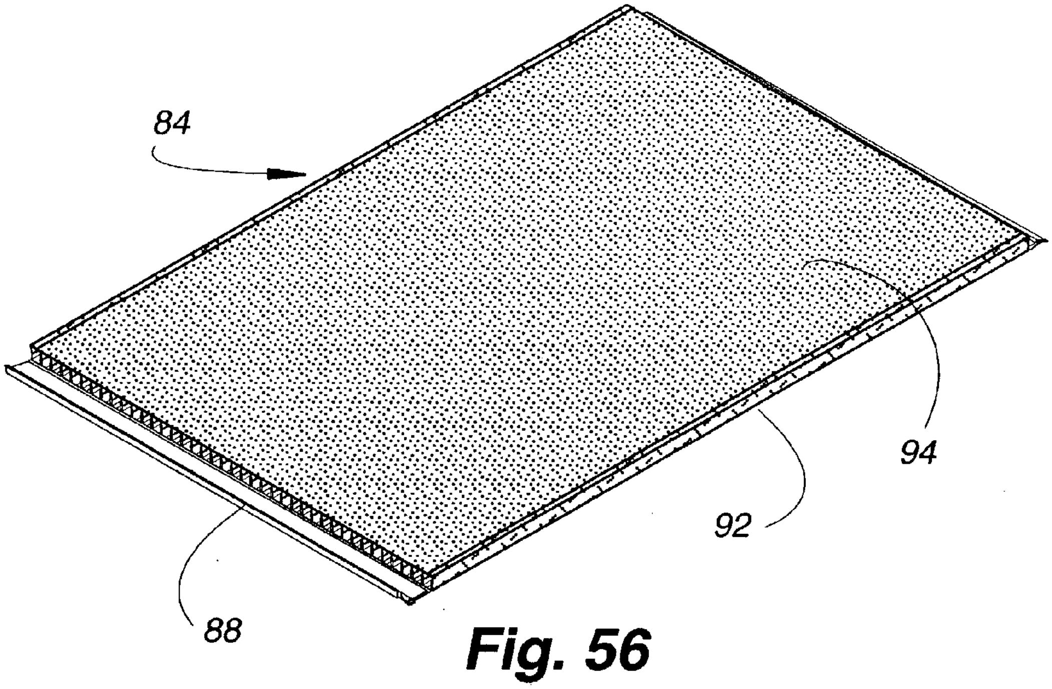
FIG. 56 is an isometric view of a completed panel formed with the apparatus of the present invention.
Figure 57:
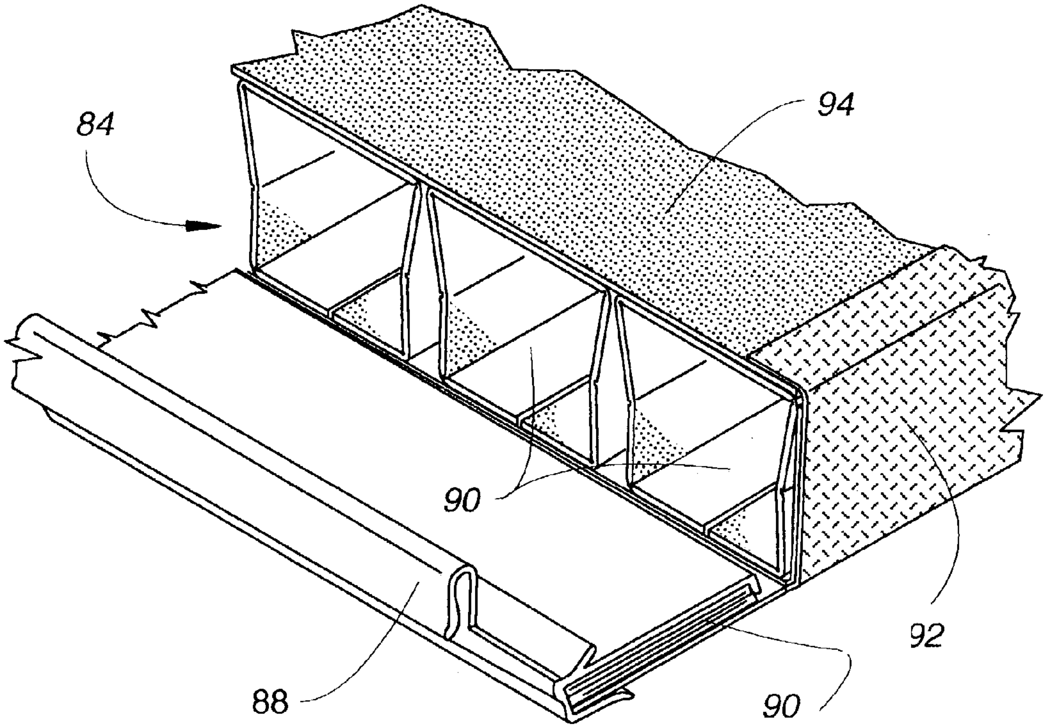
FIG. 57 is a enlarged fragmentary isometric showing a corner of the panel of FIG. 56.

The panel 84 fabricated from the apparatus is of the type described in detail in the afore-noted patent application entitled Compressible Structural Panel with the panel consisting of a plurality of elongated side-by-side compressible cellular structures or dividers 90 that are secured on their upper surface to an upper sheet of material 92 and may be secured on a lower surface to another sheet of material 94 or to strands or fibers of material (not shown) depending upon the structure desired. To facilitate an understanding of the apparatus of the present invention, the panel will be described as consisting of an upper layer of sheet material 92 that is in and of itself a laminate of two layers of material that may have different qualities or characteristics, an intermediate layer of side-by-side cellular structures 90 bonded to the upper layer and a lower sheet of material 94 which is in the illustrated panel single ply and bonded to the underside of the cellular structures 90 so that the resulting panel as seen in FIG. 56 has a double-layer sheet material on top, a single-layer sheet material on the bottom and a plurality of parallel side-by-side cellular structures or dividers therebetween. In the description of the panel in the aforenoted application, the panel is compressible so that the sheet material 92 on the top can be moved toward the sheet material 94 on the bottom with no lateral translation while causing the cellular structures 90 therebetween to compress.

The cellular structures 90 are made from strips of material 96 having pre-formed fold lines therein and depending upon the composition of the strip material from which the cellular structures are made, the cellular structures can be made to remain compressed temporarily or permanently, or to be biased toward an expanded open condition as thoroughly described in the aforenoted application. As pointed out in the aforementioned pending application, when biased toward an expanded open condition, a time period for transforming from a compressed to an expanded open condition can be controlled by the composition of the strip material 96. Preferably, the strip material from which the cellular structures are made is a flat fiberglass matting material that includes glass fibers embedded in a resin with the resin being a mixture of thermal set and thermal plastic resins whereby the strip material is normally biased to remain in its original flat condition but can be folded along pre-formed fold lines into a cellular structure and held in a compressed state to control the expansion of the structure over predetermined time periods. The advantages of a panel so formed are set forth in the aforenoted application.

Supply and Folding Stations

Each strip material supply station 62 is identical in rotatably supporting rolls 98 of the strip material 96 and having a folding station 66 associated therewith for folding the strip material into the cellular structures 90. Each supply station is positioned beneath an idler roller conveyor 100 with the folded strip material or cellular structures 90 being adapted to be fed into and confined in the idler roller conveyor in the space between upper and lower sets of rollers 102 and 104, respectively, of the idler roller conveyor so that the strips can be pulled or drawn downstream along the aforenoted path of travel by a first set of conveyor drive rollers 106, positioned in a gap in the idler roller conveyor, and a drive belt system 108 positioned in the laminating station 68 as will be described later. While the drive rollers 106 and drive belt system 108 are driven at approximately the same speed, the drive rollers 106 are actually driven slightly slower so as not to force the cellular structures into the laminating station.

Each strip material supply station 62, as is probably best seen in FIGS. 4 through 7, accommodates a plurality, in the disclosed embodiment ten, rolls 98 of strip material 96 with each roll being laterally spaced from an adjacent roll relative to the path of travel 64 defined by the idler roller conveyor 100. The strip material could be any desired color which is the same as or different from the color of the sheet material 70 and 72. The rolls 98 at one supply station are laterally offset slightly from the rolls at the other supply stations so that the strip material emanating from a first supply station 62*a* is spaced laterally from strip material emanating from the other supply stations. In other words, there are lateral gaps between folded strips of material 96 emanating from the first supply station and similar folded strips of material emanating from second, third and fourth supply stations 62*b*, 62*c* and 62*d*, respectively, downstream from the first supply station 62*a*. Accordingly, strips of folded material emanating from the second, third and fourth supply stations are fed into gaps between or to the sides of folded strips of material emanating from an upstream station. In aggregate, the folded strip material in the form of cellular structures 90 arriving at the laminating station 68 are disposed in adjacent but slightly spaced side-by-side relationship. In the disclosed embodiment, forty such folded strips of material or elongated cellular structures are delivered to the laminating station. The elongated cellular structures are presented to the laminating station in a manner to be bonded to the upper 92 and lower 44 sheets of material in parallel relationship thereto and in longitudinal alignment therewith.

Figure 4:
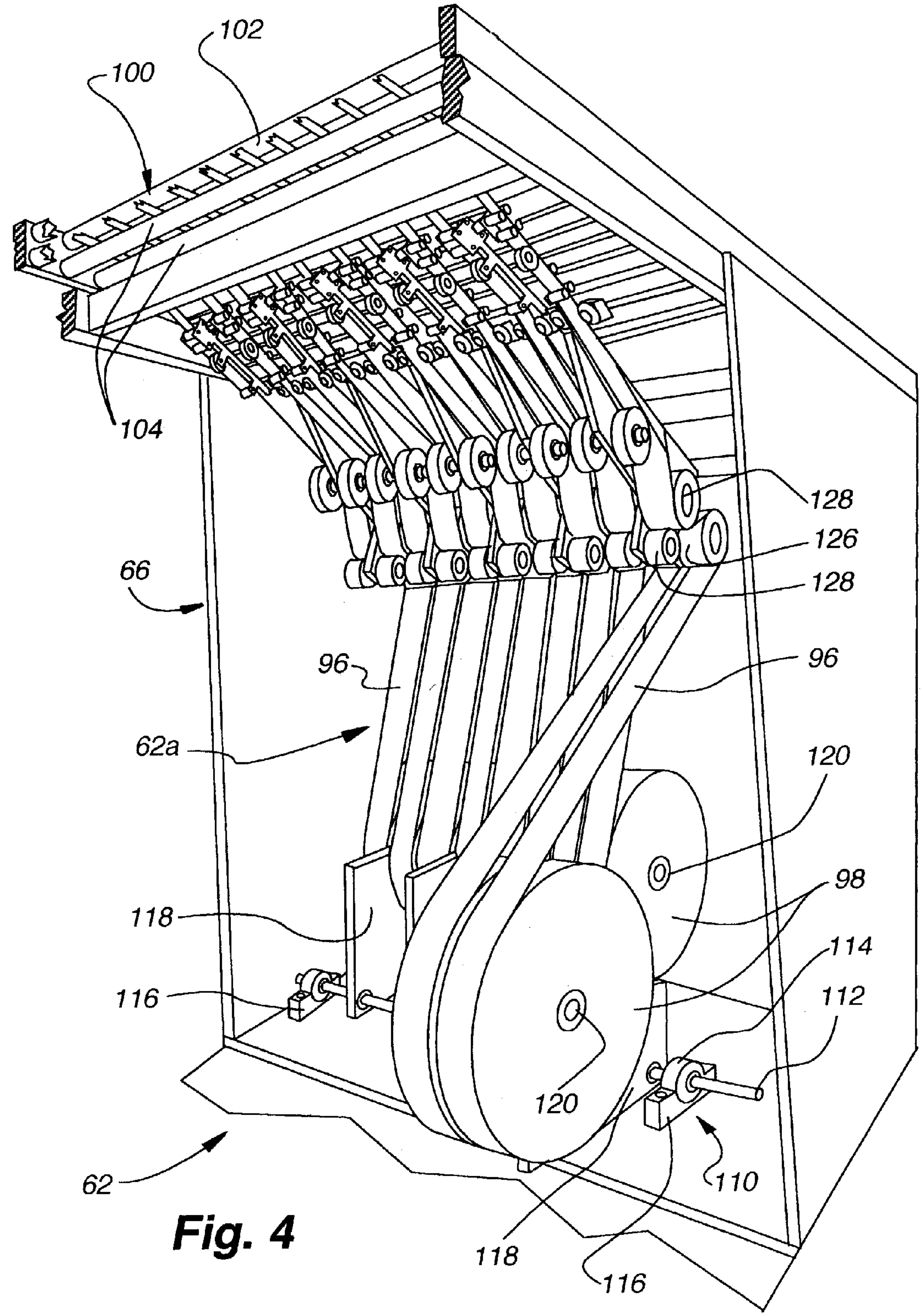
FIG. 4 is an enlarged fragmentary section taken along line 4—4 of FIG. 1B.

As is probably best seen in FIG. 4 which illustrates the first strip material supply station 62*a* with the second through fourth being identical therewith except for the lateral displacement of the rolls of strip material, it will be seen that the supply station includes a lower support 110 for the rolls 98 of strip material and an associated folding station 66 disposed above the roll supports at which desired folds are placed along preformed creases in the strip material 96 as it is removed from the underlying rolls 98 and prior to the strip material being fed into the idler roller conveyor 100.

Each of the strip material supply stations 62 has a pivot shaft 112 mounted in bearings 114 on laterally spaced brackets 116 with the pivot shaft extending laterally across the bottom of the station. The shaft rotatably supports five identical pivot plates 118. Each pivot plate is adapted to pivot or swivel about the pivot shaft between loading and operative positions and each pivot plate includes a support shaft 120 (FIG. 6) rotatably supporting a roll 98 of strip material 96 on the ends thereof and on opposite sides of the pivot plate. One pivot plate 118 is shown in FIG. 4 positioned in its loading position with the remaining four pivot plates in their operative positions.

As will be appreciated, in the loading position, a supply roll 98 of strip material 96 can be mounted on the support shaft 120 on either side of the associated pivot plate 118. A free end of the strip material on each roll can then be hand fed through a plurality of folding rollers in the folding station 66, along the idler roller conveyor 100 and into the laminating station 68 where they are gripped by the drive belts 108 mentioned previously. In operation, the drive belts 108 are adapted to pull the strip material from the supply rolls 98 through the folding station and along the idler roller conveyor to the laminating station, and subsequently feed the laminate made in the laminating station downstream. Adjustable brakes 122 (FIG. 6) are associated with each support shaft 120 to provide resistance to the drive belts 108 to properly tension the strips of material 96 for desired folding.

Figure 5:
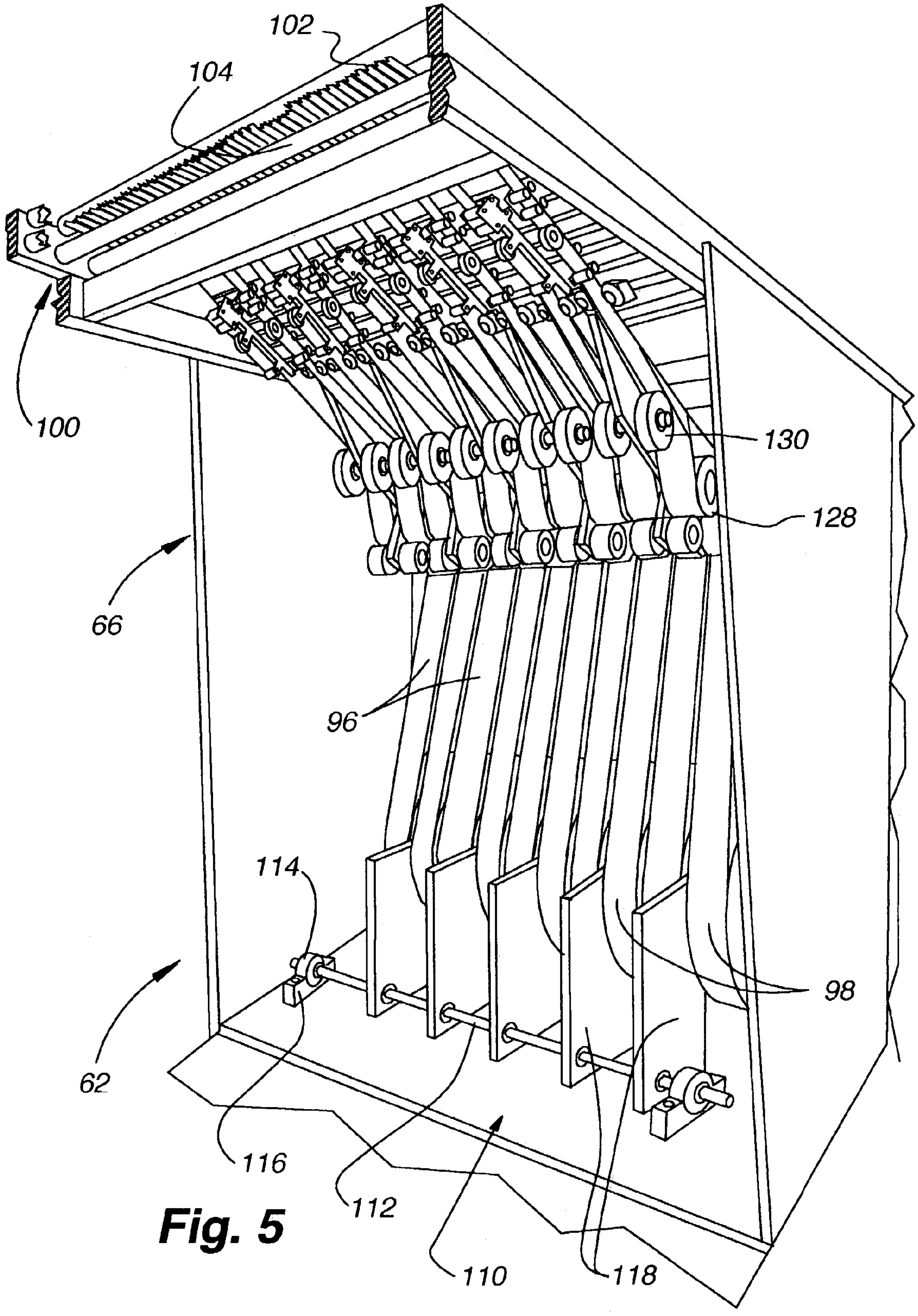
FIG. 5 is an enlarged fragmentary section taken along line 5—5 of FIG. 1B.
Figure 6:
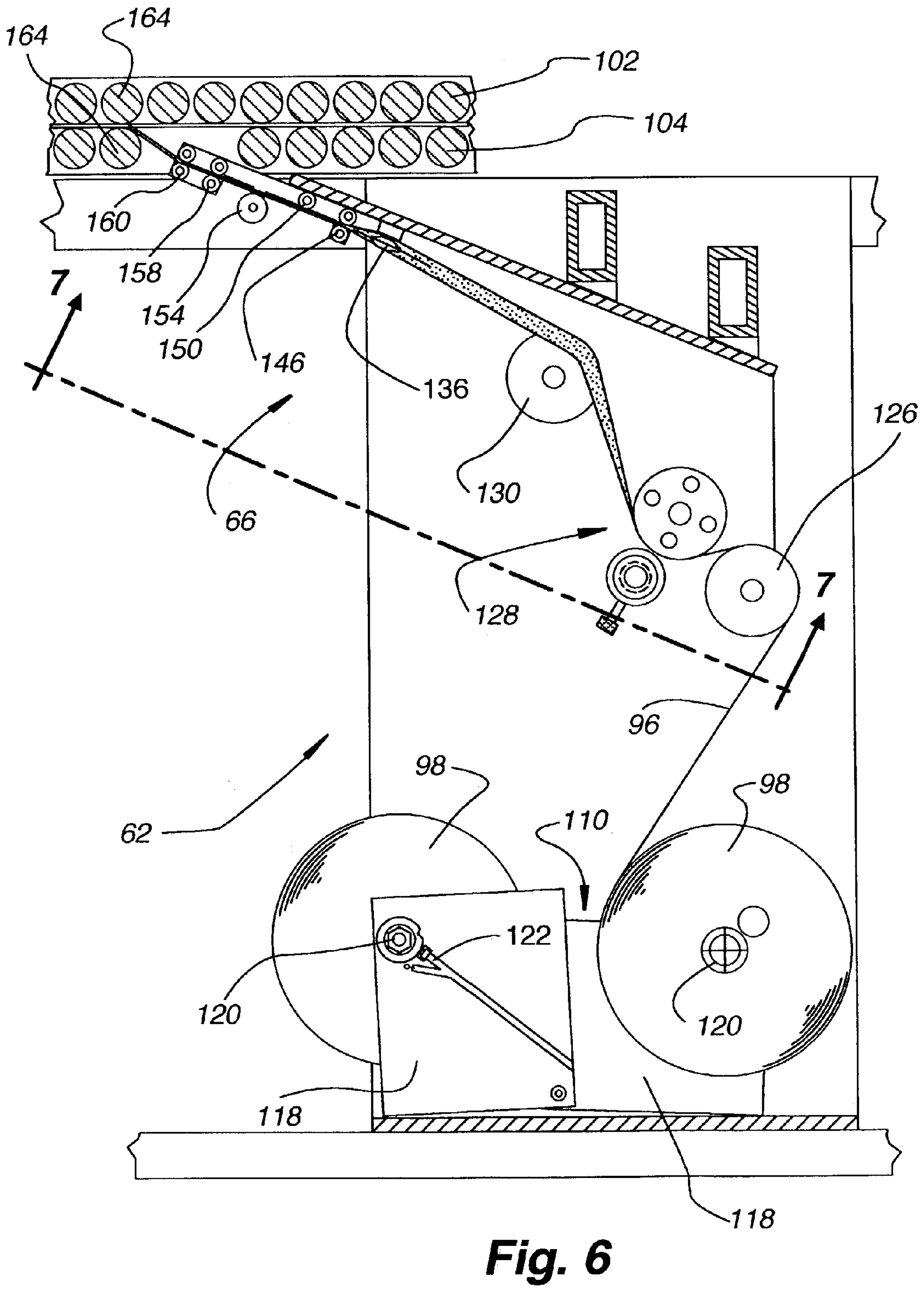
FIG. 6 is an enlarged fragmentary section taken along line 6—6 of FIG. 1B.

After a pair of supply rolls 98 of strip material 96 have been mounted on the support shaft 120 of a pivot plate 118, the pivot plate can be swung from the loading position to the operative position of FIG. 5 and in the operative position, the strip material is initially hand fed upwardly into the folding station 66 of the strip material supply station 62. The folding station is probably best seen in FIGS. 6 through 14 with these figures specifically illustrating the third strip material supply station 62*c* even though as mentioned previously, each supply station functions identically. In FIG. 6, the position of an endmost pivot plate 118 is shown in the loading position with the remaining pivot plates and associated rolls 98 in the operative position. The strip material from the supply rolls in the operative position can be seen to pass upwardly from a supply roll into a series of folding rollers which fold the strip material along a plurality of longitudinal crease lines 124 previously formed in the strip material before it is placed on the supply rolls. As will be appreciated in FIG. 8, there are six creases with four of the creases being in the underside of the strip material and two of the creases on the top side. As mentioned, the creases are placed in the strip material in a conventional manner before the material is stored on the rolls. Each of the rollers in the folding system is an idler roller and has been uniquely designed and positioned to sequentially fold the strip material along the creases 124 in predetermined directions so as to form an expandable/compressible cellular structure 90 as probably best seen in FIG. 17.

The initial roller 126 (FIG. 7) at the folding station 66 is a roller having a width that is approximately the same as the width of the strip material 96 and is positioned along the center of the strip material. It is principally an alignment and tensioning roller with the strip material as best seen in FIG. 6 passing approximately 180° around the roller so as to leave the roller on a top side.

Figure 9:
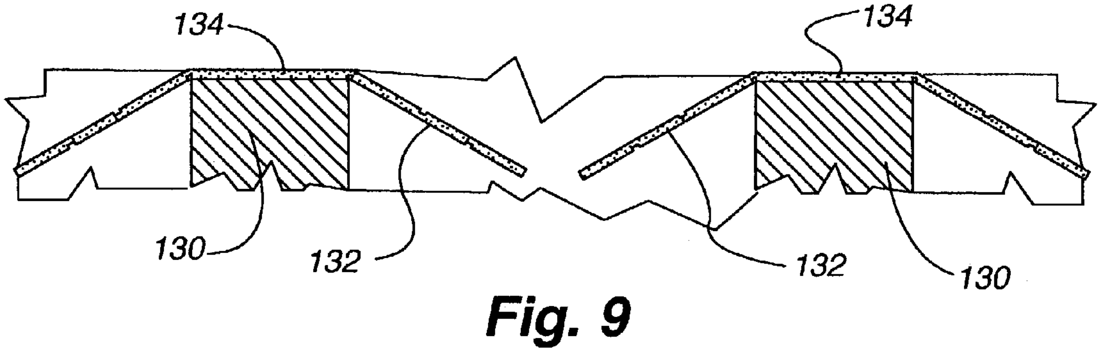
FIG. 9 is an enlarged fragmentary section taken along line 9—9 of FIG. 7.

After passing 180° around the initial or first roller 126, the strip material passes between a pair of tension control or nip rollers 128 (FIG. 6) which are conventional in having a brake or clutch system therein for resisting the pulling force applied to the strip material by the drive rollers 106 so that the tension in the strip material downstream from the rollers is constant. Subsequent to passing between the rollers 128, the strip passes around a first forming roller 130 which is shown in section in FIG. 9. The strip material 96 passes across the top of the first forming roller 130 with the width of the first forming roller being substantially identical to the spacing between the two innermost creases 124*a* on the underside of the strip material. Due to the downward pressure applied to the strip material by the nip rollers 128, the strip material flexes or folds downwardly along the edges of the first forming roller as seen in FIG. 9 to define side flaps 132 and a central portion 134.

After passing over the first forming roller, the strip material continues upwardly (FIG. 6) along an inclined path in a downstream direction so as to pass between a pair of spaced forming rollers 136 (FIG. 11) having a substantially pointed center circular rib 138 and with the pair of forming rollers being rotatably mounted on shafts 140 that extend substantially upwardly. The pair of forming rollers 136 force the downwardly angled side flaps 132 inwardly toward each other causing the side flaps to fold about the two crease lines 124*b* in the upper surface of the strip material so as to define two inwardly directed segments 142 of the strip material on either side of the central portion 134 and two outwardly flaring flanges 144 along the lateral sides of the strip material.

Figure 10:
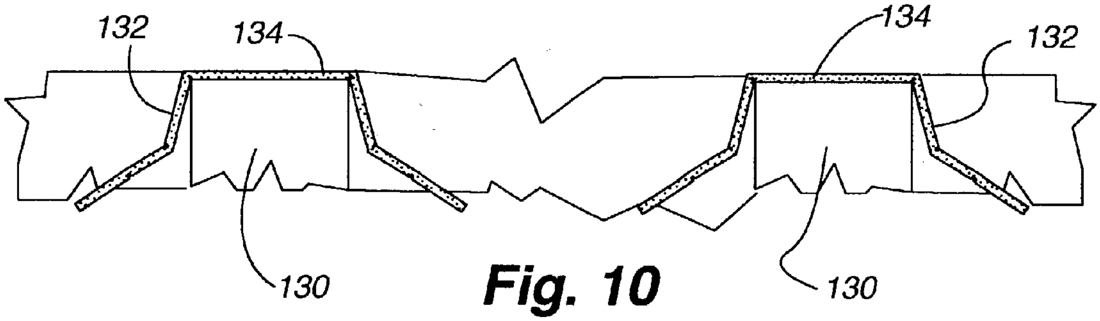
FIG. 10 is an enlarged fragmentary section taken along line 10—10 of FIG. 7.
Figure 11:
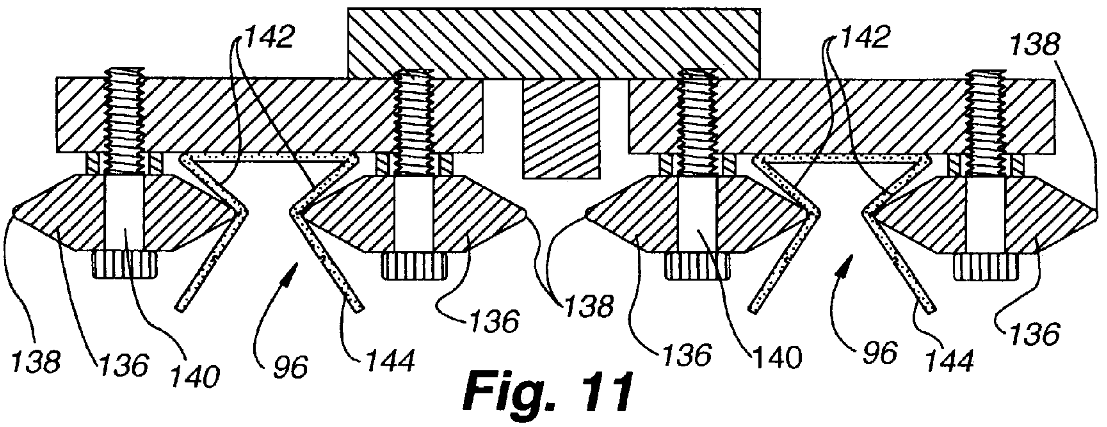
FIG. 11 is an enlarged fragmentary section taken along line 11—11 of FIG. 7.

As can be seen in FIG. 10, due to the forces placed on the strip material by the pair of forming rollers 136, the strip material 96 begins assuming the position of FIG. 11 before it arrives at the pair of forming rollers 136.

Figure 7:
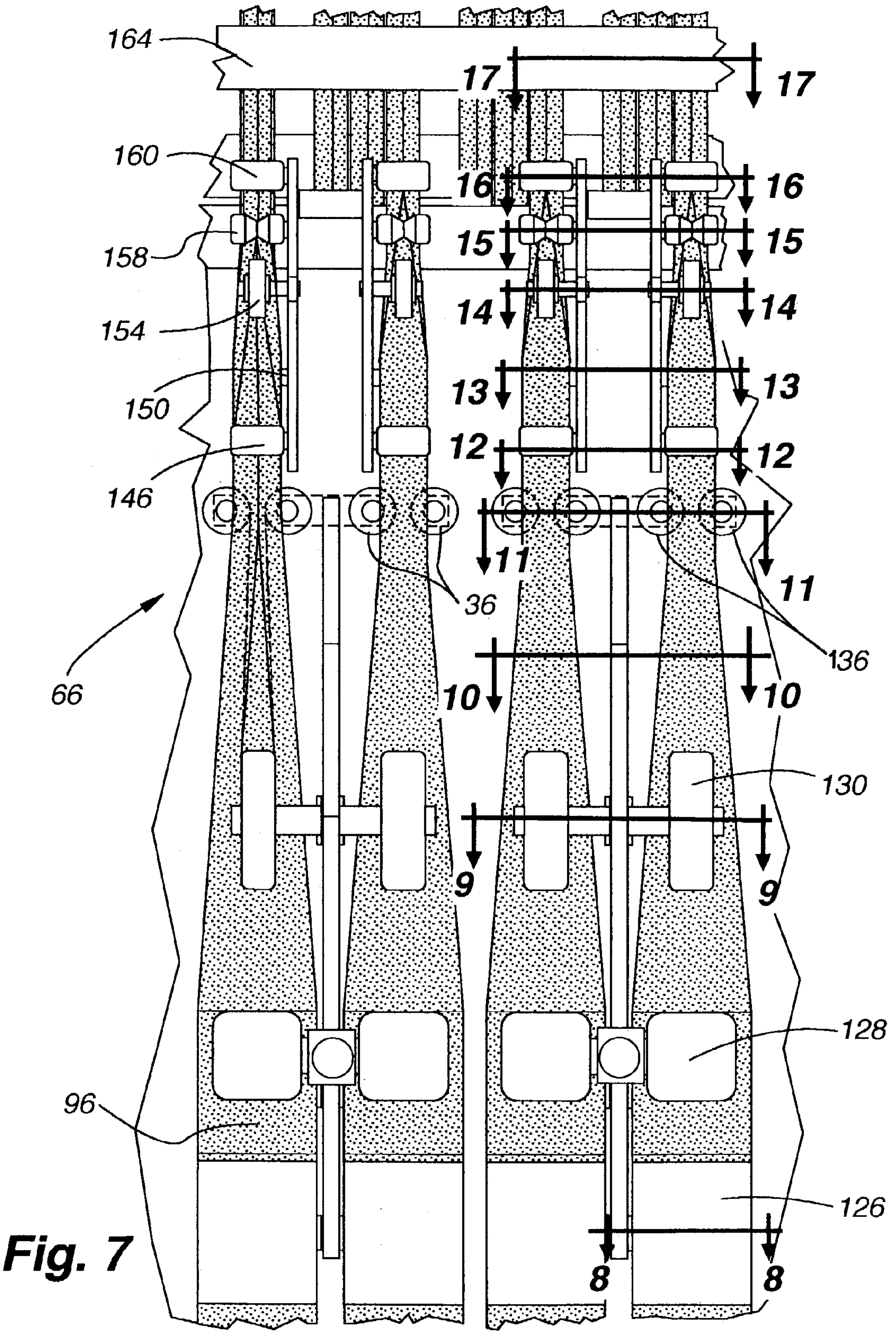
FIG. 7 is an enlarged fragmentary section taken along line 7—7 of FIG. 6.
Figure 8:
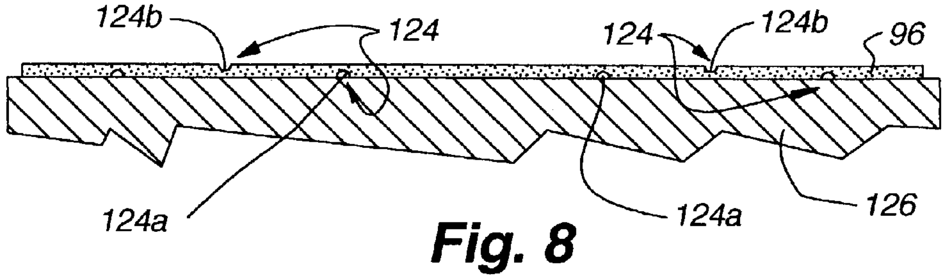
FIG. 8 is an enlarged fragmentary section taken along line 8—8 of FIG. 7.
Figure 12:
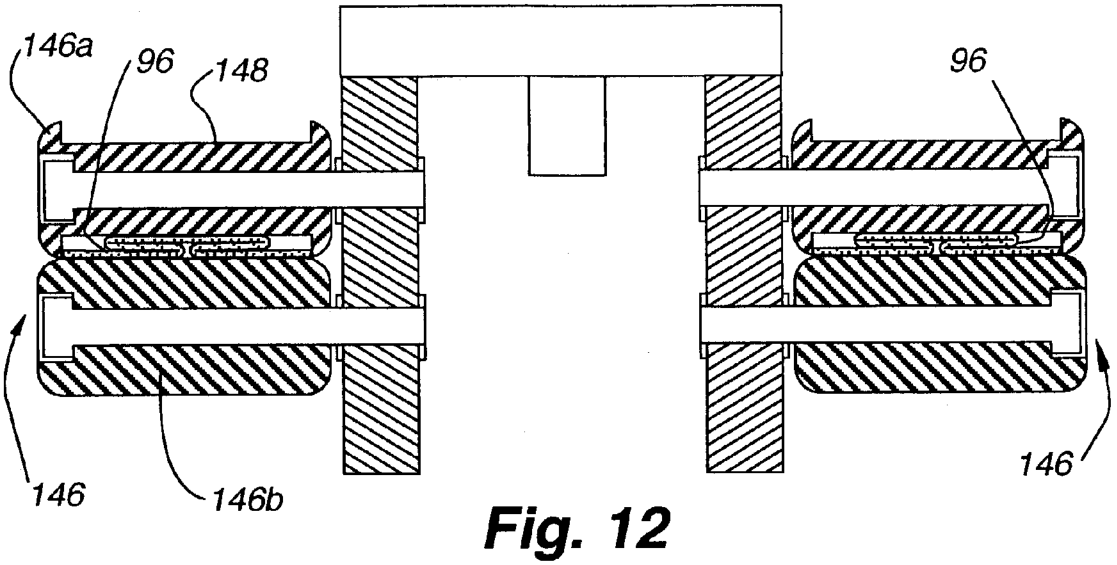
FIG. 12 is an enlarged fragmentary section taken along line 12—12 of FIG. 7.
Figure 13:
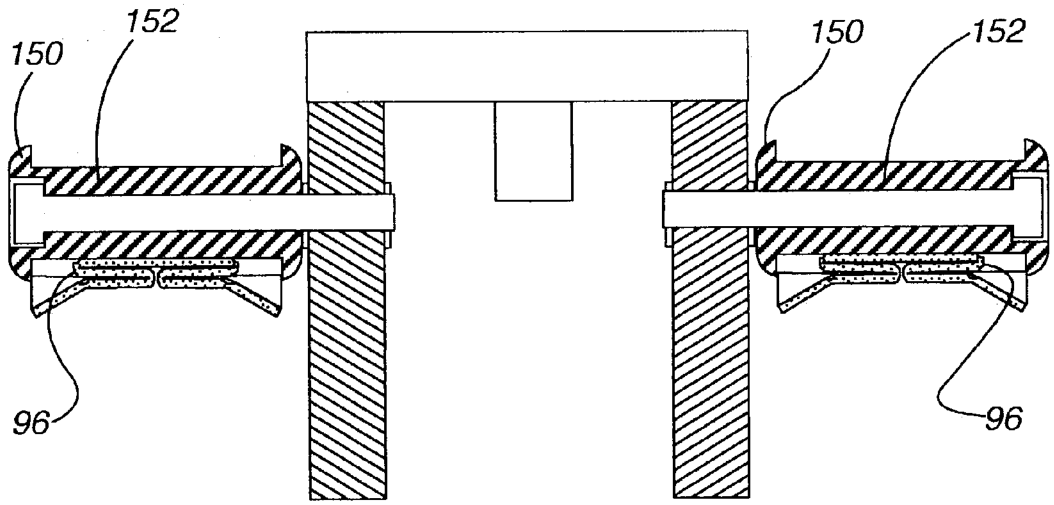
FIG. 13 is an enlarged fragmentary section taken along line 13—13 of FIG. 7.
Figure 14:
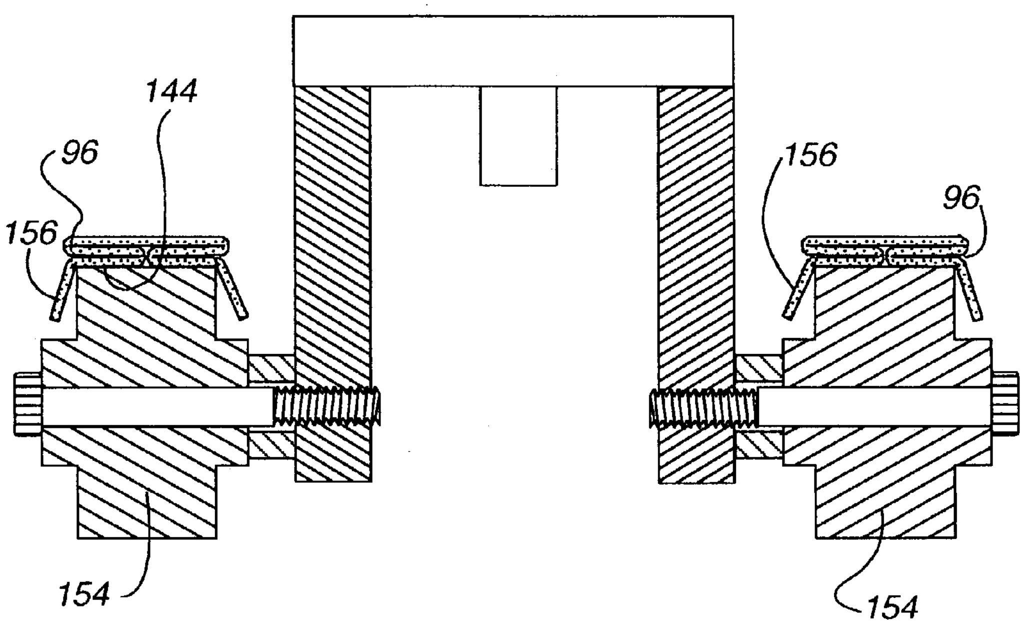
FIG. 14 is an enlarged fragmentary section taken along line 14—14 of FIG. 7.

The strip material 96 after leaving the pair of forming rollers 136 continues to incline (FIG. 6) upwardly and passes between a pair of vertically spaced pinch rollers 146 (FIG. 12). The upper pinch roller 146*a* has an annular recess 148 wide enough to accommodate the strip material in a folded and compressed condition while the lower roller 146*b* is cylindrical and serves to retain the strip material in the annular recess 148 of the upper roller. As best seen in FIGS. 6, 7 and 13, after emerging from the pinch rollers, the strip material passes beneath a guide roller 150 having an annular recess 152 centered thereon which has a width sufficient to accommodate the folded strip material so that the strip material is fed downstream in a controlled manner. After passing the guide roller 150, the folded strip material passes over a supporting roller 154 (FIG. 14) which holds the innermost sections of the lateral flanges 144 against the previously folded material allowing outermost sections 154 of the flanges to incline downwardly.

Figure 15:
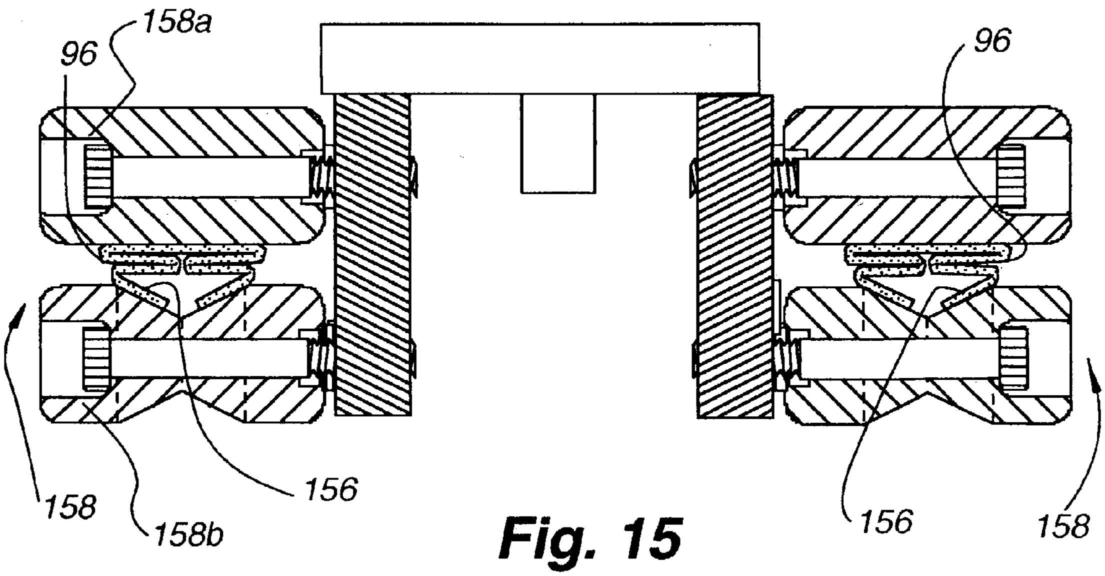
FIG. 15 is an enlarged fragmentary section and taken along line 15—15 of FIG. 7A.
Figure 16:
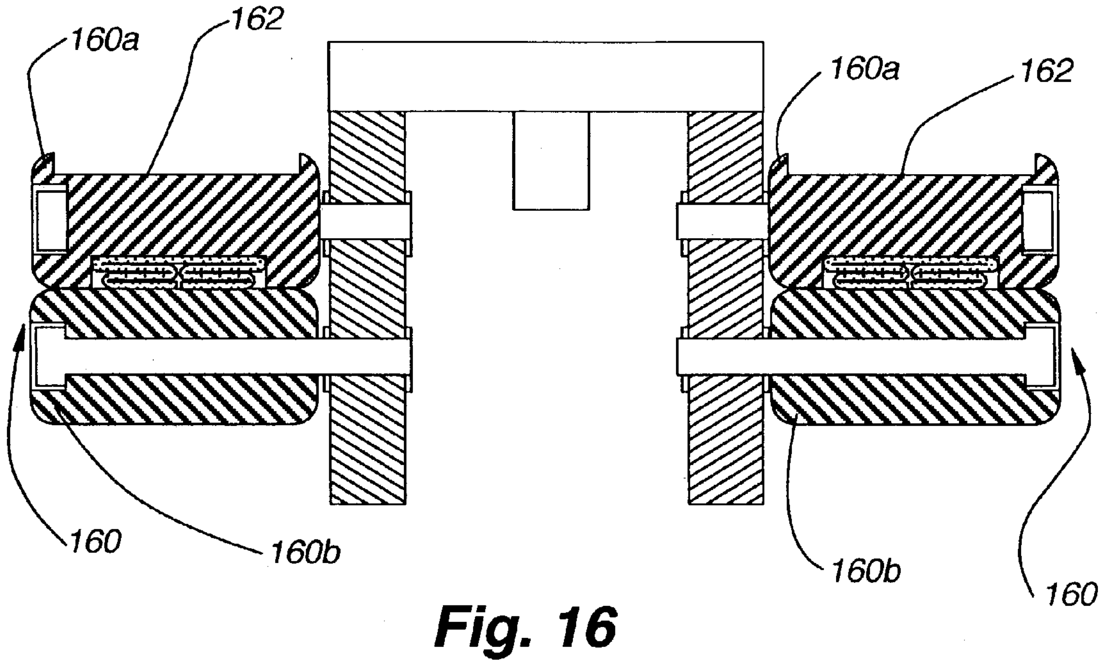
FIG. 16 is an enlarged fragmentary section broken along line 16—16 of FIG. 7.

Subsequently, the strip material as it continues to incline upwardly in a downstream direction passes between a second pair of forming rollers 158 as best seen in FIG. 15 with the upper roller 158*a* of the pair being simply a cylindrical roller and the bottom roller 158*b* being a bow tie roller designed to direct the outermost sections 156 of the flaring flanges 144 in an inner direction toward each other. After passing the second pair of forming rollers 158, the strip material continues upwardly in a downstream direction where it passes between a pair of confining rollers 160 seen in FIG. 16 with the uppermost confining roller 160*a* having an annular recess 162 of the same width as the folded strip material so as to guide the material in the downstream direction and with the lower roller 160*b* of the pair compressing the entire folded strip into the annular recess 162 while in a configuration that was initiated by the forming rollers 158 seen in FIG. 15. Upon leaving the pair of confining rollers 160, the strip material has been folded into the desired configuration for incorporation into the structural panel and in this folded condition will be referred to as a cellular structure.

Figure 17:
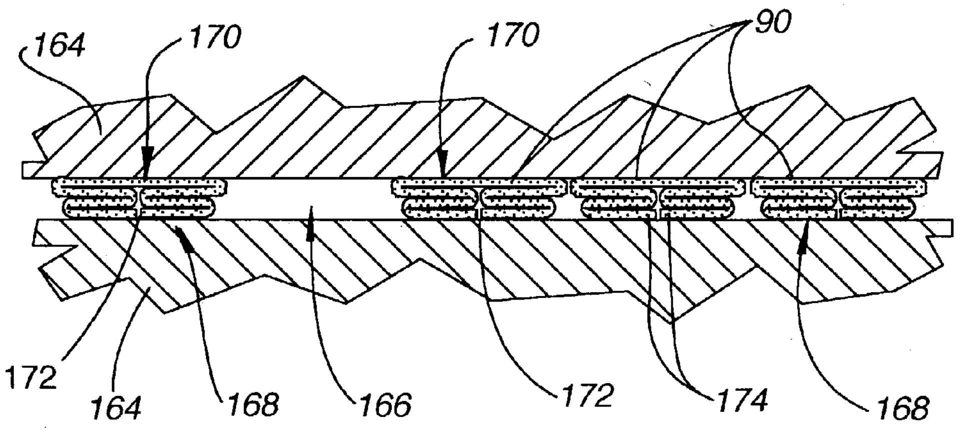
FIG. 17 is an enlarged fragmentary section taken along line 17—17 of FIG. 7.

FIG. 17 is a section taken through a pair of rollers 164 in the idler roller conveyor 100 immediately downstream from the folding station associated with the third supply station 62*c* and as will be appreciated, there are a plurality of side-by-side folded strips of cellular structure material 90 with a relatively large gap 166 between two of the cellular structures. That gap 166 and other similar gaps (not shown) will be filled with cellular structures emanating from the fourth supply station 62*d*.

FIG. 5 is an isometric view of the fourth strip material supply station 62*d* and as will be appreciated, the cellular structures 90 emanating therefrom and flowing into the idler roller conveyor 100 are inserted into the gaps between the cellular structures fed to the idler roller conveyor from the first three supply stations 62*a*, 62*b* and 62*c* so that all of the cellular structures can be incorporated into a laminate structure in an immediately adjacent side-by-side relationship. In the disclosed embodiment, there are forty cellular structures fed continuously to the laminating station 68 by the idler roller conveyor 100, ten cellular structures being received from each of the four strip material supply stations 62.

It should again be noted that prior to running the apparatus, the strip material 96 is hand fed through the rollers in the associated folding station 66 so as to pre-set the apparatus for operation.

When the cellular structures 90 are made from a fiber glass matting as described in the aforenoted application for a Compressible Structural Panel, the cellular structures are receptive to being folded but are biased toward an unfolded flat sheet like orientation, so the cellular structures must be confined in a folded condition when fed into the idler roller conveyor 100, and while being transported in the idler roller conveyor to the laminating station 68.

It should be noted that while the use of rollers to fold the strips of material is the preferred manner of forming the cellular structures, the strip material could also be folded into the cellular structures by pulling the strip material through one or more folder boxes having contoured sides to force the material into the desired folded condition as the material is pulled through the boxes.

Heating, Bonding Medium Application and Laminating Stations

As seen in FIG. 17, each continuous cellular structure 90 formed from the folding of the strips of material 96 is fed into the laminating station 98 with a bottom side 168 open and a top side 170 closed. In other words, there is a gap or opening 172 between the lateral edges 174 of the cellular structure on the bottom side so that air can enter the cellular structure from the bottom side but not from the top side.

Figure 3:
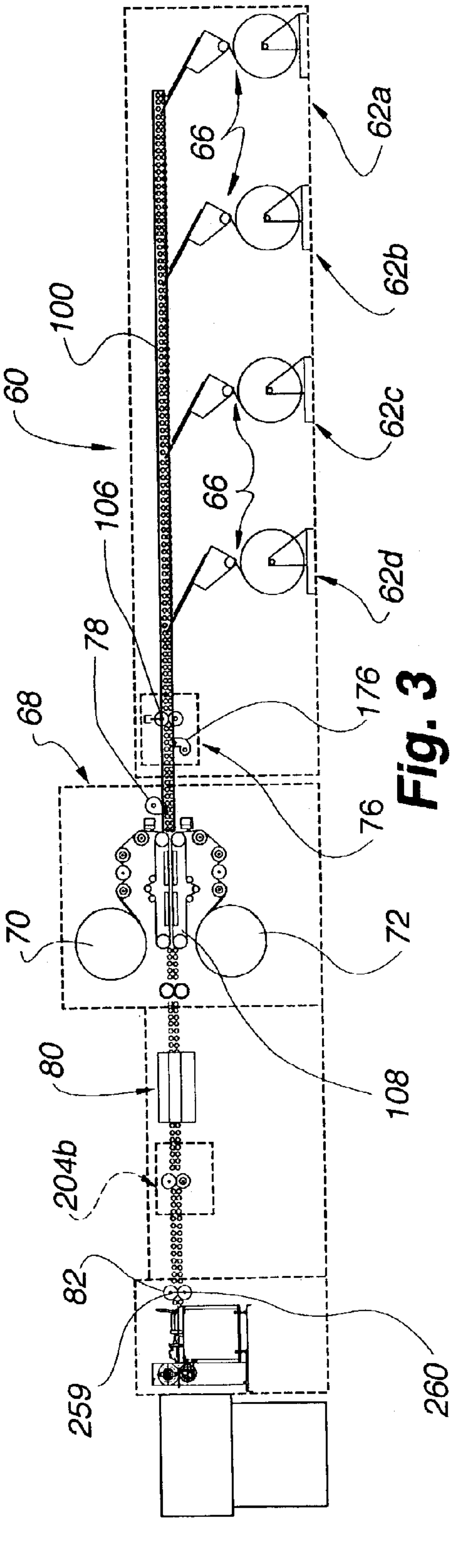
FIG. 3 is a diagrammatic left side elevation of the apparatus of the present invention.
Figure 17A:
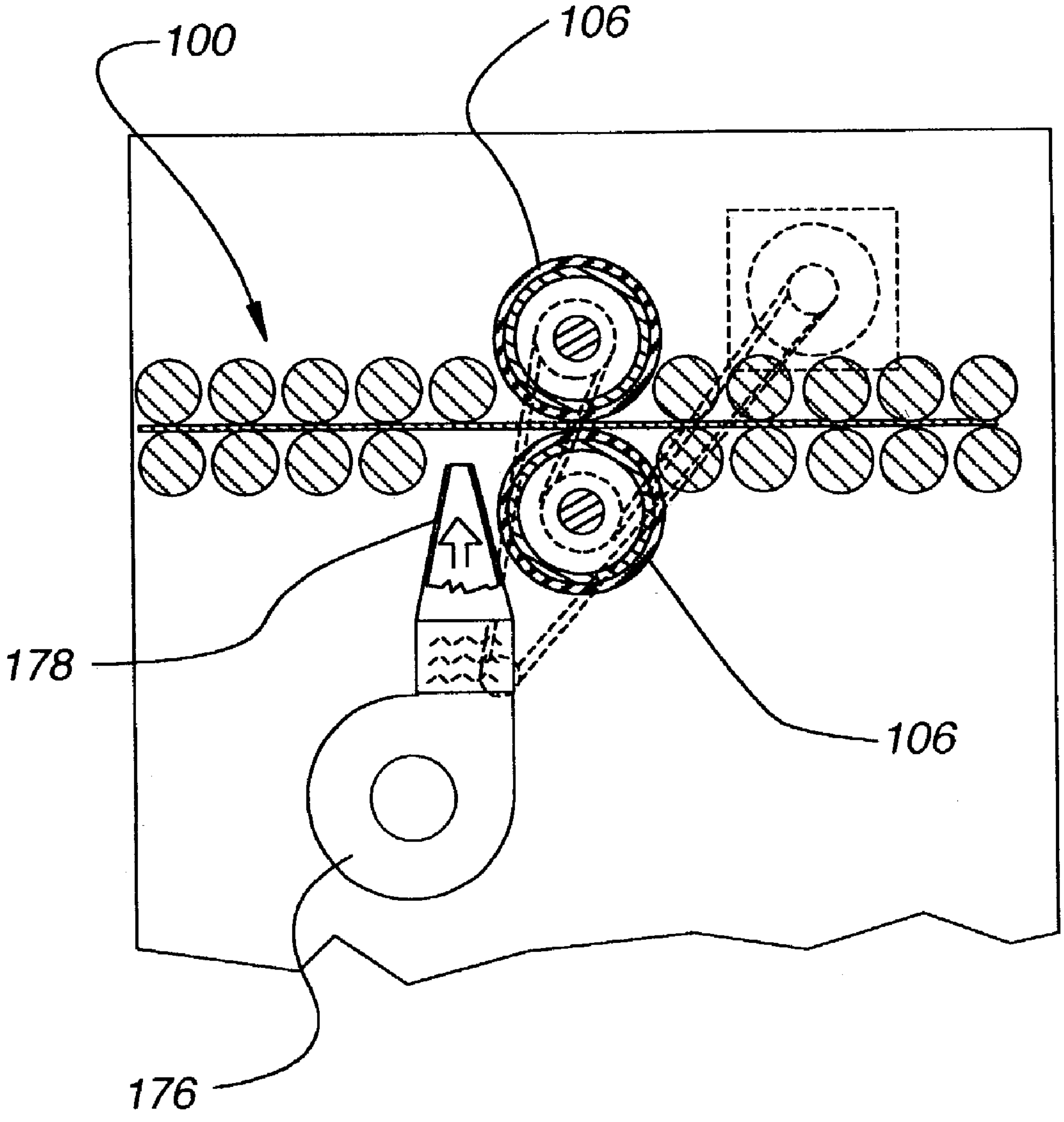
FIG. 17A is an enlarged fragmentary section taken along 17A—17A of FIG. 1A.

Prior to entering the laminating station 68, and as best seen in FIGS. 3 and 17A, a hot air blower 176 is positioned beneath the idler roller conveyor 100 and in a position to direct hot air at the open bottom side 168 of the cellular structures 90. The hot air blower can be of a conventional type wherein hot air, preferably in a temperature range of 700 to 850° F. when it engages the cellular structures, is blown into a manifold 178 that extends across the width of the idler roller conveyor so as to uniformly direct hot air at the open bottom side of all the cellular structures as they are conveyed thereby. The hot air, of course, heats the last folded flaps of the cellular structures to a relatively hot temperature but the heat also penetrates through the open bottom of the cellular structures so as to heat the underside of the top or central portion 134 of the cellular structures so that there is a temperature gradient across the cellular structures from bottom to top with the hotter portion of the gradient being at the bottom.

Downstream from the lower heater 176, an upper heater 180 (FIG. 18) is positioned above the idler roller conveyor 100 with the upper heater being identical to the lower heater and also, therefore, having a manifold 182 that extends across the width of the idler roller conveyor to direct hot air at the closed top side 170 of the cellular structures 90. The hot air from the upper blower is obviously focused on the top surface of the cellular structures so that after the cellular structures have passed downstream from the upper blower, they are adequately heated inside and out with the concentration of the heat on the upper and lower surfaces of the cellular structures.

The laminating station 68 which is best seen in FIGS. 18 through 25A, includes the upper supply roll 70 of sheet material 92 and the lower supply roll 72 of sheet material 94. The sheet materials 92 and 94 can be the same material but in the preferred embodiment of the panel being fabricated, the upper sheet material 92 is a two-ply laminate of materials that are well defined and described in the aforenoted application for a Compressible Structural Panel. The lower sheet material 94 in the preferred embodiment is a single-ply material of unitary structure which is also well described in the aforenoted application for a Compressible Structural Panel. Both sheet materials could come in different forms. By way of example, they could be made from integrated strips of material. The supply rolls of sheet material are rotatably mounted on support shafts 188 which may or may not have a braking system (not shown) as needs may dictate to control the rotational speed of the rolls as the sheet material is removed therefrom. The sheet material 92 coming off the upper supply roll 70 is passed downwardly in a reverse or upstream direction above and below a plurality of transversely extending idler rollers 190 cooperating with guide rods 192 to confine the sheet material to a predetermined serpentine path of movement. The idler rollers 190 and guide rods 192 serve to maintain a desired tension in the sheet material and also to help in straightening the sheet material which has been confined on a cylinical roll for indeterminate periods of time. After passing over the most upstream idler roller 190*a,* the sheet material 92 is fed downwardly into the path of travel 64 of the cellular structures 90 so as to engage the cellular structure along the closed top side 170 thereof.

Similarly, the lower supply roll 72 of sheet material 94 is fed upwardly and in an upstream direction above and below a plurality of idler rollers 194 and guide bars 196 which serve the same purpose as the upper idler rollers and guide rods associated with the upper supply roll 70 of sheet material so that the lower sheet material also follows a serpentine path of travel. The lower sheet material after passing the most upstream idler roller 194*a* is fed upwardly into the path of travel 64 of the cellular structures so as to engage the cellular structures along the open bottom 168 thereof.

After passing around the most upstream roller of the upper and lower sets of idler rollers, both the upper sheet material 92 and the lower sheet material 94 in their vertical movement pass adjacent to a plurality of bonding medium applicators 198 in the bonding medium application station 74 which are adapted to emit continuous beads 200 (FIGS. 21, 25 and 26) of a bonding medium, such as resin, plastic, adhesive or the like onto the sheet material as it passes thereby. As is possibly best illustrated in FIG. 21, the bonding medium applicators 198 adjacent to the upper sheet material 92 are designed to apply three parallel beads of bonding material onto the bottom surface of the upper sheet of material with one bead 200*a* being aligned with the center of the cellular structure 90 and the other two beads 200*b* being adjacent to the lateral side edges of the folded cellular structures. The bonding medium applicators 198 adjacent to the lower sheet material 94 apply two beads of bonding material 200*c* to the sheet material at locations adjacent to the lateral edges of the bottom side 168 of the cellular structures.

As previously mentioned, in the laminating station 68 there is a belt-drive system 108 for advancing a laminate structure 202 comprised of the sheet materials 92 and 94 and the folded cellular structures 90 through the laminating station and downstream of the apparatus to other operational stations. The belt-drive system 108 as probably best seen in FIGS. 18, 19 and 20 includes upper and lower sets of driven rollers 204 and 206, respectively, with each set including an upstream (204*a* and 206*a*) and a downstream (204*b* and 206*b*) driven roller. A relatively thin guide rod 208 is positioned intermediate both the upper and lower sets of drive rollers so that drive belts 210 can be trained around the guide rods and around the drive rollers. The drive belts are spaced above and below the path of travel of the laminate structure 202 that is formed in the laminating station with the spacing between the belts being predetermined to maintain the cellular structures 90 in a partially compressed condition. The path of travel between the drive belts in the laminating station is substantially horizontal and in longitudinal horizontal alignment with the path of travel 64 defined by the idler roller conveyor.

Figure 18:
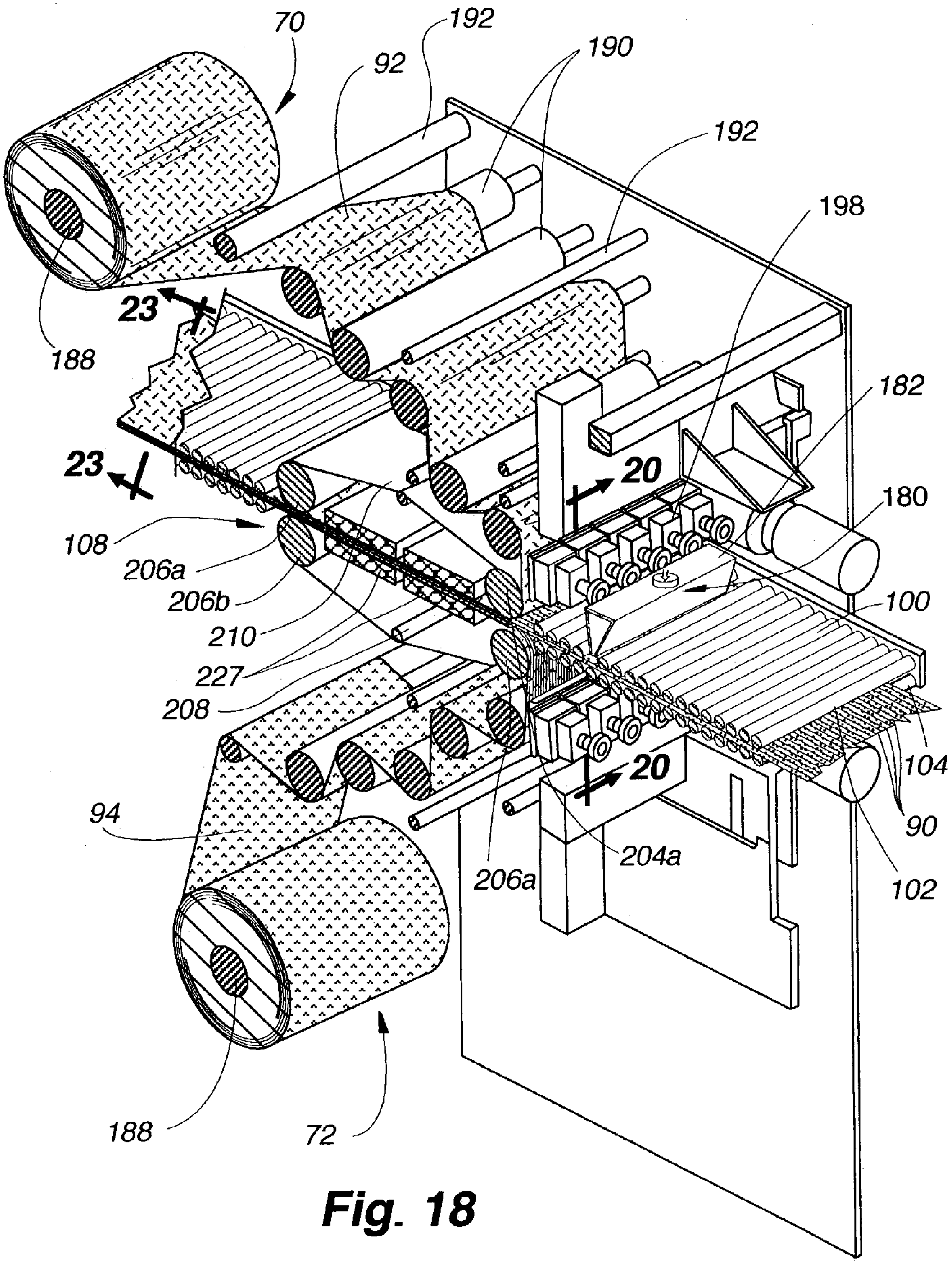
FIG. 18 is a fragmentary isometric looking at the laminating station.
Figure 19:
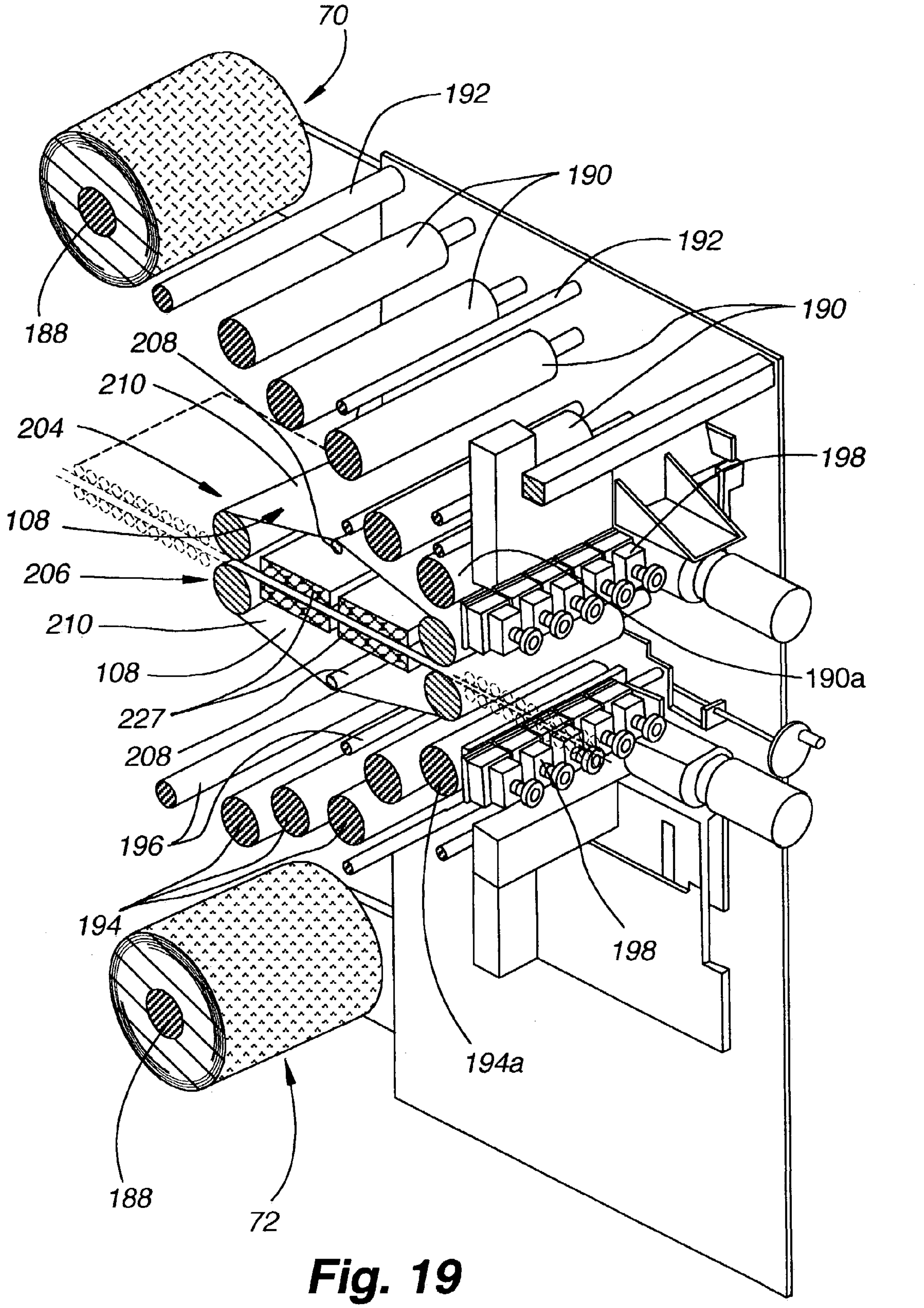
FIG. 19 is a view similar to FIG. 18 with parts removed for clarity.
Figure 20:
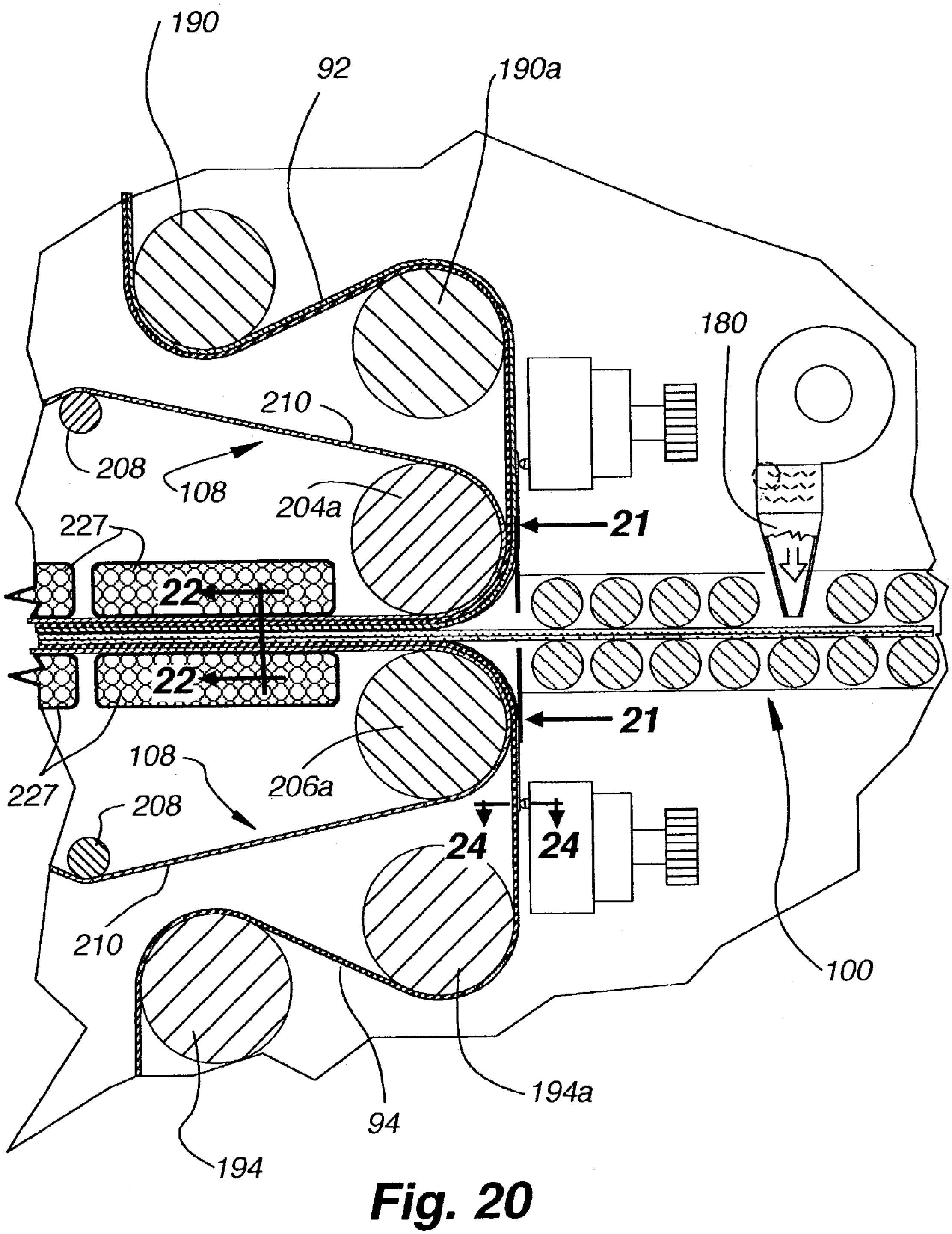
FIG. 20 is an enlarged fragmentary section taken along line 20—20 of FIG. 18.

As probably best seen in FIGS. 18 and 19, the cellular structures 90 are fed from the idler roller conveyor 100 directly into the space between the drive belts 210 at the upstream end of the laminating station 68 and at that location are engaged on the top and bottom by the upper sheet material 92 and lower sheet material 86 respectively which have just passed around the associated drive rollers 204*a* and 206*a* at the upstream end of the belt-drive system 108. Of course, the beads of bonding material have also just been applied to the sheet material and the folded cellular structures 90 are still warm from passing between the air heaters 176 and 180. Therefore, immediately upon engagement of the sheet material with the cellular structures, they are secured together with the cellular structures in adjacent side-by-side relationship and between the upper and lower sheets of material. The bonding process is enhanced by the fact that the cellular structures have been pre-heated and thereby serve to accelerate the adhesion between the sheet materials and the folded cellular structures. Also due to the fact that the cellular structures in the described embodiment are made of a fiber glass matting which is somewhat porous, capillary action derived from the porous folded material of the cellular structures draws the bonding medium into the cellular structure material for positive bonding.

Immediately after the upper and lower sheet materials have been bonded to the folded cellular structures, the laminate structure 202 is advanced downstream by the drive belts 210 through two pairs of cooling manifolds 227 (FIGS. 18, 19 and 20) with each pair of cooling manifolds having a component above and below the laminate so as to rapidly set the bonding material. The spacing between the drive belts 210 is predetermined so as to be slightly greater than the thickness of a fully compressed laminate formed by the upper and lower sheet materials and the cellular structures confined therebetween. In this manner, the cellular structures 90 are allowed to expand slightly thereby pressing the upper and lower sides 170 and 168 respectively of the cellular structures against the beads of bonding material on the upper and lower sheet materials while allowing the bonding material to penetrate the cellular structures for an optimal bond.

Figure 21:
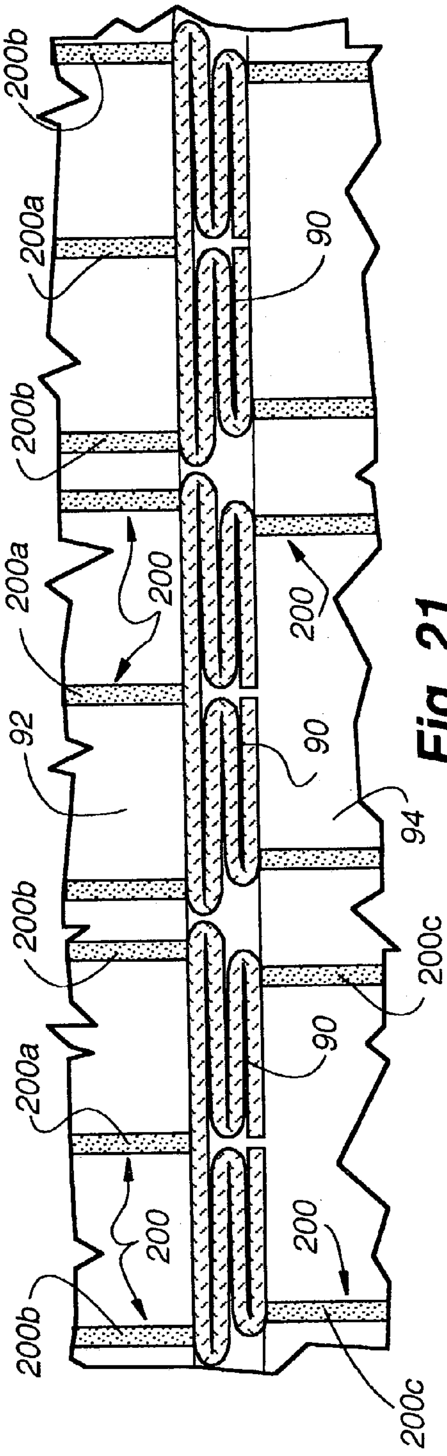
FIG. 21 is an enlarged section taken along line 21—21 of FIG. 20.

FIG. 21 shows the upper 92 and lower 94 sheets of material being fed onto opposite faces of cellular structures 90. Three beads lines of bonding material 200*a* and 200*b* on the upper sheet are shown aligned with each cellular structure and two beads lines of bonding material 200*c* on the lower sheet are shown aligned with each cellular structure. The location of the beads of bonding material relative to each cellular structure can be fully appreciated.

Figure 22:
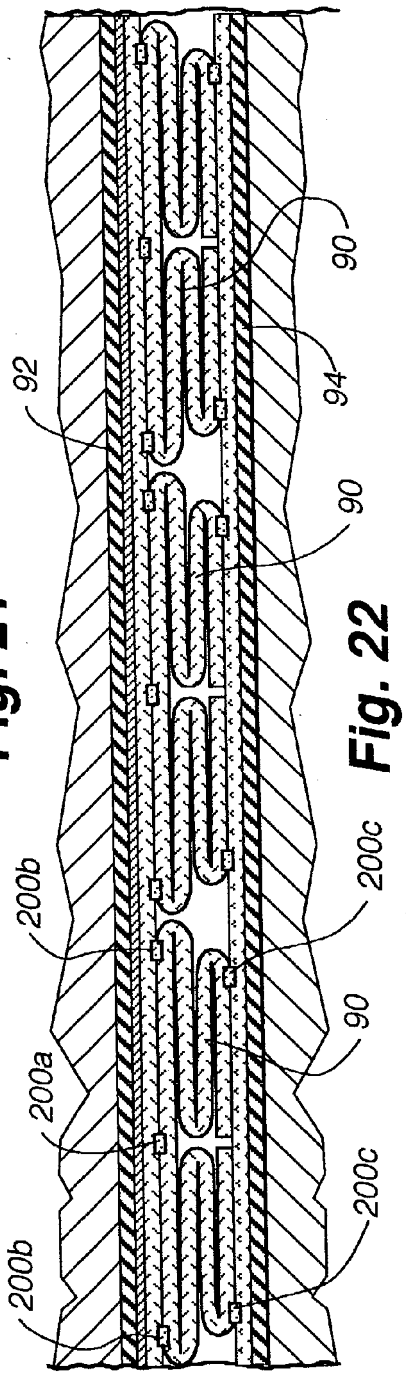
FIG. 22 is an enlarged section taken along 22—22 of FIG. 20.

FIG. 22 is a section taken through the cooling station where the cellular structures 90 with the upper 92 and lower 94 sheets of material bonded thereto are positioned between the drive belts 210. The location of the beads or lines of bonding material can again be appreciated.

Figure 23:
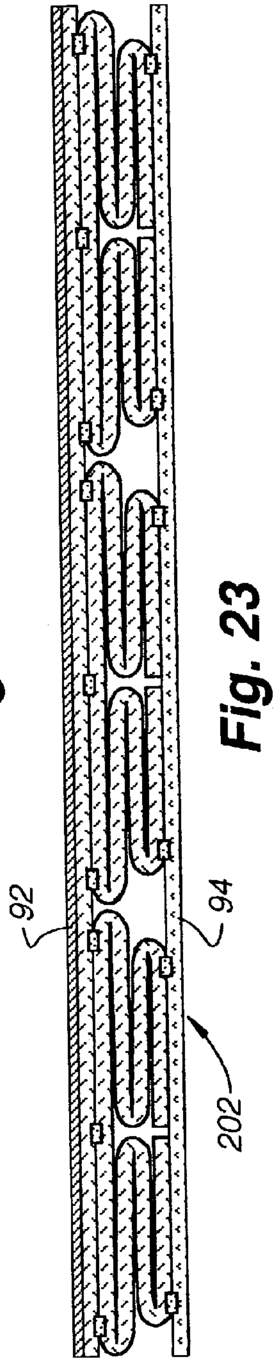
FIG. 23 is an elongated section taken along line 23—23 of FIG. 18.

FIG. 23 is a section similar to FIG. 22 of the compressed laminate structure 202 removed from the apparatus. The laminate structure can be seen to have a double ply upper sheet 92 of material bonded to underlying cellular structures 90 and a single ply lower sheet 94 bonded to the underside of the cellular structures.

Figure 25:
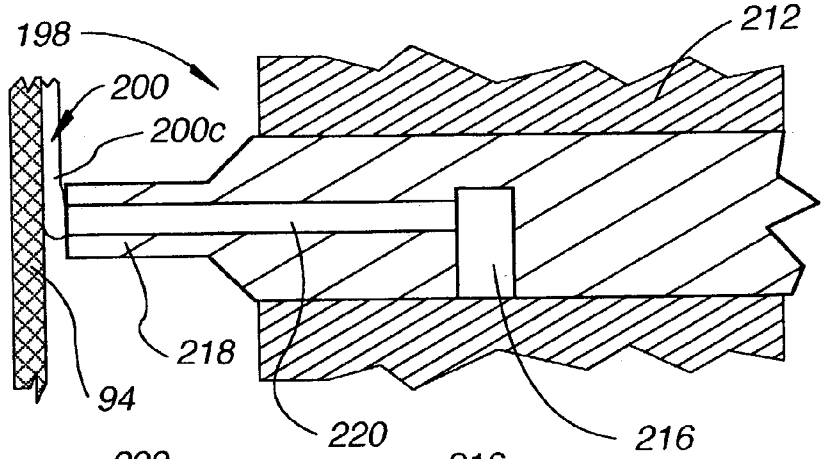
FIG. 25 is a section taken along line 25—25 of FIG. 24.
Figure 24:
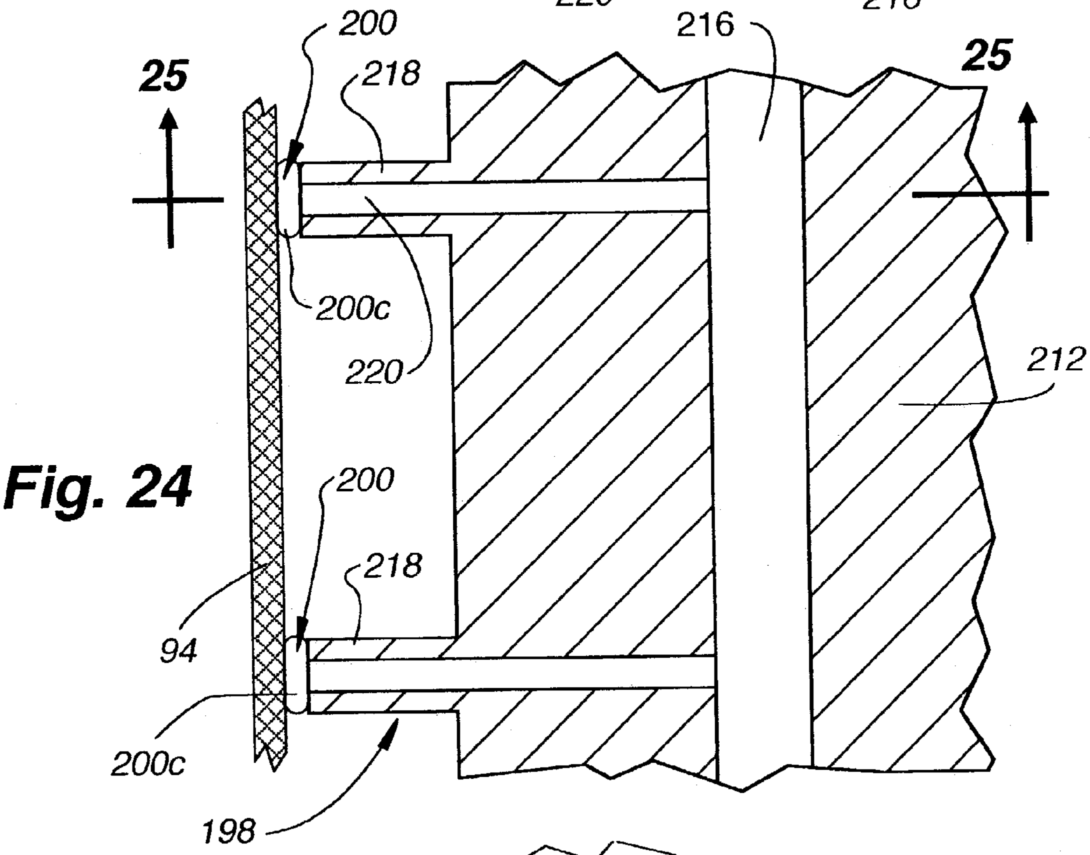
FIG. 24 is an enlarged section taken along line 24—24 of FIG. 20.
Figure 25A:
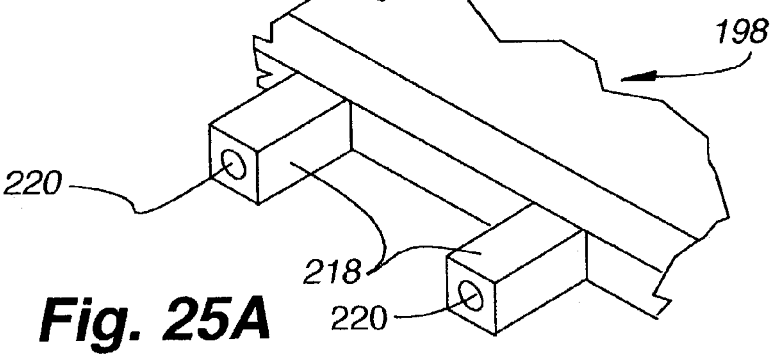
FIG. 25A is a fragmentary isometric showing injection nozzles for the bonding medium.
Figure 26:
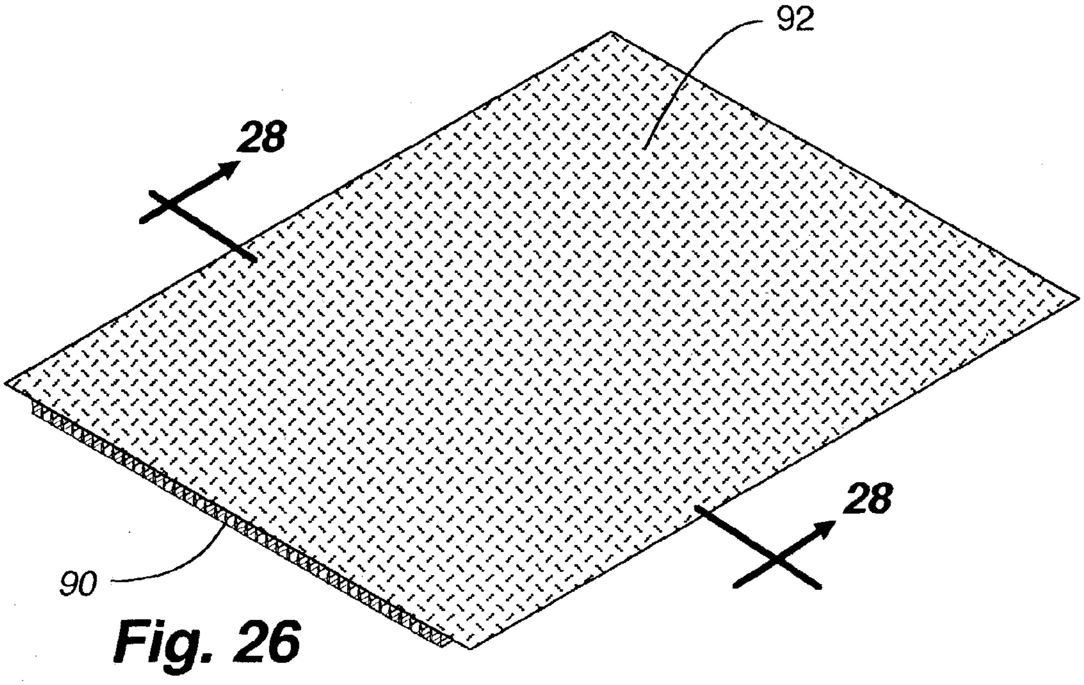
FIG. 26 is an isometric locking at the top of an incomplete panel.
Figure 27:
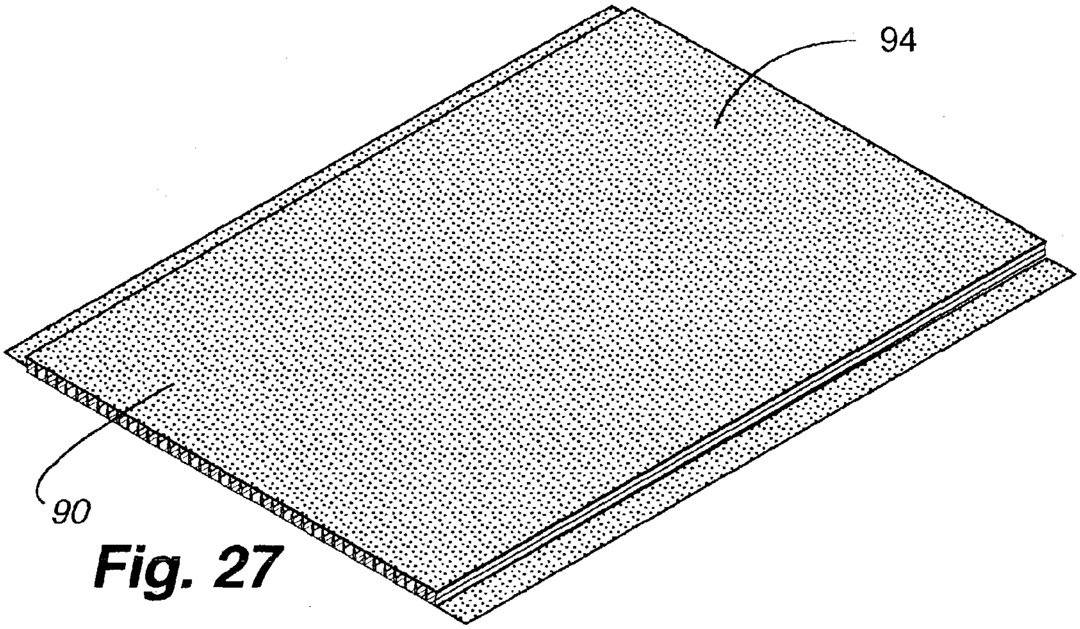
FIG. 27 is an isometric locking at the bottom of the panel of FIG. 26.
Figure 29:
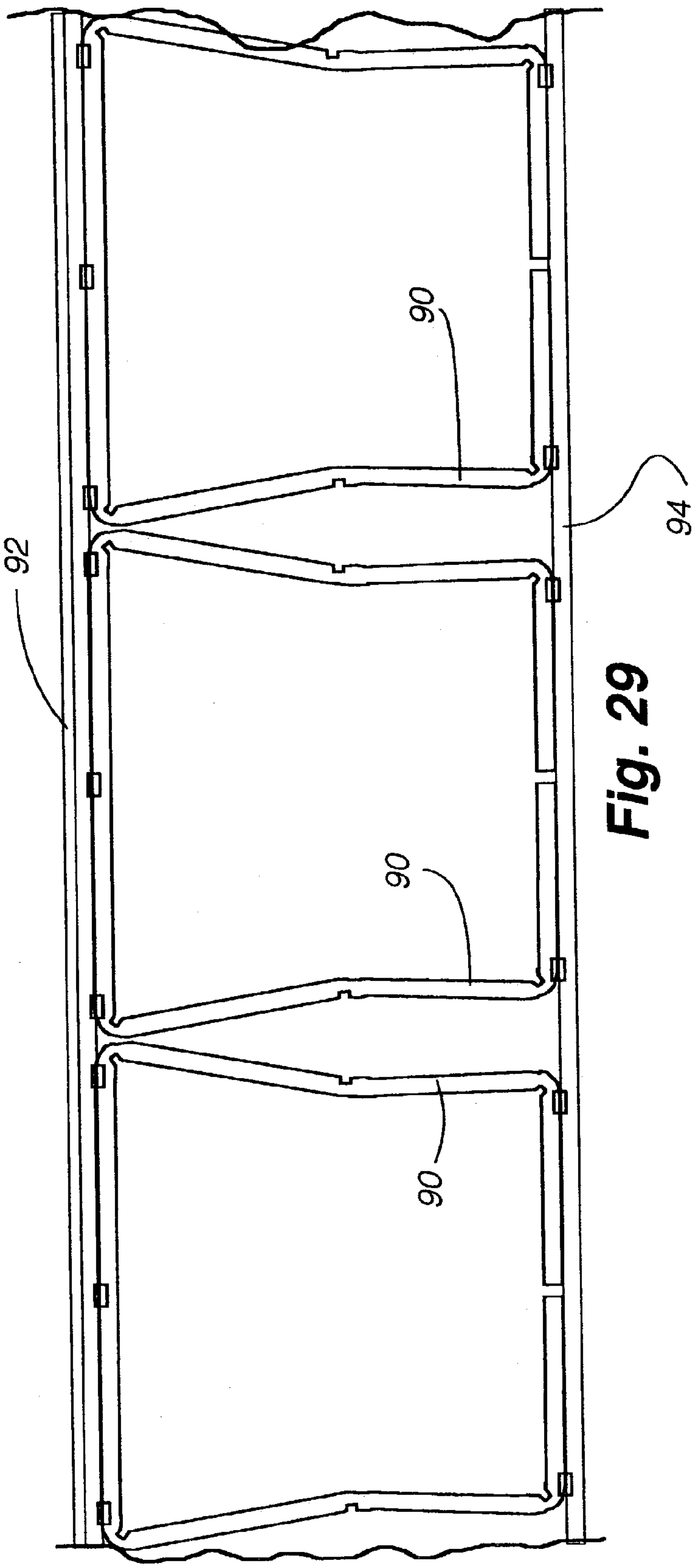
FIG. 29 is a further enlarged fragmentary section similar to FIG. 28.
Figure 28:
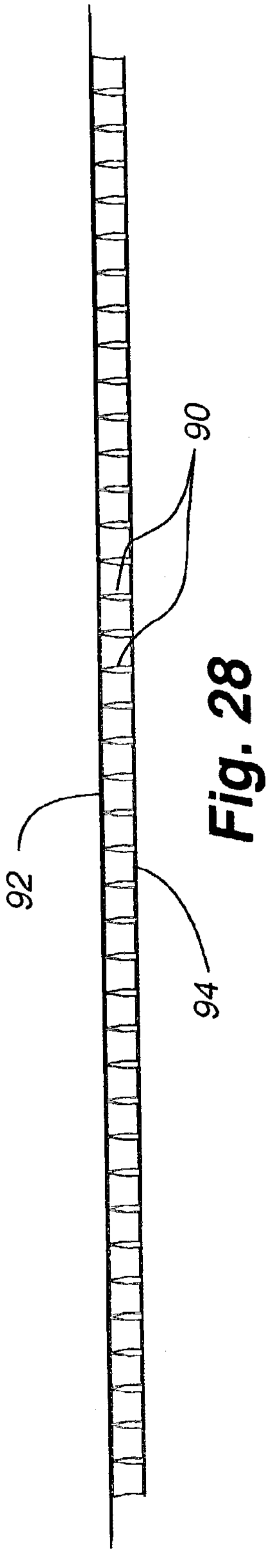
FIG. 28 is an enlarged section taken along line 28—28 of FIG. 26.

FIGS. 24, 25, and 25A illustrate the bonding medium applicator station 74 and upper and lower manifolds 212 utilized to dispense the elongated beads of a bonding material onto the upper and lower sheets of material. The bonding medium applicator 198 illustrated is for use in connection with the lower sheet of material 94 even though the bonding medium applicator for the upper sheet 94 is identical while being inverted and having ejection heads at different locations. The bonding medium applicator can be seen to include the elongated manifold 214 having a hollow longitudinally extending main passage 216 therein with the manifold extending transversely of the apparatus. At predetermined spaced intervals along the length of the manifold, ejection heads 218 pointed in a downstream direction are formed at locations where beads of bonding material are to be applied to the adjacent sheet material. Each ejection head 218 is connected by an internal hollow minor passageway 220 to the main passage 216 in the manifold so that the bonding medium carried by the main passage under pressure will be uniformly dispensed through the minor passage 220 and ejection heads onto the adjacent sheet material. The pressure in the main passage 216 of the manifold can be maintained in any conventional manner such as with a pressure pump 222 (FIG. 1A). The width of the ejector heads 218 are important to obtaining a desired width and uniformity in the bead of bonding material formed thereby and in the preferred embodiment, the ejector head is of square cross-section, being approximately 2.54 mm. on a side with the minor passageway 220 being approximately 1 mm. in diameter The ejector heads are positioned in abutting engagement with the sheet material so that the pressure under which the bonding material is ejected against the sheet material dictates the desired thickness of the bead which in the preferred embodiment is approximately 1 mm.

As can be seen in FIG. 1A, a supply hopper 224 for the bonding material and the pump 222 can be positioned adjacent to one side of the apparatus with pressurized flow lines 226 directed to the upper and lower manifolds 212 so that the pressure in each manifold is uniform and can be desirably controlled for uniform application of the bonding material to the adjacent sheets of material. By way of example, the bonding material could be a hot melt adhesive which is ejected onto the sheet material in a hot state or could be a plastic material that is extruded in an elongated bead-like form onto the sheet like material. In either form, the ejector heads could be as illustrated.

As mentioned previously, the two pairs of upper and lower coolers 227 are positioned within the drive belts 210 to initially set the bonding material for the initial bond of the upper and lower sheet material to the cellular structures.

It will be appreciated that in accordance with the present invention, a laminate is formed without the use of significant heat and pressure after the laminate layers are assembled. The use of significant heat and pressure is common in laminating processes. In fact, while the assembled layers are under enough pressure to keep the cellular structures partially compressed, the pressure is moderate and there is no heat applied after assembly of the layers into the laminate to reactivate the bonding medium.

It should be noted that while the preferred system for securing the sheet material to the cellular structures described above is through use of a bonding material, those skilled in the art would recognize other suitable systems for securement could also be used.

Side Edge Folding Station

Figure 1C:
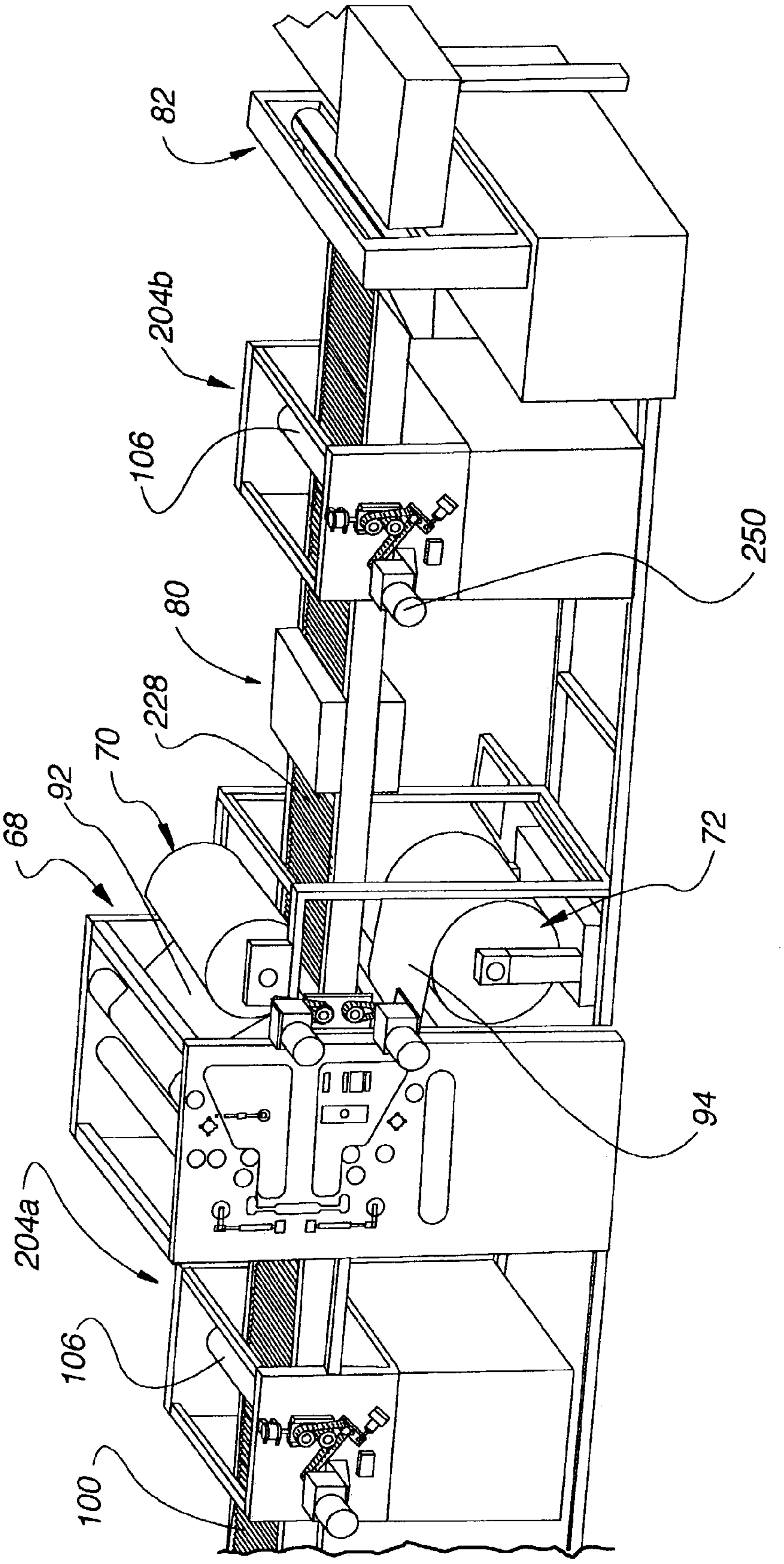
FIG. 1C is a fragmentary isometric looking at the downstream end of the apparatus from the opposite side of that of FIG. 1A.

Immediately after emanating from the laminating station 68, the bonded laminate 202 is passed into a second or downstream idler roller conveyor 228 (FIGS. 1A and 1C) which confines the laminate between upper 230 and lower 232 runs of idler rollers during the final set of the bonding medium. The downstream idler roller conveyor 228 guides the laminate to the side edge folding station 80 where lateral sides of the continuous laminate are finished.

Figure 30:
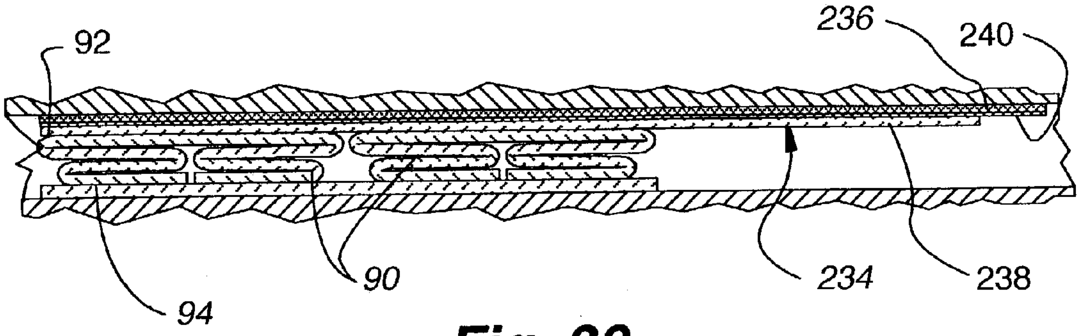
FIG. 30 is an enlarged fragmentary section taken along line 30—30 of FIG. 31A.
Figure 31:
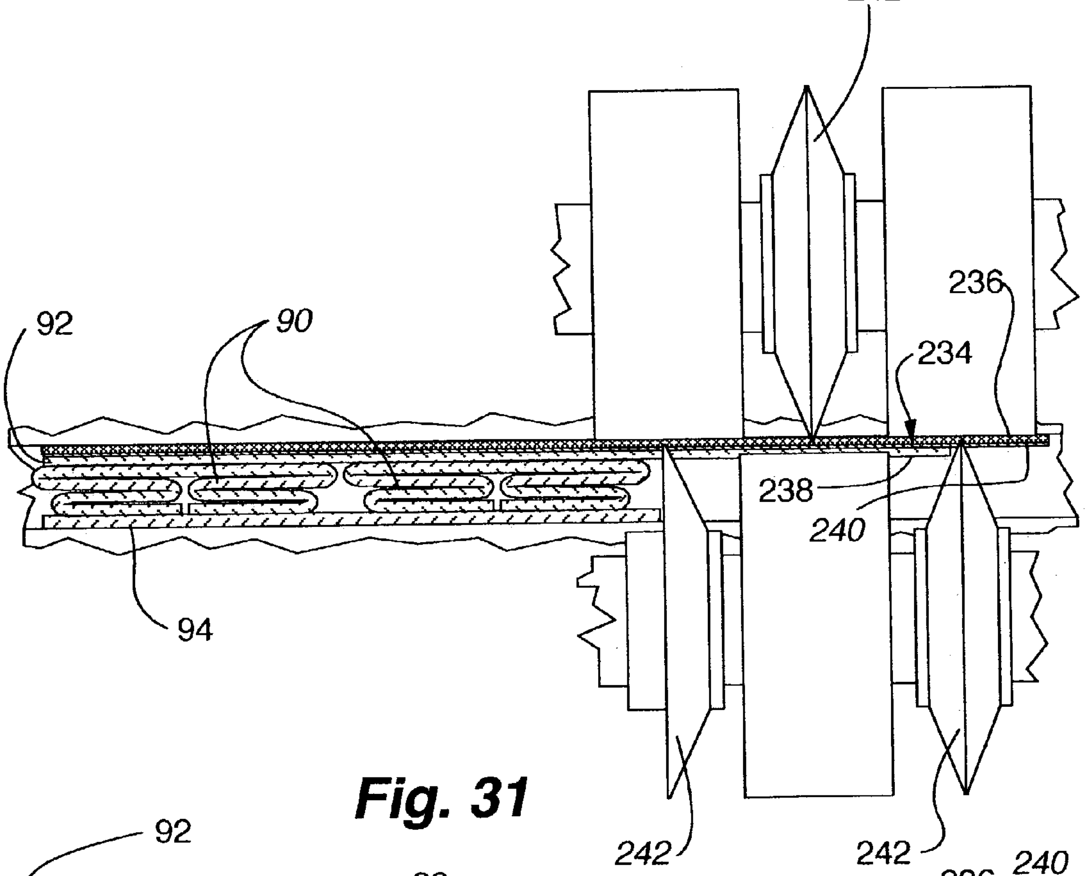
FIG. 31 is an enlarged fragmentary section taken along line 31—31 of FIG. 31A.
Figure 32:
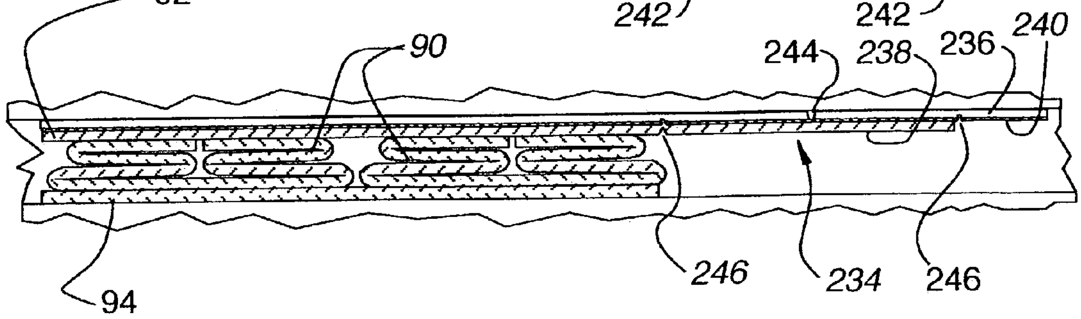
FIG. 32 is an enlarged fragmentary section taken along line 32—32 of FIG. 31A.
Figure 31A:
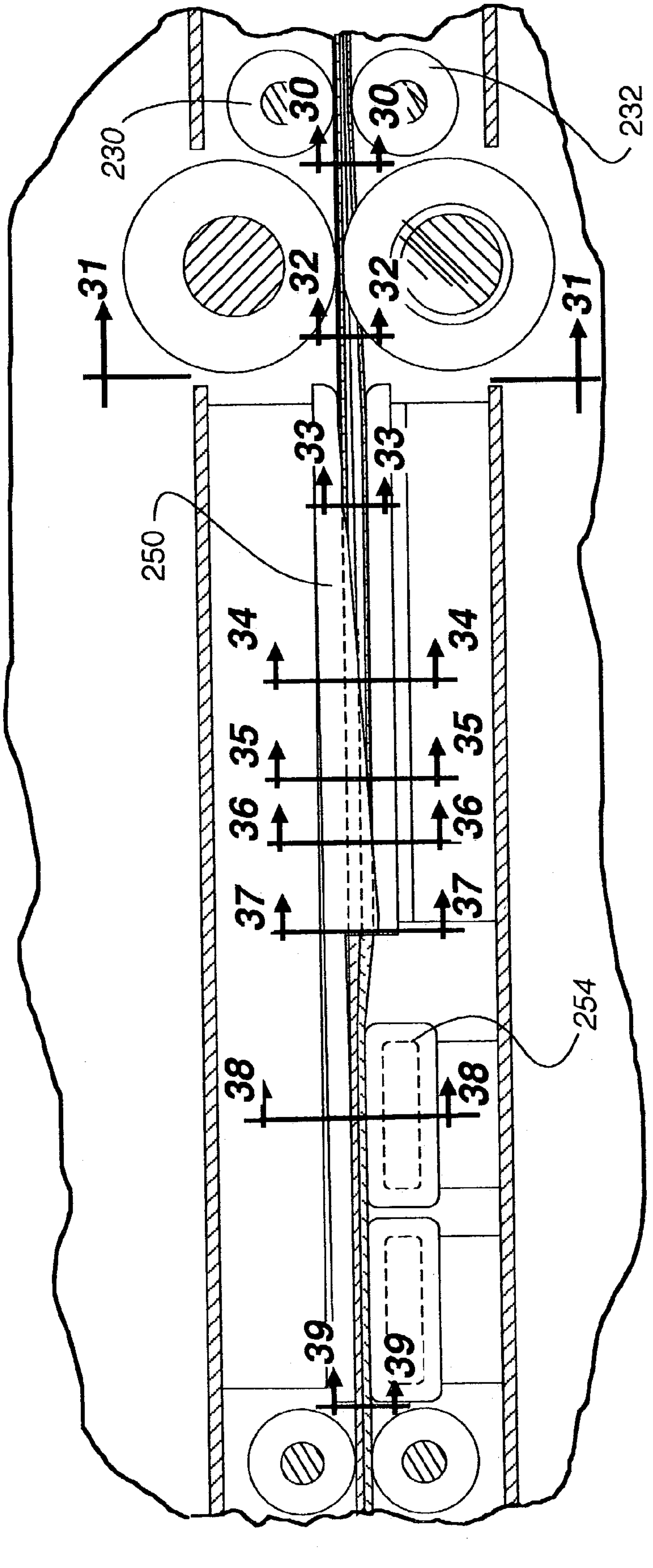
FIG. 31A is a fragmentary diagrammatic vertical section taken through the side forming station of the apparatus.

As can be appreciated by reference to FIGS. 30 through 32, the upper sheet material 92 is slightly wider than the lower sheet material 94 by a predetermined amount so as to overhang opposite lateral sides of the cellular structures 90. The overhangs referred to as marginal zones 234 are used to cover and finish the otherwise exposed lateral sides of the outermost cellular structures in the laminate. As previously noted, the upper sheet is a laminate itself with the upper layer 236 of the laminate sheet being slightly wider than the lower layer 238. The adhesive 240 that bonds the upper and lower layers 236 of the upper sheet is exposed where the upper layer 238 extends beyond the lower layer and as will be appreciated hereafter, the exposed adhesive is used to secure the marginal zones 234 to the bottom surface of the lower sheet material 94.

Figure 33:
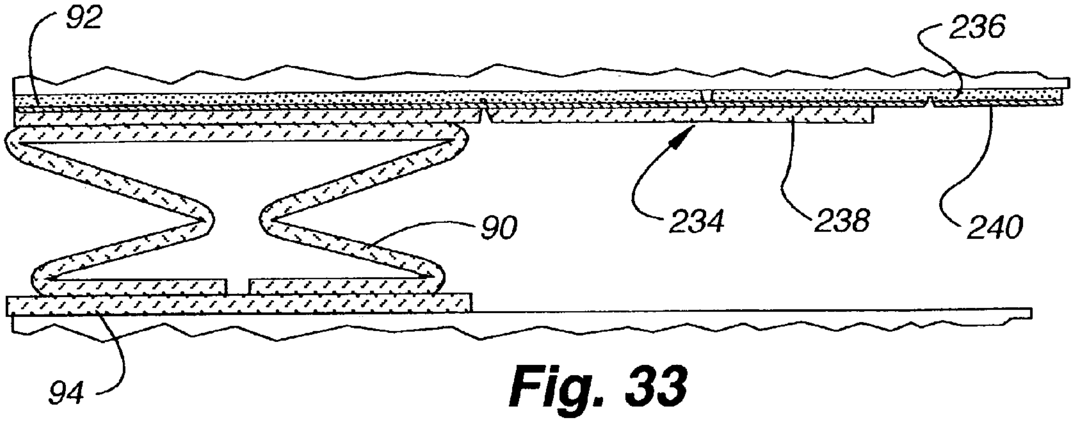
FIG. 33 is an enlarged fragmentary section taken along line 33—33 of FIG. 31A.

In order to properly condition the marginal zones 234 for covering the lateral sides of the laminate, they are first precreased in the downstream idler roller conveyor 228 with creasing rollers as shown in FIG. 31. A crease 244 is provided in the upper surface of each marginal zone at a location 242 approximately along the longitudinal center line of the marginal zone and a crease 246 is placed in the undersurface of the marginal zone close to each edge of the marginal zone. The creases 244 and 246 establish lines for folding the marginal zones downwardly along the sides of the laminate structure. The creasing takes place in the upstream end of the side edge folding station 80 and after the marginal zones have been creased, they are continuously folded by contoured surfaces 248 of folding blocks 250 on opposite sides of the downstream idler roller conveyor as shown in FIGS. 31A and 33 through 40. With reference to FIG. 33, it will be seen that the laminate structure 202 has been allowed to expand partially from its fully compressed condition prior to folding the marginal zones. While only one side edge of the laminate is shown, it is understood that an identical process is applied to both sides of the laminate so that both sides are simultaneously and desirably folded and finished.

Figure 34:
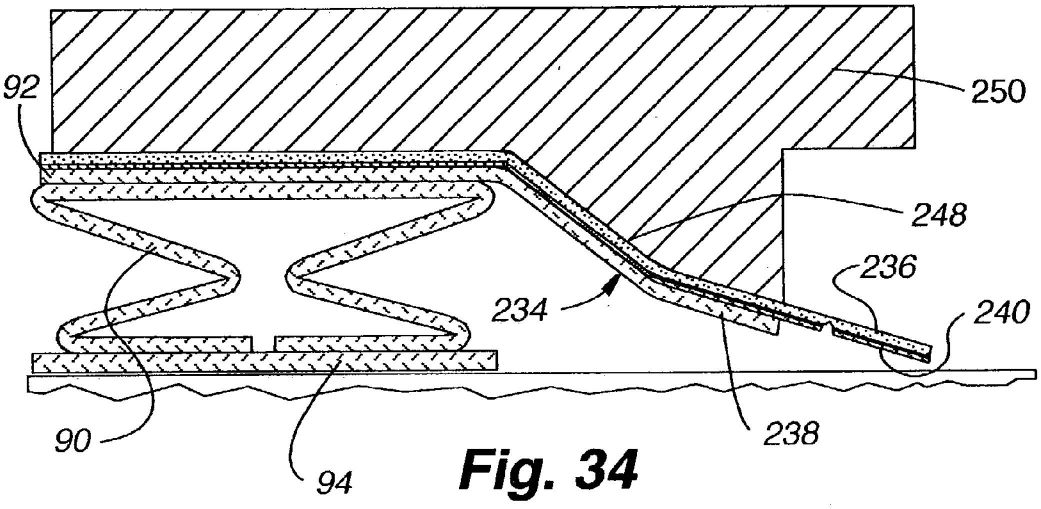
FIG. 34 is an enlarged fragmentary section taken along line 34—34 of FIG. 31A.
Figure 35:
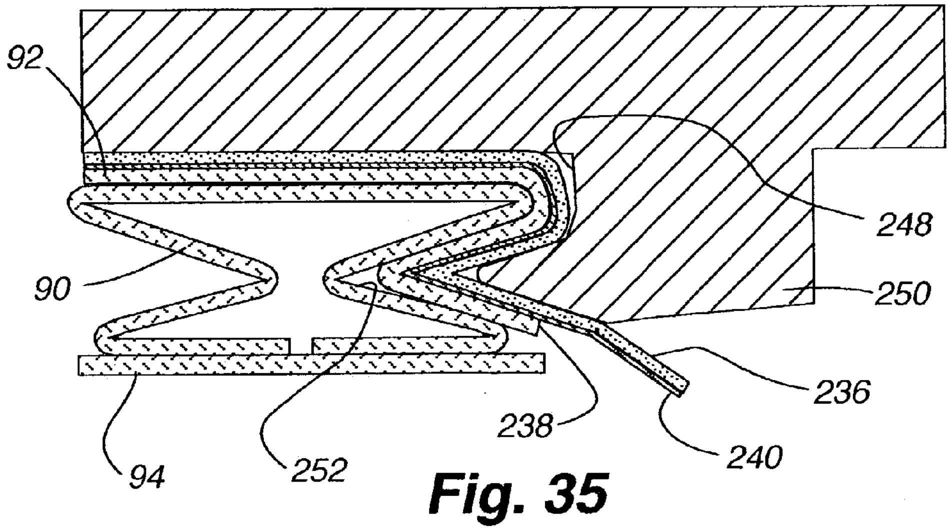
FIG. 35 is an enlarged fragmentary section taken along line 35—35 of FIG. 31A.
Figure 36:
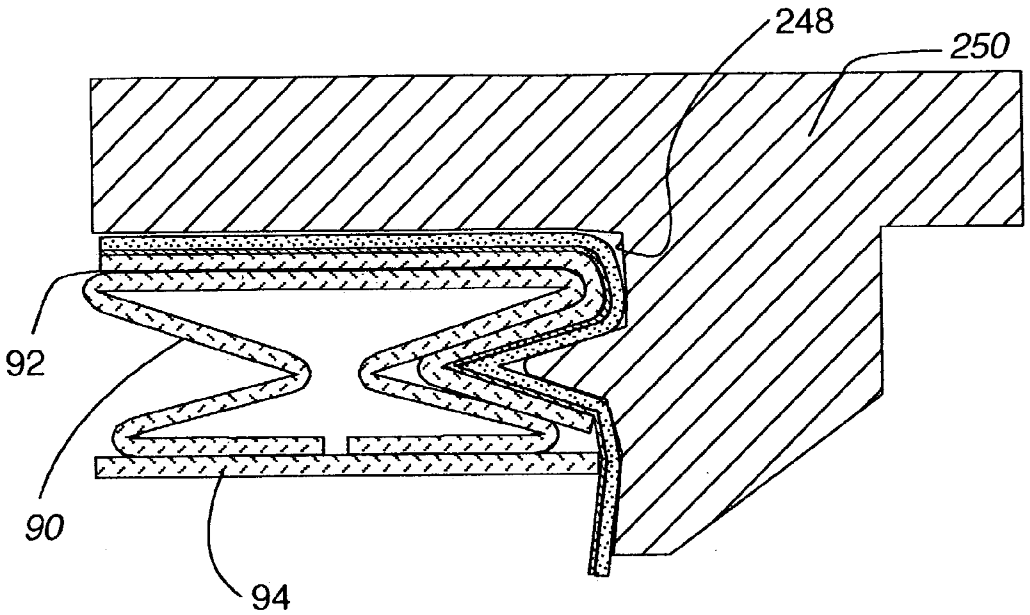
FIG. 36 is an enlarged section taken along line 36—36 of FIG. 31A.
Figure 37:
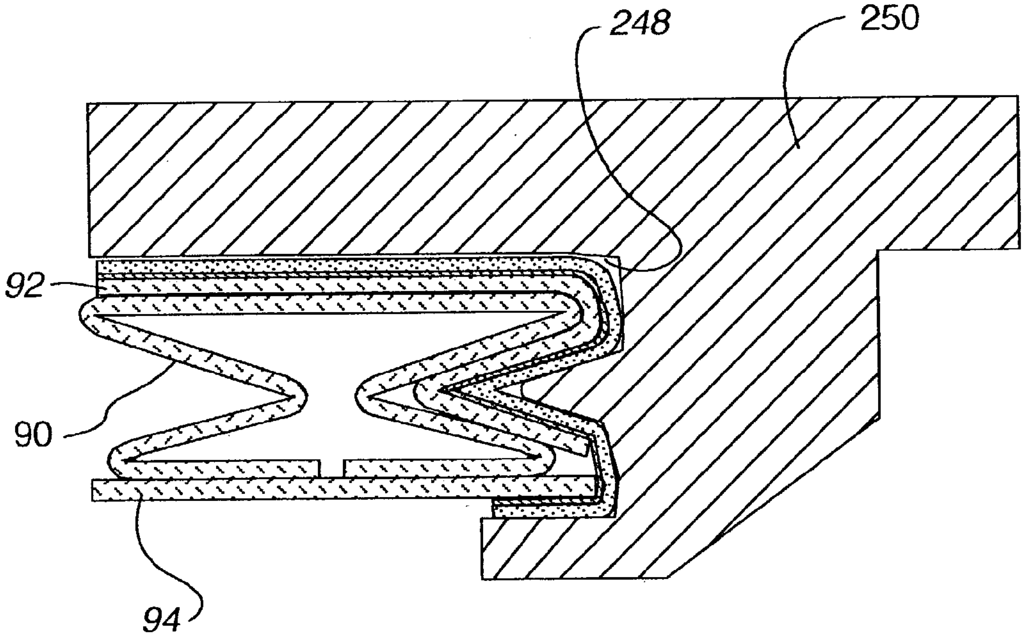
FIG. 37 is a enlarged fragmentary section taken along line 37—37 of FIG. 31A.
Figure 38:
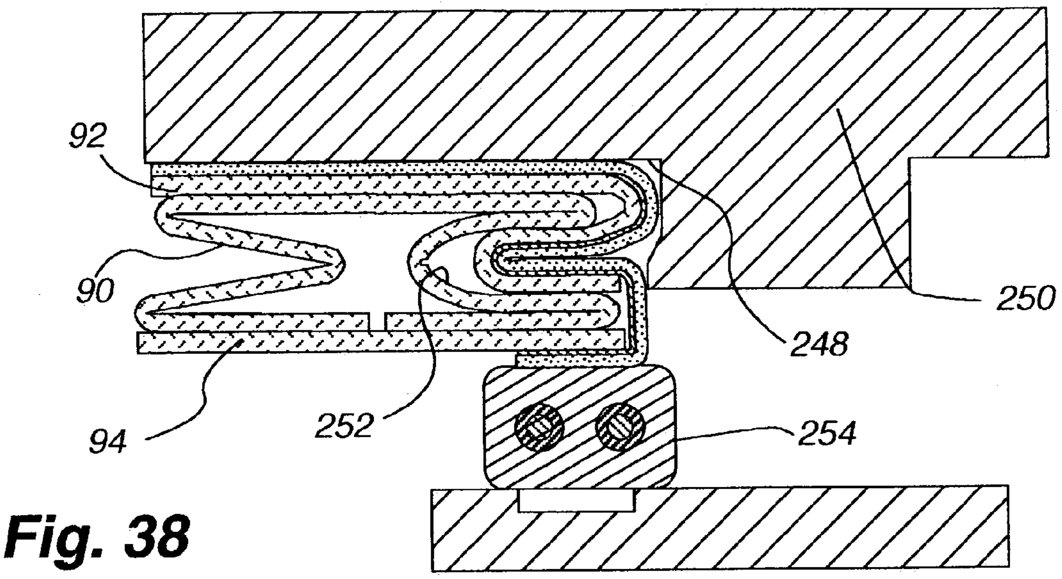
FIG. 38 is an enlarged fragmentary section taken along line 38—38 of FIG. 31-A.
Figure 39:
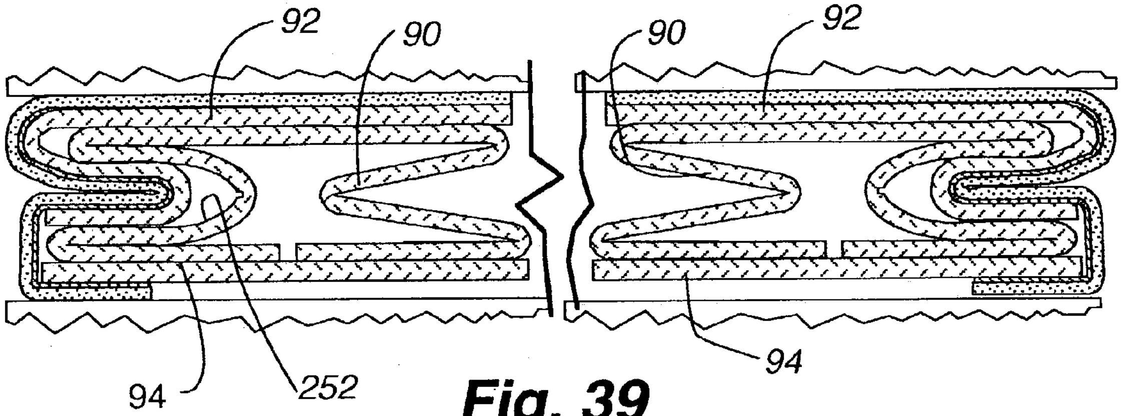
FIG. 39 is an enlarged fragmentary section taken along line 39—39 of FIG. 31B.

In FIG. 34, the laminate structure 202 has moved downstream slightly in the side edge folding station 80 and encountered the contoured surface 248 of a folding block 250 which forces the marginal zone 234 downwardly and begins to fold it at a predetermined location adjacent to the outermost cellular structure 90 in the laminate. Further downstream, at a location where the section view seen in FIG. 35 is taken, the contoured surface 248 has further lowered and folded the marginal zone and inserted a portion of the marginal zone into a recess 252 defined in the side of the adjacent cellular structure. At a location further downstream, as illustrated in FIG. 36, the marginal zone is moved along its most distal edge into close relationship with the adjacent cellular structure and as shown in FIG. 37 at a location even further downstream, the contoured surface is seen to be confining the marginal zone in substantially contiguous relationship with the outermost side of the adjacent cellular structure and wrapping it beneath the lower sheet 94 of the laminate structure. As mentioned previously, the adhesive 240 on the underside of the upper sheet 92 is used to secure the marginal zones to the bottom surface of the lower sheet 94 of the laminate structure. The adhesive is seen in FIGS. 33 through 39 and can be heat activated to bond the marginal zones to the lower sheet where it is wrapped beneath the lower sheet. The heat is applied with a heated anvil 254, as shown in FIG. 38. The heat applied by the anvil is sufficient to bond the marginal zone to the underside of the lower sheet 94 and thereby establish a side finish to the laminate structure that is aesthetically the same as the top surface of the laminate structure.

Figure 40:
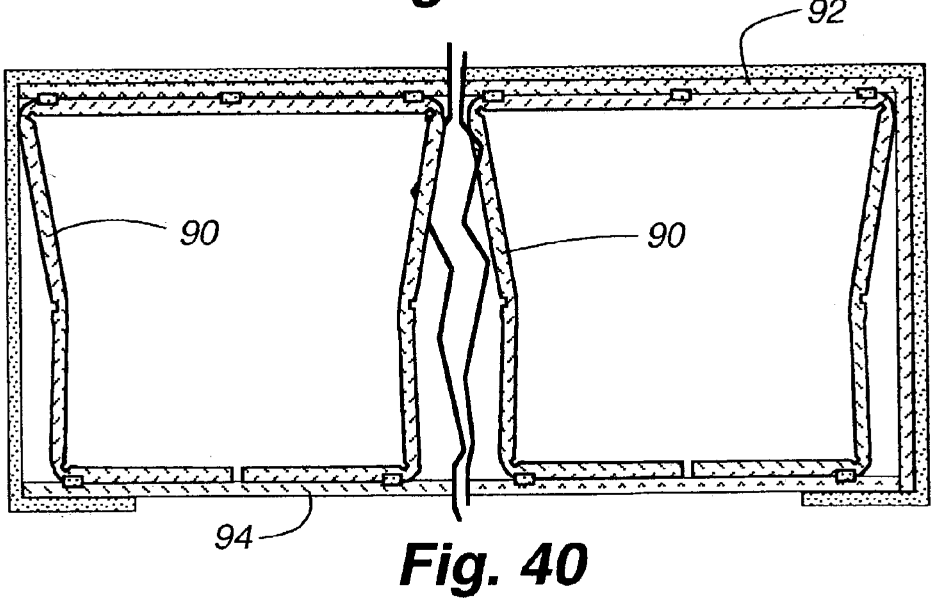
FIG. 40 is an enlarged fragmentary section similar to FIG. 39 with the cellular cellular structures expanded.

FIG. 40, shows the laminate structure expanded with the sides finished. As will be appreciated, the sides of the laminate structure formed from the marginal zones 234 are flat and perpendicular to the top and bottom sheets of material and are free of the adjacent cellular structures 90 so that the cellular structures are free to expand and be compressed without detrimentally affecting the side finish. However, when the laminate is compressed, the marginal zones fold into complementary relationships with the adjacent sides of the outermost cellular structures in the laminate.

After leaving the side edge folding station 80 with the lateral sides of the laminate 202 finished, the panel 84, as can be seen in FIG. 1A, is engaged with and between downstream drive rollers 204B that are identical to the upstream drive rollers 204*a* mentioned previously. The downstream drive rollers are positioned in a gap in the downstream idler roller conveyor 228 so that the upper and lower drive rollers 256 can be engaged with upper and lower surfaces of the laminate structure. The downstream drive rollers are driven by a motor 258 and conventional drive system (FIG. 1C) at a rate that is substantially the same as that of the drive belts 210 but slightly faster so that the drive belts do not force the laminate structure into the downstream drive rollers.

Cutting Station

After leaving the downstream drive rollers 204*b,* the laminate structure 202 is fed to the cutting station 82. The cutting station is simply a pair of upper 258 and lower 260 cylindrical rollers (FIGS. 1A, 2 and 3) between which the laminate passes. The upper roller has a cutting blade 262 extending along its length and therefore transverse to the path of travel of the bonded laminate 202 and the lower roller has a longitudinal groove 264 in its surface that is adapted to synchronously become aligned with the blade of the upper roller as the driven cutting rollers rotate in unison. Of course, as would be apparent to those skilled in the art, the circumference of the rollers and their rotating speed are predetermined to correspond with the desired length of the panels 84 being cut from the continuous laminate structure 202.

Edge Strip Applicator Station

Figure 41:
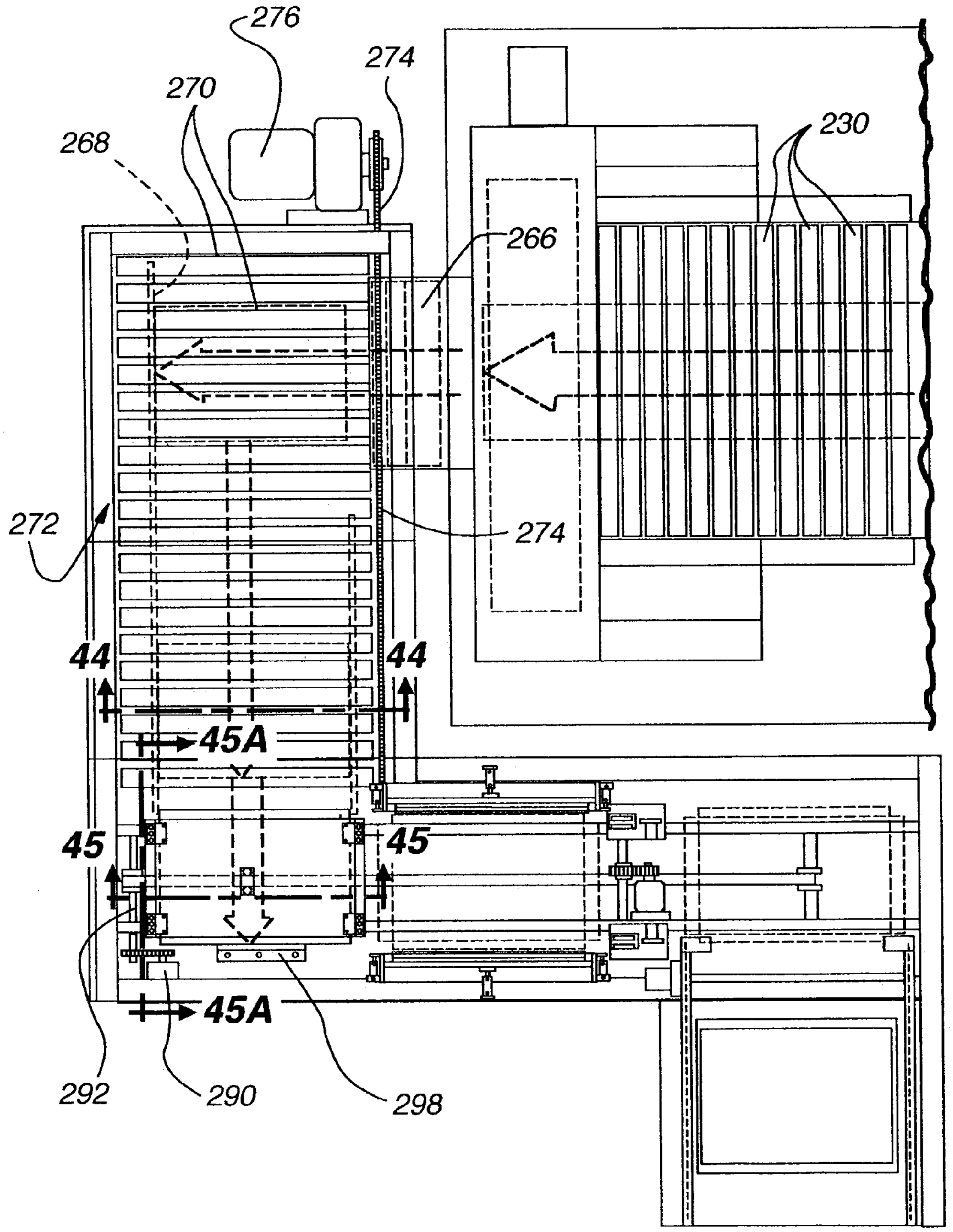
FIG. 41 a plan view of the downstream end of the apparatus of the present invention showing the edge strip applicator station.

As best seen in FIG. 41, the laminate structure 202 which has been cut into panels 84 of a predetermined length at the cutting station 82 is passed over a pair of accelerating rollers 266 at the downstream end of the cutting station with the rollers 266 being adapted to accelerate the cut panels in a downstream direction until they engage a side guide plate 268 in the edge strip applicator station 86. Upon engaging the side guide plate, the cut panels are disposed between upper and lower driven rollers 270 of a transverse roller conveyor 272 in the applicator station 86 adapted to transport the cut panels in a direction perpendicular to that at which they were delivered from the cutting station 82.

As probably best seen in FIG. 41, the driven rollers 270 in the transverse conveyor are driven at a predetermined speed by a drive belt 274 that drivingly engages an exposed end of the rollers with the belt being rotated by a motor 276 mounted at an upstream end of the transverse conveyor 272 on the frame therefore. The motor 276 is intermittently driven for reasons to become apparent hereafter and since cut panels are continuously delivered to the transverse conveyor but are intermittently moved along the transverse roller conveyor 272, a conventional accumulator for the panels, described hereafter as an alternative, could be incorporated into the apparatus. Such an accumulator could continuously receive cut panels from the cutting station and accumulate those panels in a bin, for example, from which they could be inserted into the transverse conveyor 272 for further processing.

Once a panel 84 is confined in the transverse conveyor 272, it is moved downstream of the transverse conveyor to a location where the rigid clips or strips 88 of material are applied to the ends of the panel which appear as lateral sides of the panel on the transverse conveyor. In other words, the ends of the panel are defined as opposite edges of the panels that expose the open ends of the cellular structures 90. Accordingly, when the panel is positioned on the transverse conveyor, the cellular structures extend transversely to the length of the transverse conveyor so that their open ends are adjacent the lateral sides of the transverse conveyor.

Figure 49:
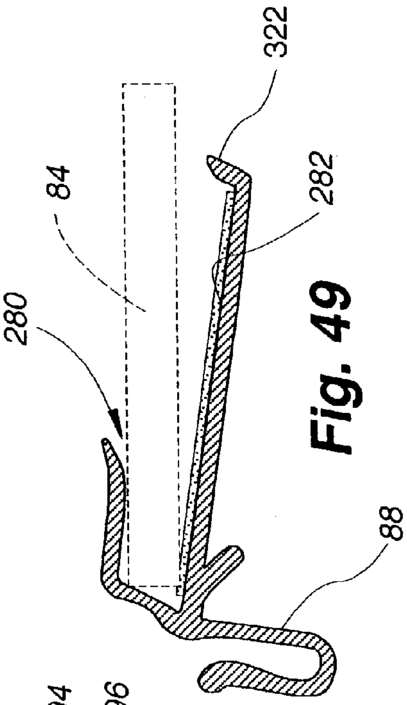
FIG. 49 is a transverse section taken through an edge strip with a panel shown in dashed lines.

The rigid clips 88 applied to the ends of the panel are disclosed in detail in the aforenoted application entitled Compressible Structural Panel, but as is probably best seen in FIG. 49, the clips in cross-section have a recess 280 that opens to one side to receive the end of a panel 84 (shown in dashed lines) and a strip of pre-applied adhesive 282 that engages the underside of the panel to become secured thereto. The edge applicator station 86 in the apparatus of the present invention is designed to mount the elongated clips on opposite ends of the panel in a manner to be described hereafter.

Figure 42:
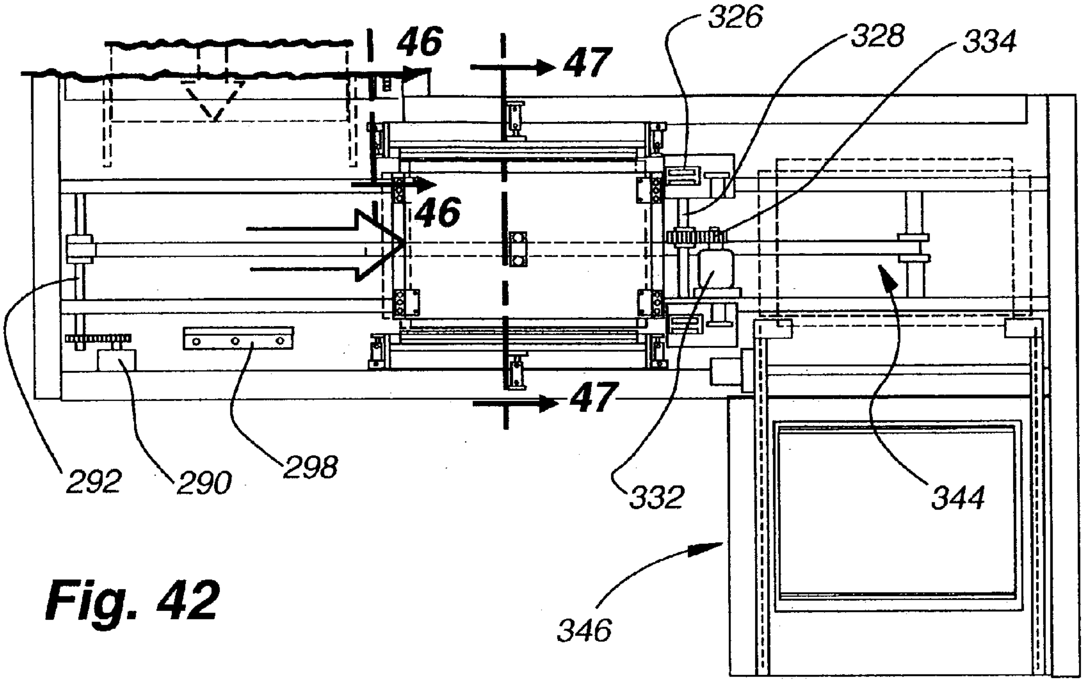
FIG. 42 is a view similar to FIG. 41 showing a smaller portion of the apparatus.
Figure 43:
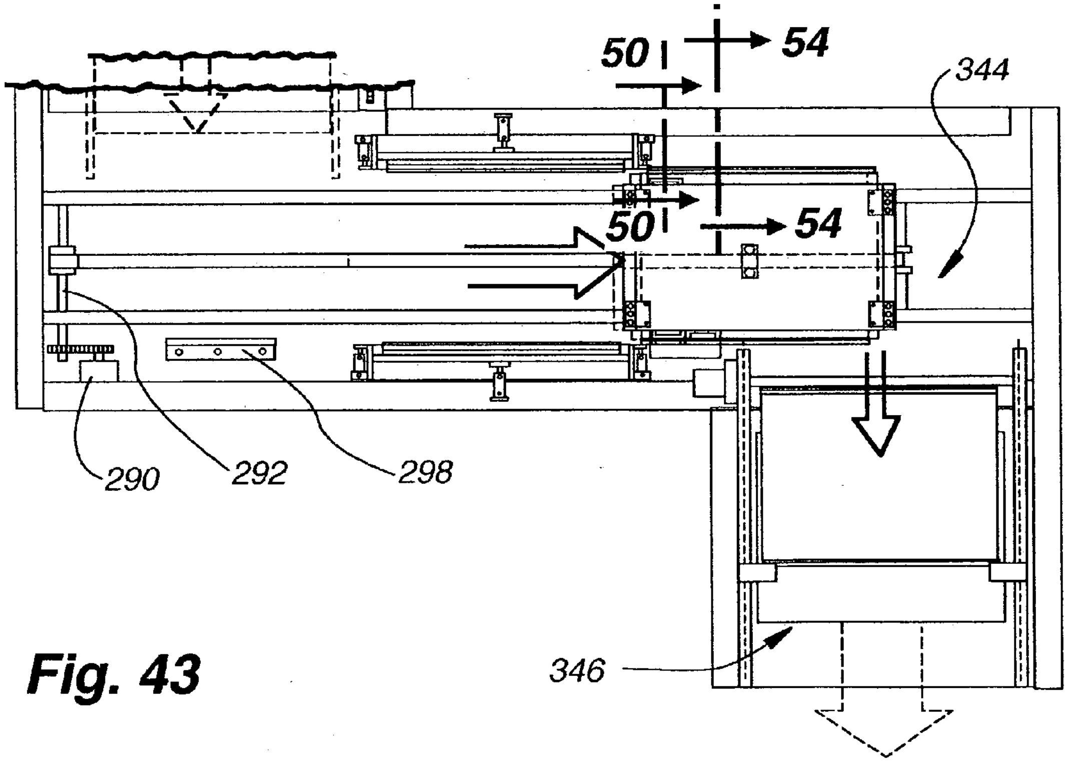
FIG. 43 is a view similar to FIG. 42 with a panel being processed at a different location.
Figure 44:
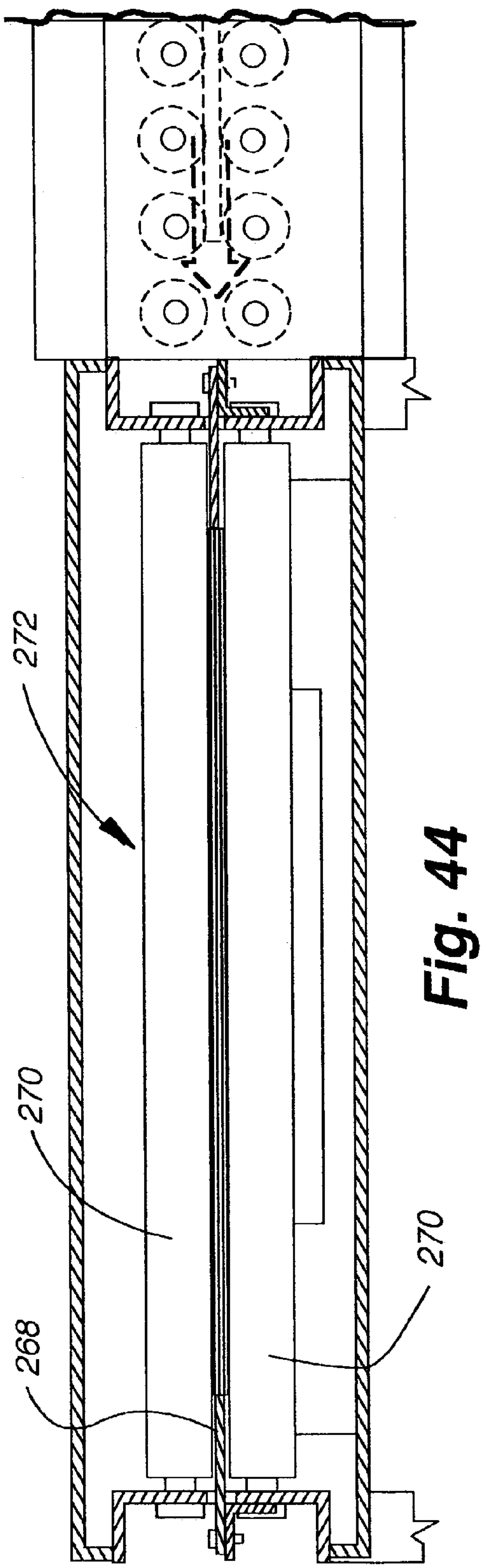
FIG. 44 is an enlarged fragmentary section taken along line 44—44 of FIG. 41.
Figure 45:
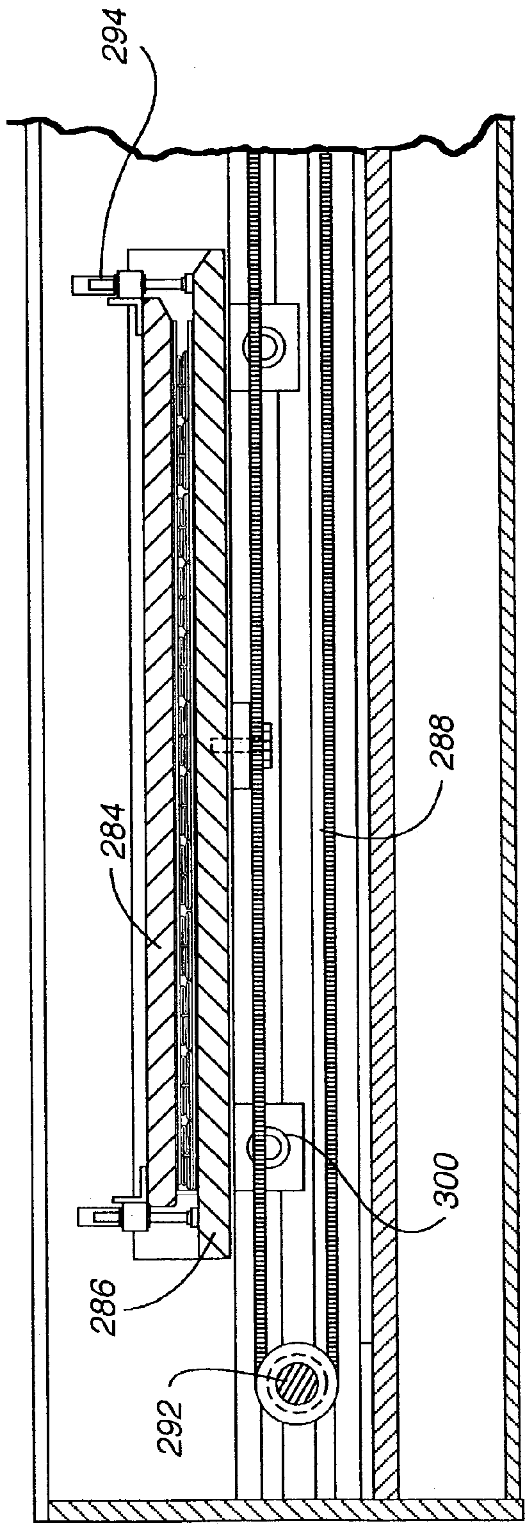
FIG. 45 is an enlarged fragmentary section taken along line 45—45 of FIG. 36C.
Figure 45A:
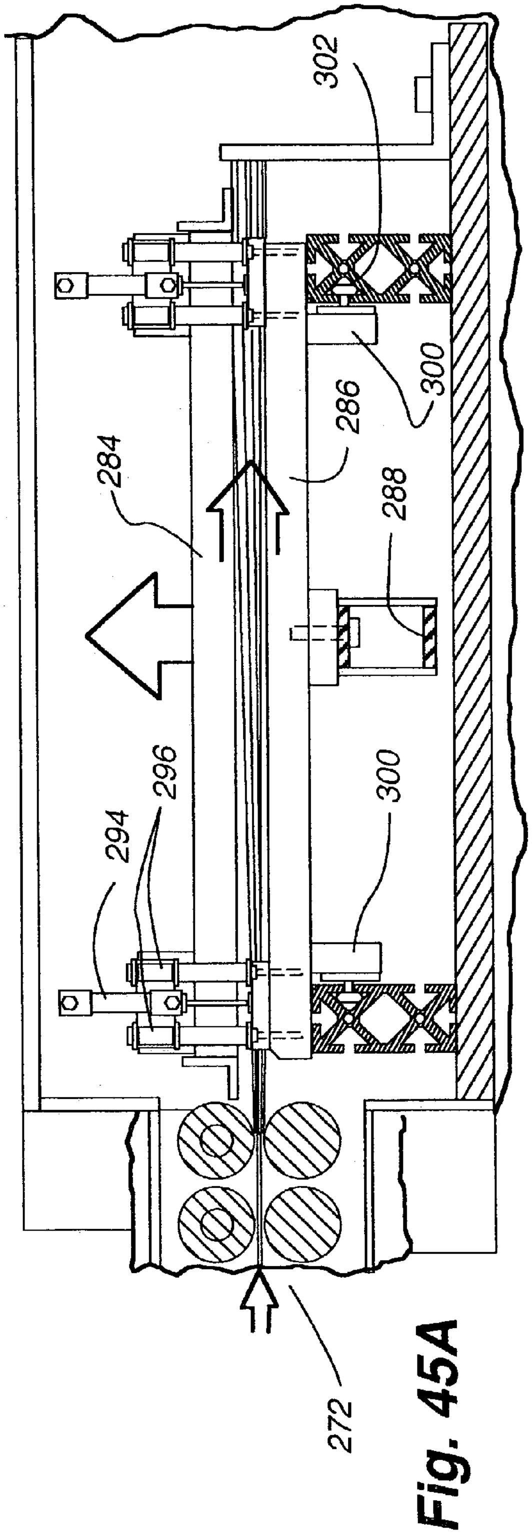
FIG. 45A is an enlarged fragmentary section taken along line 45A—45A of FIG. 41.
Figure 45B:
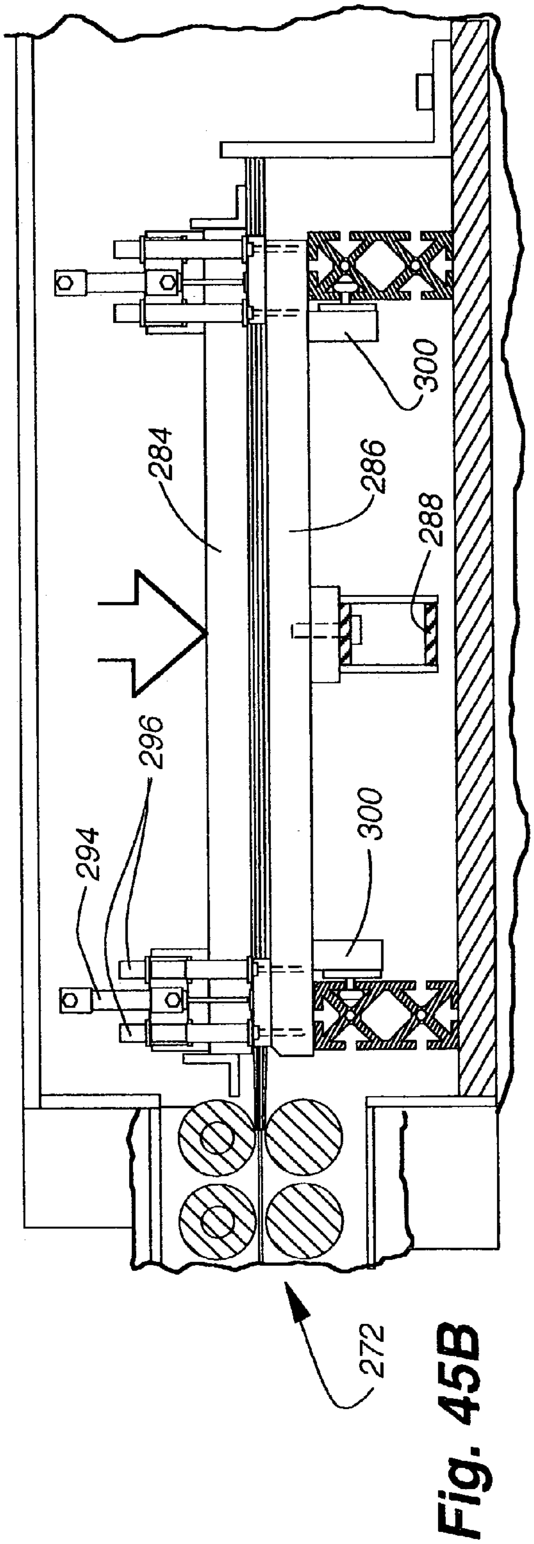
FIG. 45B is an enlarged fragmentary section similar to FIG. 45A with the compression plates compressed.
Figure 46:
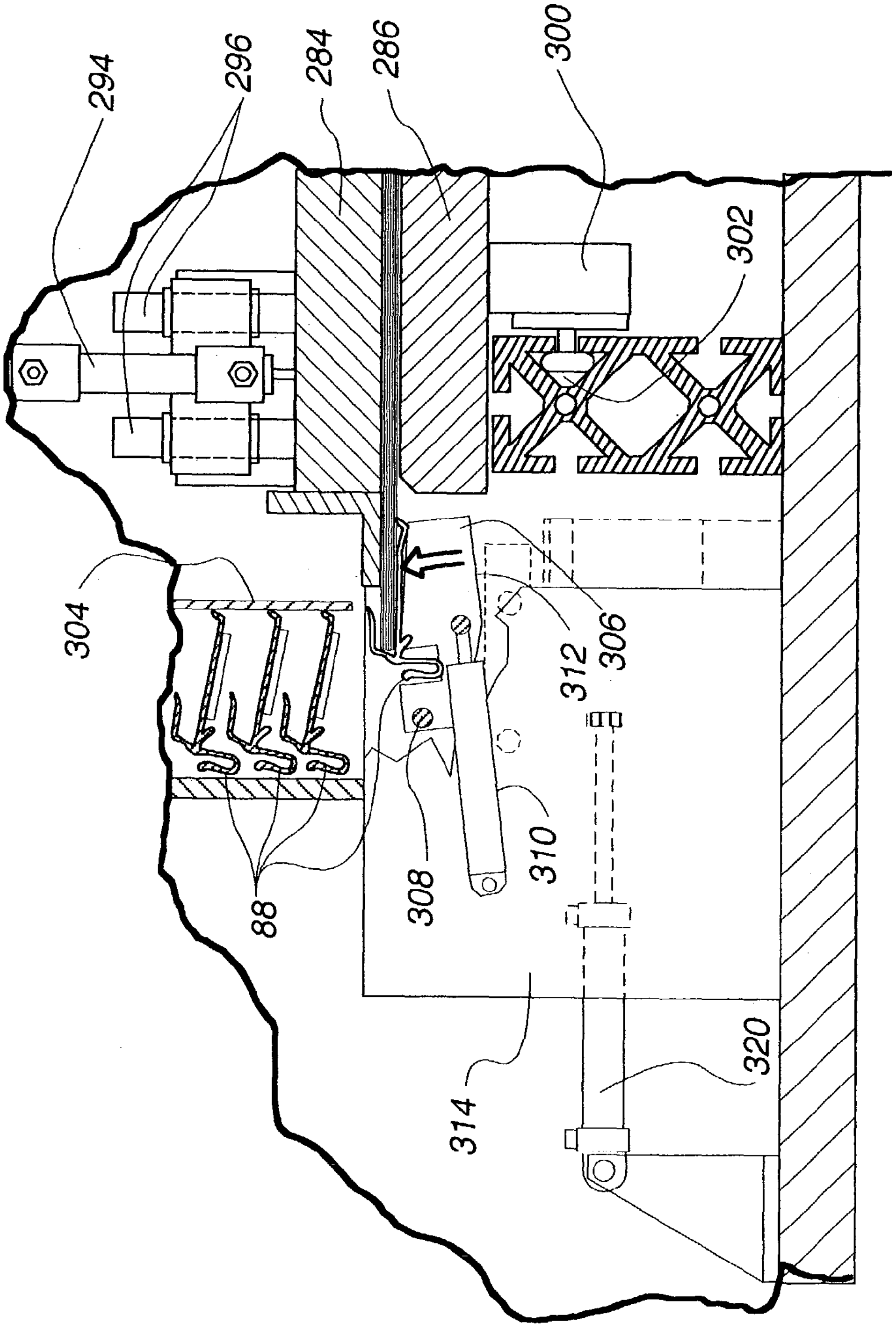
FIG. 46 is an enlarged fragmentary section taken along line 46—46 of FIG. 42.

At the edge applicator station 86, the panels 84 are delivered by the driven roller conveyor 272 into a position between compression plates 284 and 286 shown best in FIGS. 41 through 43, 45, 45A, 45B and 46. There are two compression plates with a lower plate 286 being fixed in elevation but being movable transversely of the transverse conveyor 272 by a driven belt 288 secured to the under surface of the lower plate as seen best in FIG. 45. The belt 288 is driven by a motor 290 and drive shaft 292 at the downstream end of the frame for the transverse conveyor 272 as seen in FIGS. 41 and 43. The upper plate 284 as probably best seen in FIGS. 45, 45A and 45B is operably connected to the lower plate for horizontal movement therewith, is vertically spaced from the lower plate, and further is vertically moveable relative to the lower plate by pneumatic cylinders at the four corners of the plate 286 as will be appreciated in FIGS. 41 through 43. The compression plates are quadrangular in configuration. On opposite sides of each pneumatic cylinder 294 are a pair of guide pins 296 to assure precise vertical movement of the upper plate relative to the lower plate upon activation and deactivation of the pneumatic cylinders.

When the cylinders 294 are retracted as shown in FIG. 45A, for example, there is a relatively large space between the upper and lower plates 284 and 286, respectively, so that a panel 84 can be inserted between the compression plates by the driven roller conveyor 272 as seen in FIG. 45A.

The panel 84 being advanced between the plates by the driven transverse roller conveyor 272 engages an abutment stop 298 at the downstream end of the transverse conveyor 272 as seen in FIGS. 41 through 43 to properly position the panel between the plates. Once the panel is properly positioned, the upper plate 284 is moved downwardly by the pneumatic cylinders 294 to compress the panel between the two plates 284 and 286 and into the position shown in FIGS. 45 and 45B. With the panel confined between the plates, the plates are moved horizontally in a direction perpendicular to the transverse conveyor 272 and in an upstream direction relative to the idler roller conveyor 228 in parallel relationship with the idler roller conveyor 228. The horizontal movement of the compression plates is again by the drive belt 288 mentioned previously.

The compression plates with the panel confined therebetween are moved by the belt 288 to an operative position (FIG. 42) where they are stopped and held in place while the rigid edging strips or clips 88 are applied to the end edges of the panel. It should be pointed out by reference to FIGS. 45A, 45B and 47 that the bottom compression plate 94 is supported by rollers 300 that ride in tracks 302 disposed along opposite side edges of the bottom compression plate so that the plates are properly positioned when the rigid end edging or clips are applied thereto. At the operative location where the clips are applied to the panel, there are vertical magazines 304 on either side of the compression plates (FIGS. 46 through 48) which receive and confine a stack of the clips 88. As will be appreciated, the clips are elongated and can be made of a plastic material as described in the aforenoted application entitled Compressible Structural Panel. The clips are shown in cross section in FIGS. 46 through 48 stacked in the magazines. Immediately beneath each magazine is a pivotable cradle 306 that is adapted to pivot about a pivot pin 308 by a pneumatic cylinder 310. The cradle has abeveled bottom surface 312 so that it can be rocked between the position of FIGS. 47 and 48 and the position of FIG. 46 by movement of the pneumatic cylinder 310. The cradle is supported on a slide 314 that is supported for smooth rolling movement by rollers 316 engageable in tracks 318 on the framework for the apparatus and the slide 314 is moved back and forth in a horizontal direction toward and away from the compression plates 92 and 94 by a second pneumatic cylinder 320.

Figure 47:
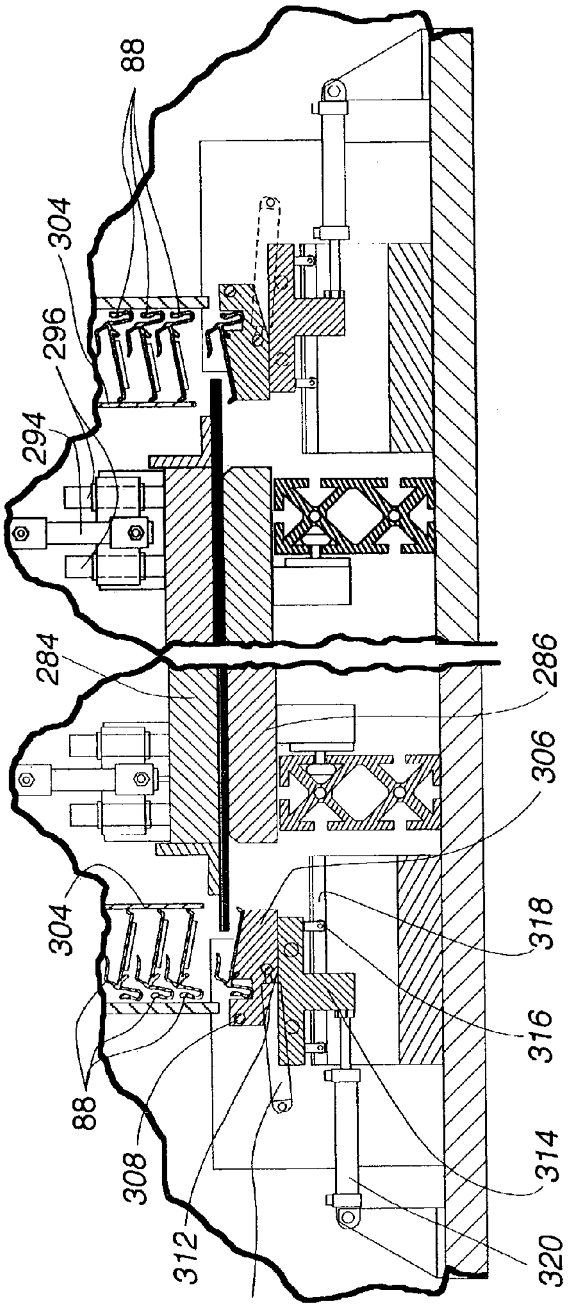
FIG. 47 is an enlarged fragmentary section taken along line 47—47 of FIG. 42.
Figure 48:
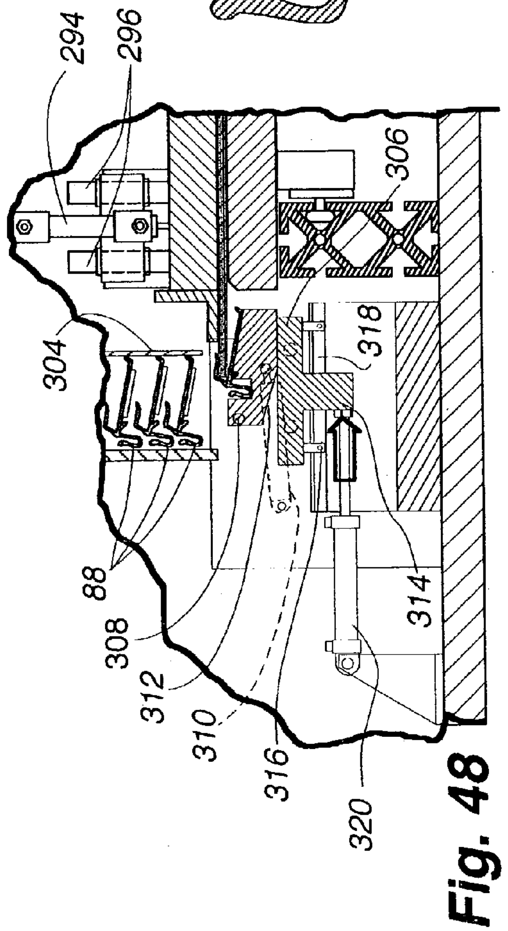
FIG. 48 is an enlarged fragmentary section similar to FIG. 47 with the strip cradle in a different position.
Figures 50, 51:
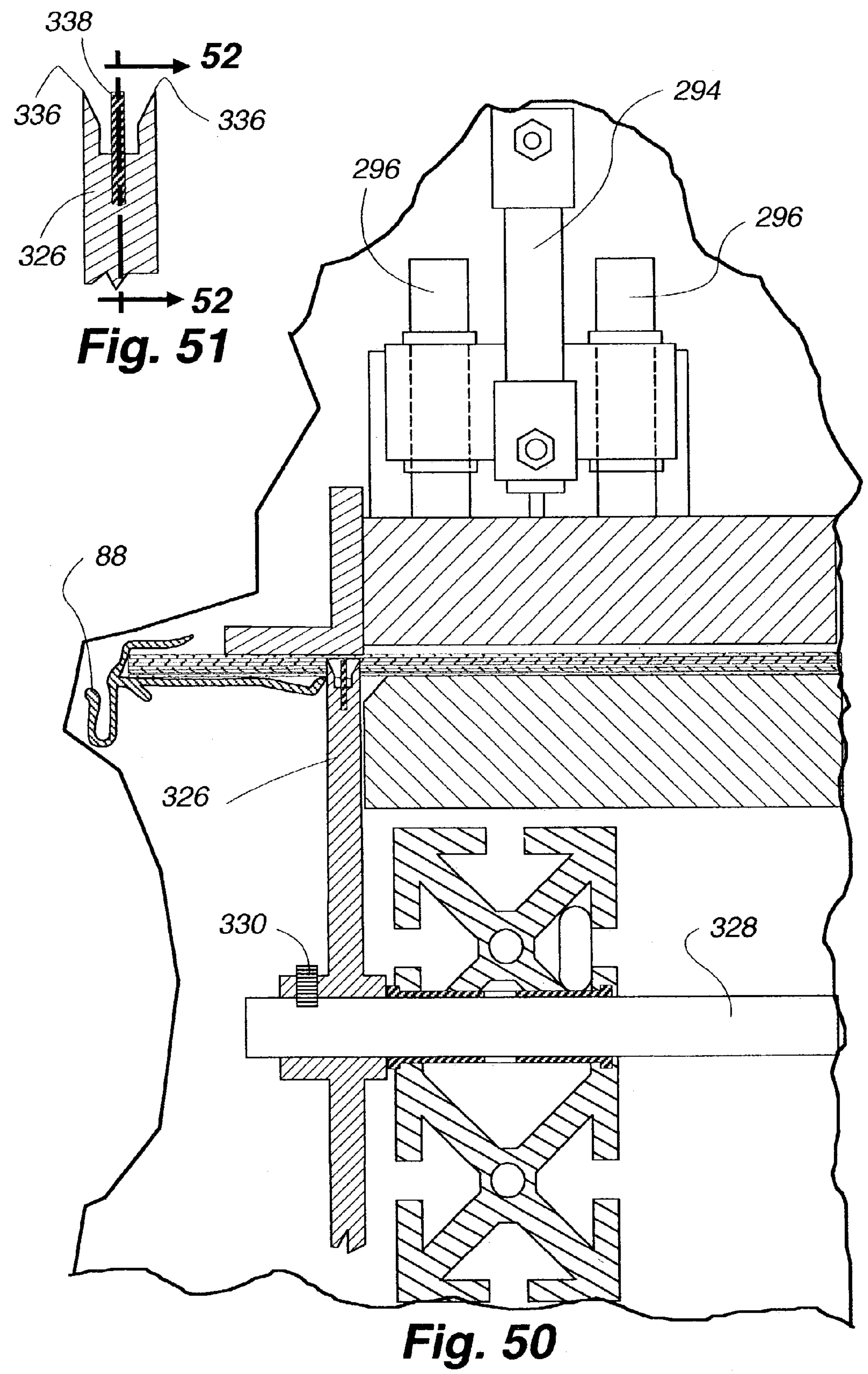
FIG. 50 is an enlarged fragmentary section taken along line 50—50 of FIG. 43.
FIG. 51 is an enlarged section taken through an edge of cutting disc shown in FIG. 50.
Figure 52:
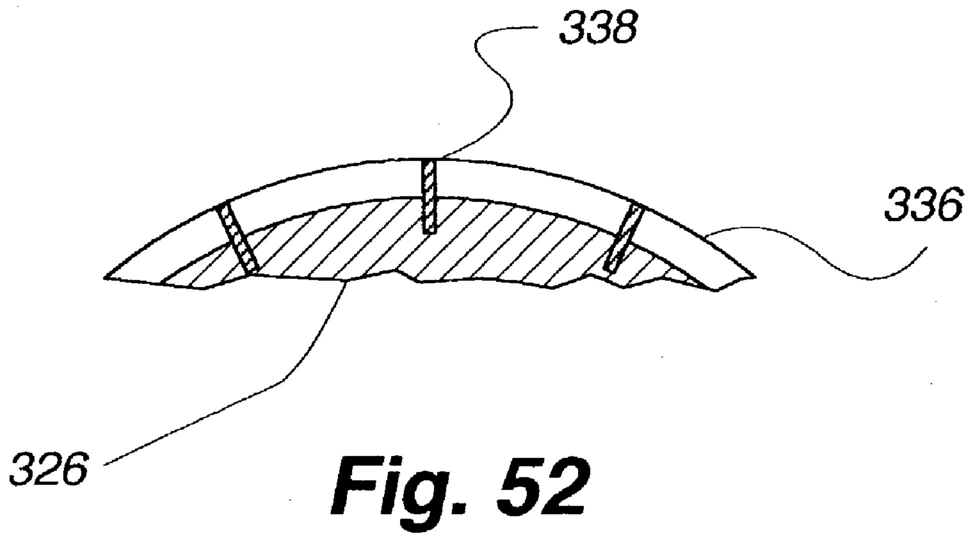
FIG. 52 is a section taken along line 55—55 of FIG. 51.
Figure 53:
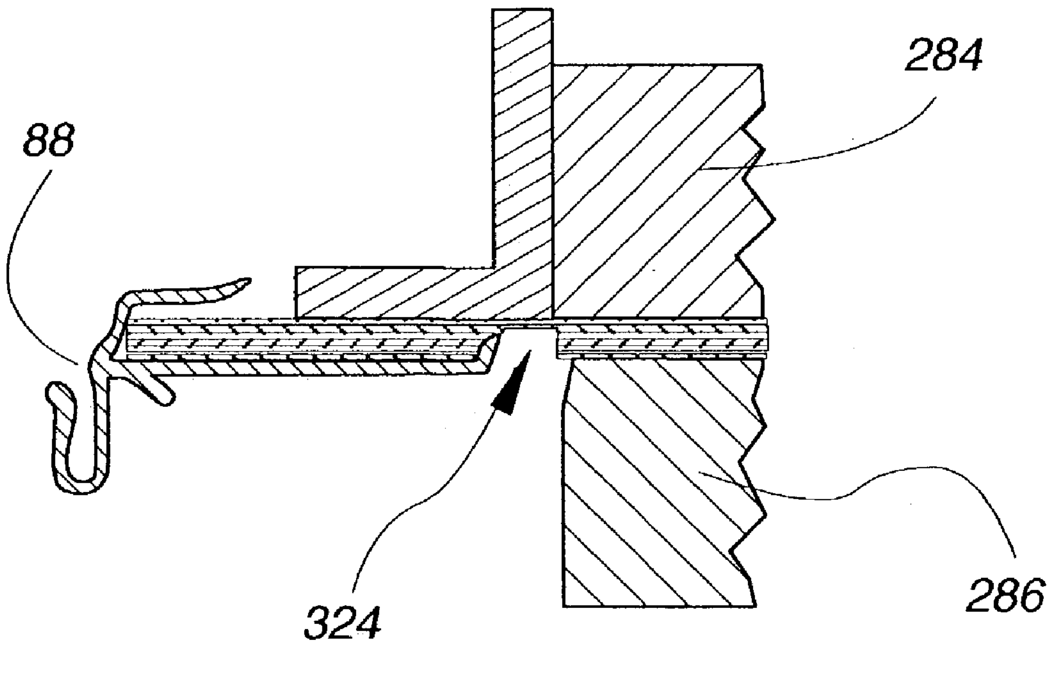
FIG. 53 is a fragmentary material section taken through the edge strip applicator station showing a notch removed from a panel to facilitate folding the edge strip along the associated end of the panel.

In operation, before advancing a panel into the operative position where the clips 88 are applied thereto, a clip is dropped from a magazine into the cradle on both sides of the panel and with the cradles in the position illustrated in FIG. 47. The panel 84 is then advanced into an operative position between the cradles so that the edges of the panel are aligned with the recesses 280 of the clips confined by the cradles on each side of the compression plates. The second pneumatic cylinders 320 on each side of the compression plates are then activated to move the slide 314 toward the compression plates advancing the clips onto opposite ends of the panels. The panel then assumes the position shown in FIG. 49 with the panel being shown in dashed lines. When the clips are so positioned, the first pneumatic cylinders 310 on each side are activated to rock the cradles about their pivotal mounting into the position shown in FIG. 46. It will be appreciated in this position that the underside of the panel 84 has been engaged with the adhesive 282 on the clip to initially bond the clip to the panel in the desired position. It will also be appreciated, however, that a lip 322 along the inner edge of the clip is engaged with the undersurface of the panel which prevents the clip from lying smoothly against the undersurface of the panel and since the clips are made of plastic, the clip might flex slightly as shown in FIG. 50.

Figure 54:
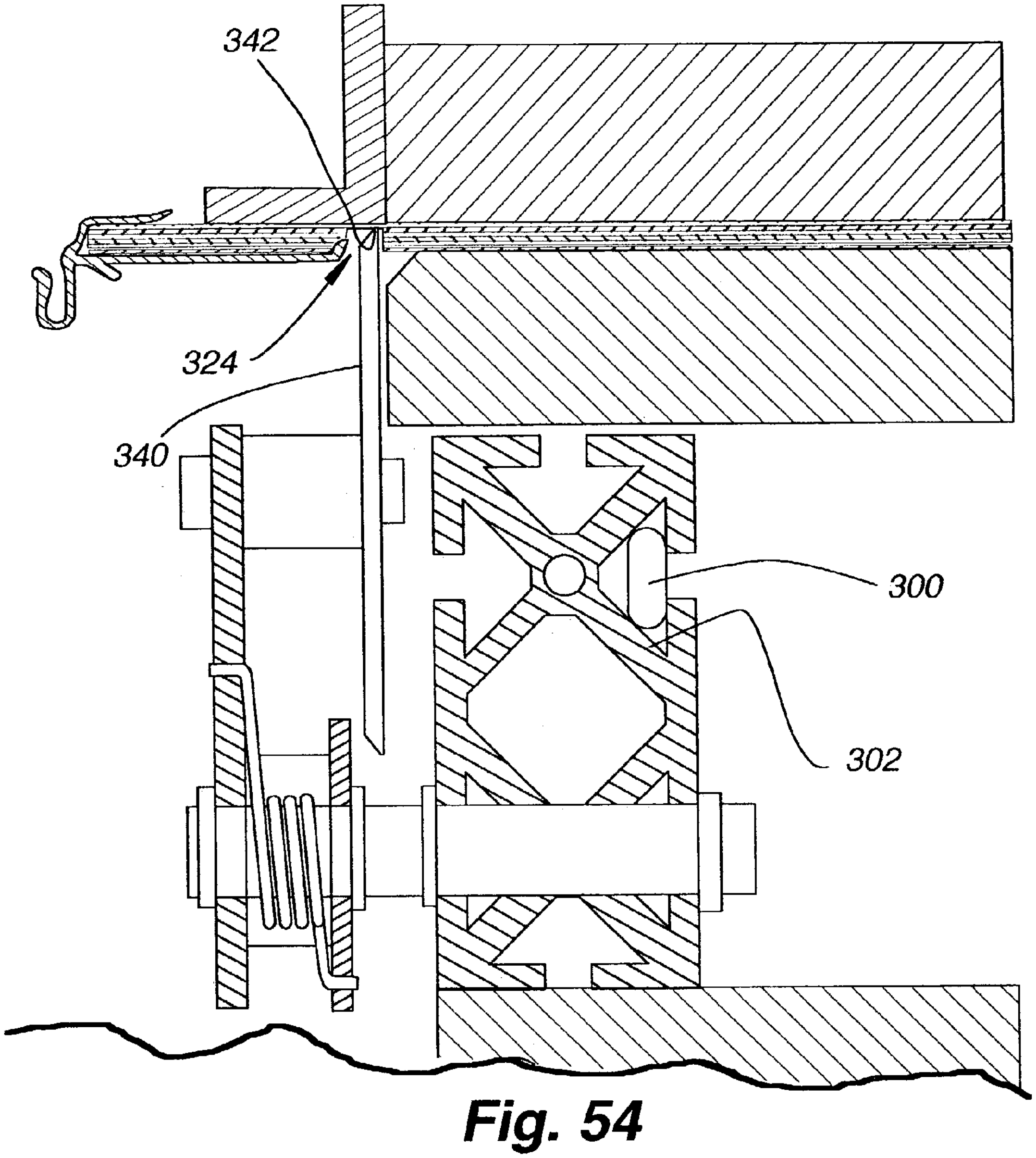
FIG. 54 is an enlarged fragmentary section taken along line 54—54 of FIG. 43.
Figure 55:
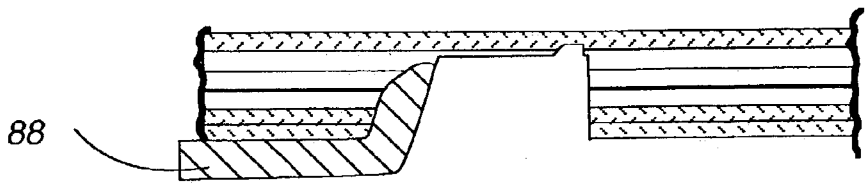
FIG. 55 is a fragmentary section taken through an end of a panel having an edge strip mounted thereon.

With clips adhesively secured in position along opposite ends of the panel, the panel is again moved horizontally by movement of the compression plates to the night as shown in FIG. 41 and as it is moved, a notch 324 is cut in the undersurface of the panel to accommodate the lip 322 of the clip to properly position the clip relative to the panel as shown in FIGS. 54 and 55. In order to cut the notch in the undersurface of the panel, the panel along each side edge thereof is passed over a driven cutting disc 326 shown in FIG. 50 and 51. The cutting disc is mounted on a driven shaft 328 and keyed thereto by a set screw 330 so that the cutting disc can be rotated at a predetermined speed relative to the linear speed of the panel being moved thereby.

As can be seen in FIG. 41, the cutting disc 326 is driven by a motor 332 (FIG. 42) mounted on the framework with the motor being connected to the drive shaft 328 by an appropriate timing belt 334. The cutting disc is rotated at a speed different from the linear speed of the panel so that a pair of spaced peripheral knife edge blades 336 (FIG. 51) along each face of the cutting disc cut the undersurface of the panel at spaced locations. A plurality of radial pins 338 are anchored in the cutting disc in the space between the knife edges and the pins scrape the cut material from between the cutting blades to remove the material from the undersurface of the panel. The removed material can be accumulated in any conventional manner for appropriate disposal. Immediately after the notch 324 is cut in the undersurface of the panel, the panel is engaged by a creasing wheel 340 in the notch which forms a crease 342 in the undersurface of the top sheet of material of the panel as seen FIGS. 54 and 55. FIG. 54 shows the creasing wheel in engagement with a panel as it is being advanced thereby and FIG. 55 shows the panel after the notch 324 has been cut in the undersurface and the crease 342 placed in the lower surface of the top sheet of the panel. It will also be appreciated that the lip 322 on the clip has now been allowed to snap into the notch formed by the cutting disc whereby the clip is properly positioned in continuous engaged relationship with the associated edge of the panel and with a notch formed in the panel that receives the lip of the clip. After the panel has been completely passed over the cutting and creasing discs, it is positioned at a completion station 344 as seen in FIG. 41 and where it can be removed from the apparatus and injected into an accumulator or stacker 346 in any conventional manner.

The panel 84 so formed has clips 88 projecting from opposite ends and side edges that are finished with the top sheet material 92 having been folded around the sides of the panel as previously described in connection with FIGS. 33 through 40.

The panels can be shipped in this configuration with the clips projecting away from opposite ends of the panel and with the panel in a compressed condition so that an optimal number of panels can be packaged in the same box.

As described in the aforenoted pending application for a Compressible Structural Panel, when the panel is placed in use, the clips are folded downwardly on each end of the panel with the notch formed in the undersurface thereof accommodating the folding movement and the crease 342 encouraging the fold to be along a straight line. The clip is then securable to the end of the panel and the panel allowed to expand into its final form for use.

Alternative Embodiments

Figure 21A:
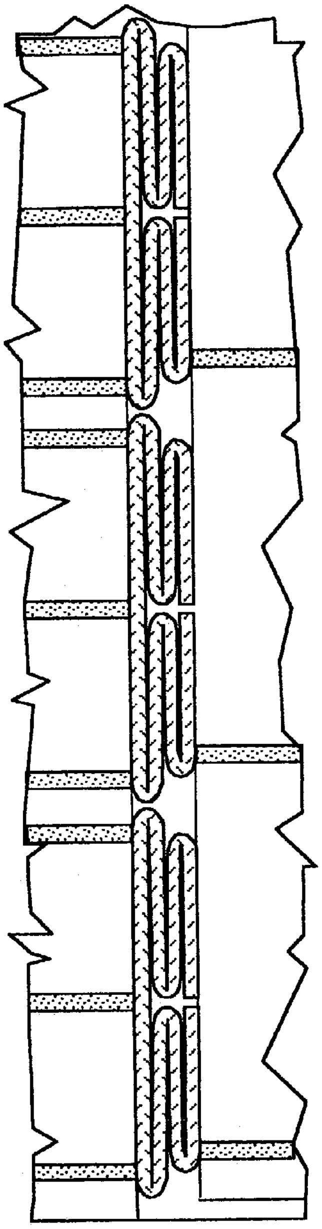
FIG. 21A is a section similar to FIG 21 in an alternative embodiment of the present invention wherein the cellular structure is bonded to the bottom sheet with a single line of bonding material.
Figure 22A:
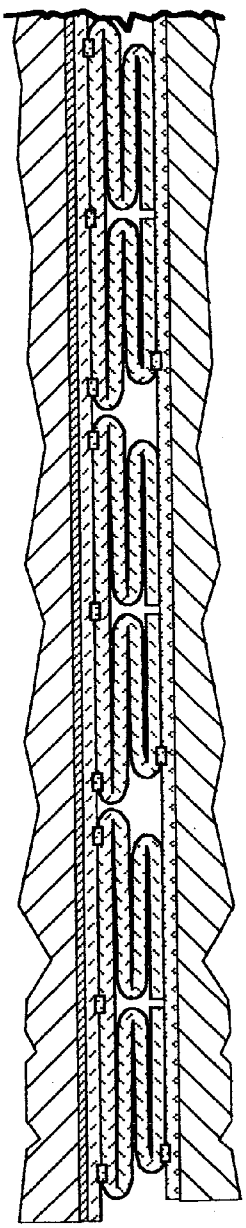
FIG. 22A is a section similar to FIG. 22 in accordance with the embodiment of FIG. 21A.
Figure 22B:
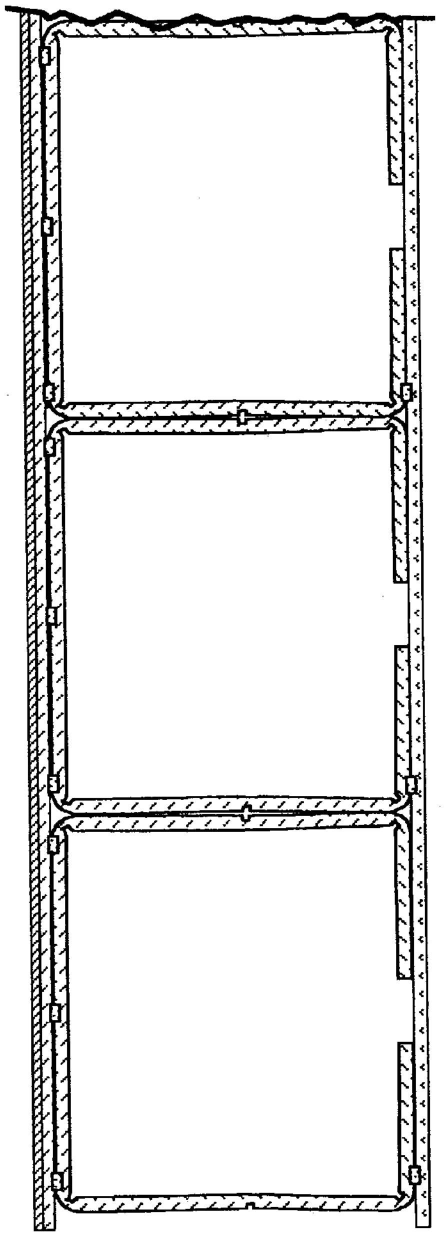
FIG. 22B is a section through an expanded panel formed consistently with FIGS. 21A and 22A.

FIGS. 21A, 22A and 22B show an alternative system 350 that could be employed in the laminating station 68 to form a panel that functions slightly differently than what has been previously described.

By reference to FIG. 21A, it will be seen that it is a section taken along the same line as FIG. 21, except the apparatus has been modified so that while three lines of bonding material 200 are still applied to the upper sheet material 92 for bonding with the top surface of each cellular structure 90, there is only one line of bonding material 200 applied to the bottom sheet 94 for bonding with the bottom surface of each cellular structure. In the disclosed arrangement, the single line of bonding material applied to the bottom sheet material is adapted to engage the bottom left-hand corner of a cellular structure along the left outermost section 156 so that the cellular structure is bonded to the bottom connector sheet only along that line of bonding material while the bottom right-hand side of the cellular structure along the right outermost section 156 is not bonded to the bottom sheet but is rather left free to slide relative to the bottom sheet.

FIG. 22A is taken along the same line as FIG. 22 with the bonding material applicator having been modified as described in connection with FIG. 21A and as will be appreciated, each cellular structure 90 is bonded along three lines 200 to the upper sheet 92 and along a single line 200 at the bottom left-hand corner of each cellular structure to the bottom sheet 94.

When the panel 84 is allowed to expand from its compressed condition of FIG. 22A to an expanded condition of 22B, the top surface of the cellular structure 90 remains in a fixed position relative to the upper sheet 92 of material while the sidewalls 352 of the cellular structures expand into flat vertical positions, with each sidewall of one cellular structure being contiguous with a sidewall of an adjacent cellular structure. The bottom of the cellular structure, however, while being secured to the bottom sheet 94 by the bead of bonding material 200, shifts the bottom sheet to the left as viewed in FIGS. 22A and 22B when the left sidewall of the cellular structures straighten out so that the left sidewall of the cellular structures are allowed to assume a flat vertical position. As the bottom sheet 94 shifts to the left, it slides relative to the right outermost sections 156 of the lower surface of the cellular structures so that a relatively large gap is established between the left and right outermost sections 156 of the cellular structures as can be appreciated by comparing the outermost sections 156 in FIG. 22A to the outermost sections 156 as seen in FIG. 22B. With each cellular structure fully expanded into the quadrilateral cross-sectional configuration shown in FIG. 22B, the sidewalls of each cellular structure reinforce the adjacent sidewall of an adjacent cellular structure so that the panel becomes very rigid and substantially incompressible.

The folding of the side edges of the laminate at the side edge folding station 80 as shown in FIGS. 34-38 can be handled differently than with a folding block 250 as described previously. By way of example, the side edge folding station 80 having a folding block might be replaced with a side edge folding station 354 as illustrated in FIGS. 69 through 79. The side edge folding station 354 would be located at the same location as the side edge folding station 80 but in the side edge folding station 354, the rollers in the downstream idler roller conveyor 228 would be continuous through the folding station so as to confine the laminate from which the panels are made in a partially compressed condition as seen in FIGS. 70-79 as it moves through the folding station. In the description that follows, it will be appreciated that as the laminate passes through the side edge folding station and is maintained in the partially compressed condition, the two opposite laterals sides of the laminate are progressively engaged and treated with a succession of rollers mounted on vertical axes so as to rotate in horizontal planes immediately adjacent to the side edges of the laminate.

Figure 69:
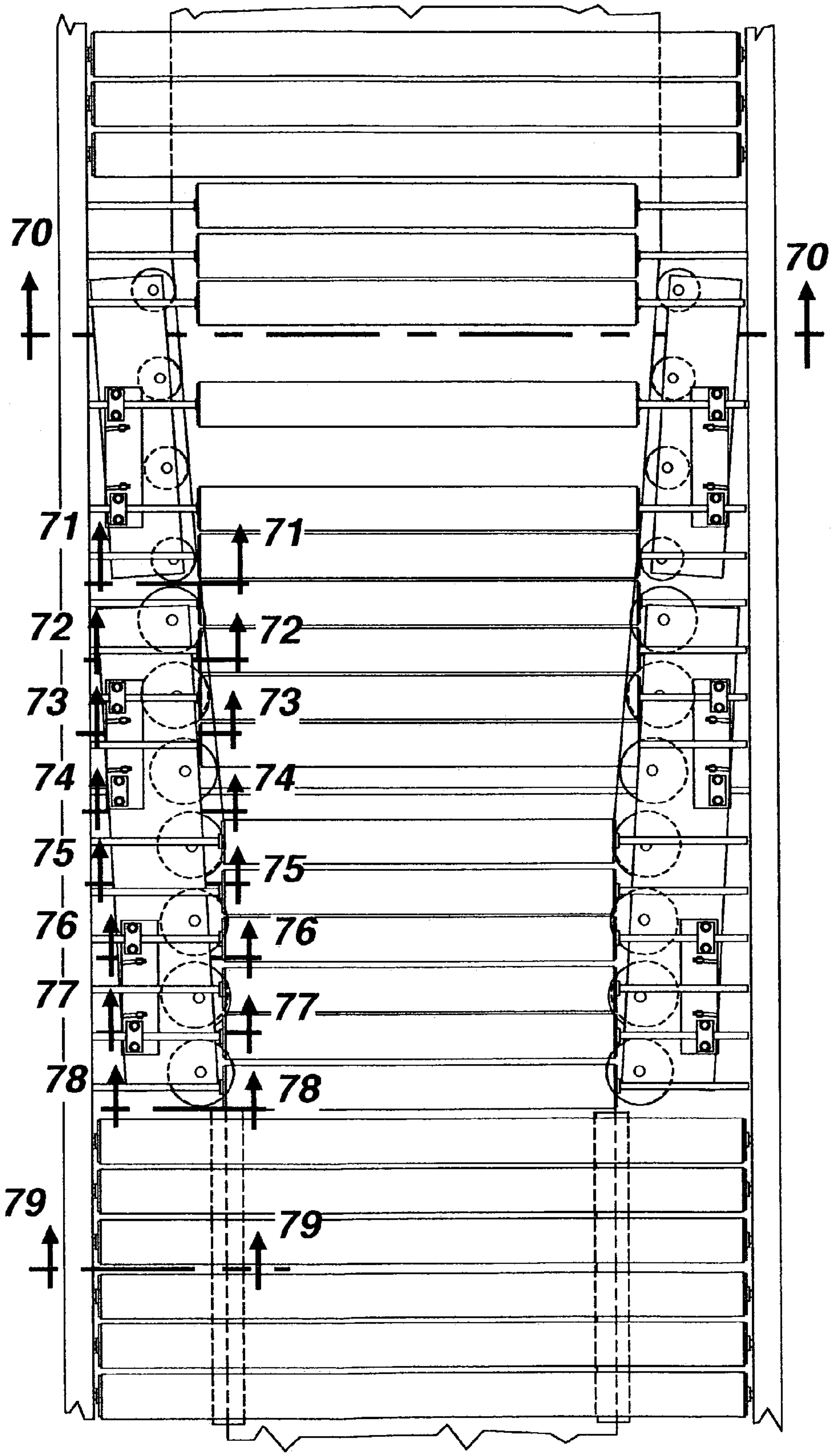
FIG. 69 is a fragmentary plan view of a portion of the downstream idler roller conveyor having an alternative side edge folding station.

Referring first to FIG. 69, it will be seen that the side edge folding station 354 extends along the roller conveyor 228 over a relatively short distance and includes a plurality of locations that are illustrated in FIGS. 70–79 where the sequential treatment of the side edges of the laminate takes place. It can also be appreciated in FIG. 69 that the roller conveyor 228 is substantially continuous through this section of the apparatus with the side edge treatment taking place while the laminate is partially compressed and confined by the roller conveyor.

Figure 70:
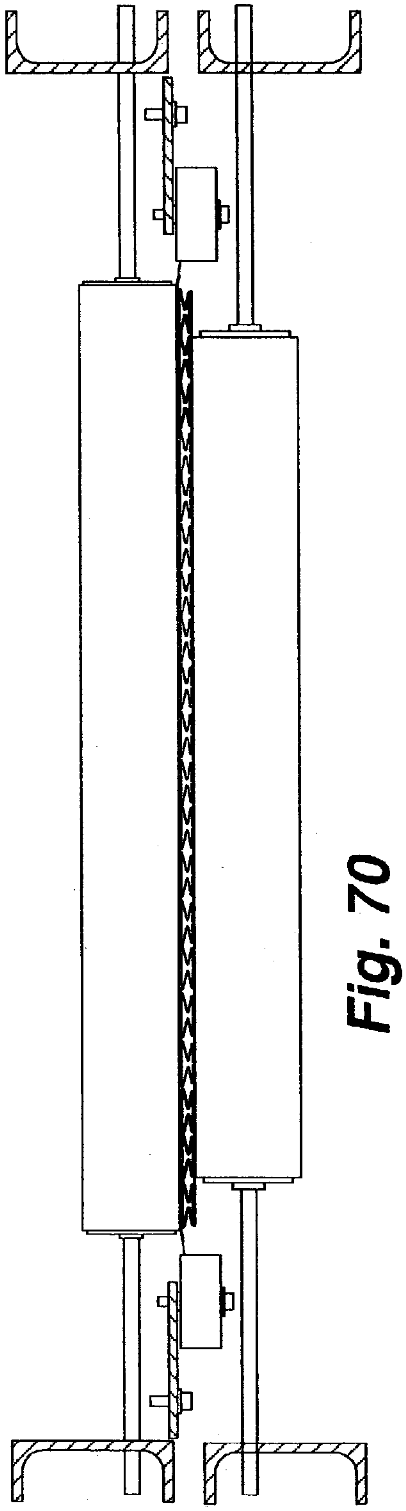
FIG. 70 is an enlarged section taken along line 70—70 of FIG. 69.
Figure 71:
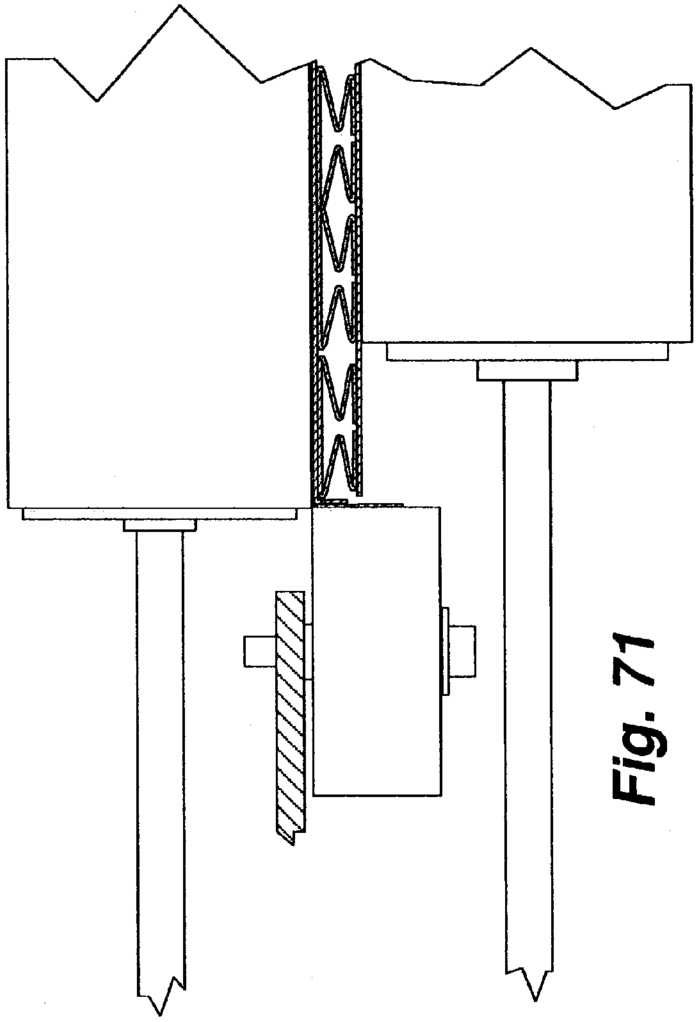
FIG. 71 is an enlarged fragmentary section taken along line 71—71 of FIG. 69.

In FIG. 70, the laminate, as previously described, can be seen to have side-by-side, partially compressed cellular structures 90 which in aggregate are coextensive with the width of the bottom connector sheet material 94 but with the upper sheet material 92 overlapping the lateral sides of the outermost cellular structures, and it is these overlaps or overhangs 356 that provide the material from which the side edges of the laminate are treated. In fact, and as probably best seen in FIG. 71 and described previously, the upper sheet 92 of the laminate is a two-layer laminate itself with the top or outermost layer 358 of the upper sheet being a decorative layer which is wider than the immediately underlying layer 360, but both layers project laterally outwardly from the outermost cellular structures 90 in the laminate prior to any treatment of the lateral sides of the laminate.

Looking first at FIG. 70, it will be seen that as the laminate approaches the location in the side edge folding station 354 identified in FIG. 69 by section line 70—70, the overlaps 356 on the top sheet engage cylindrical rollers 362 which initially force the overlaps downwardly. For convenience purposes, the description of the side edge folding that follows, will be described in reference to one side of the laminate even though it will be recognized that both sides are folded identically and simultaneously. As the laminate progresses downstream, it next engages a similar or identical cylindrical roller 364 that is mounted slightly closer to the outermost cellular structure with the roller 364 forcing the overlap into a right angle relative to the upper sheet at the outer edge of the outermost cellular structure. It will be appreciated at this location that the overlap is horizontally aligned with a cavity 366 defined in the outer side wall of the outermost cellular structure 90 which is V-shaped in cross section, wherein the V opens laterally toward the overlap. As the laminate progresses further downstream to the location shown in FIG. 72, the overlap is engaged by a roller 368 that is circular in horizontal cross section, but having a pointed, but not sharp, circumferential edge 370 that protrudes into the cavity 366 in the outermost cellular structure to a small degree so as to commence forcing the overlap into the cavity.

Figure 72:
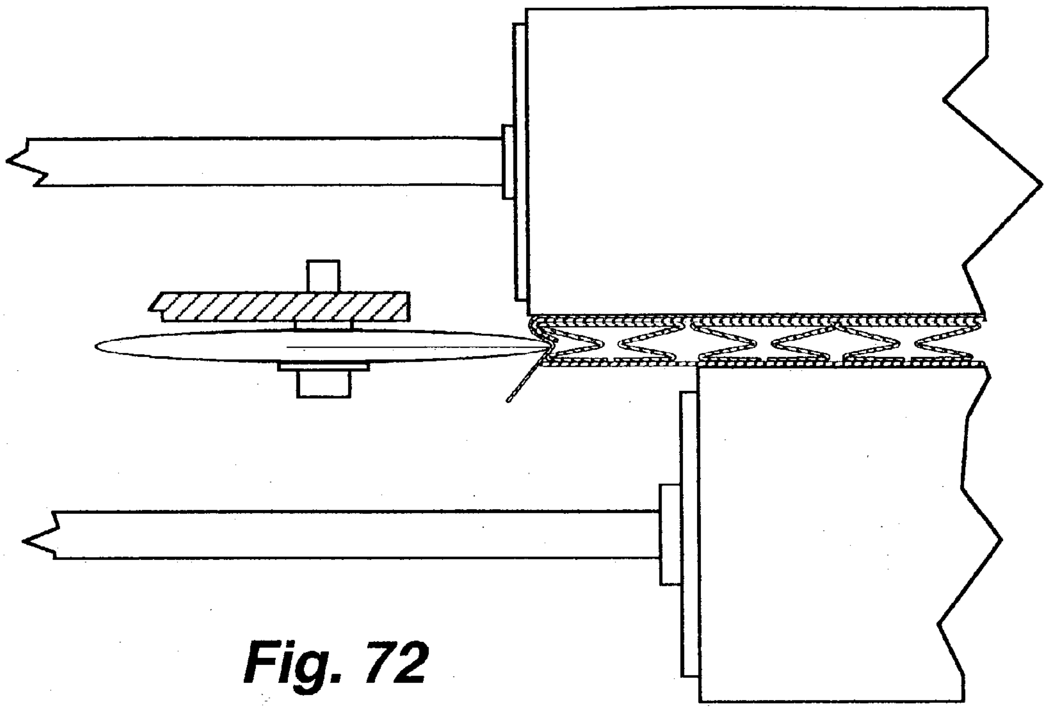
FIG. 72 is an enlarged fragmentary section taken along line 72—72 of FIG. 69.
Figure 73:
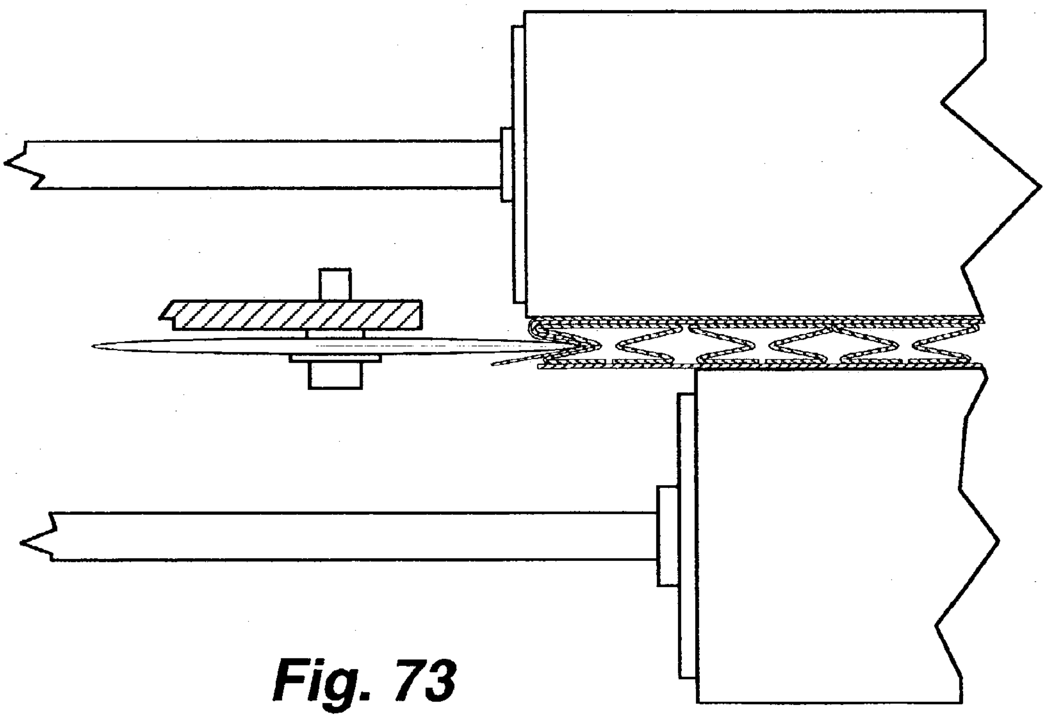
FIG. 73 is an enlarged fragmentary section taken along line 73—73 of FIG. 69.

Progressing further downstream to the location illustrated in FIG. 73, it will be seen that the overlap 356 engages a second roller or wheel 372 of circular horizontal cross section which is slightly larger than the circular wheel shown in FIG. 72 so that the wheel projects totally into the V-shaped cavity 366 forcing the overlap to engage the wall surfaces of the cavity. It will be noted, however, that at this location, the free edge 374 of the overlap protrudes outwardly from the V-shaped cavity in a substantially horizontal direction.

Figure 74:
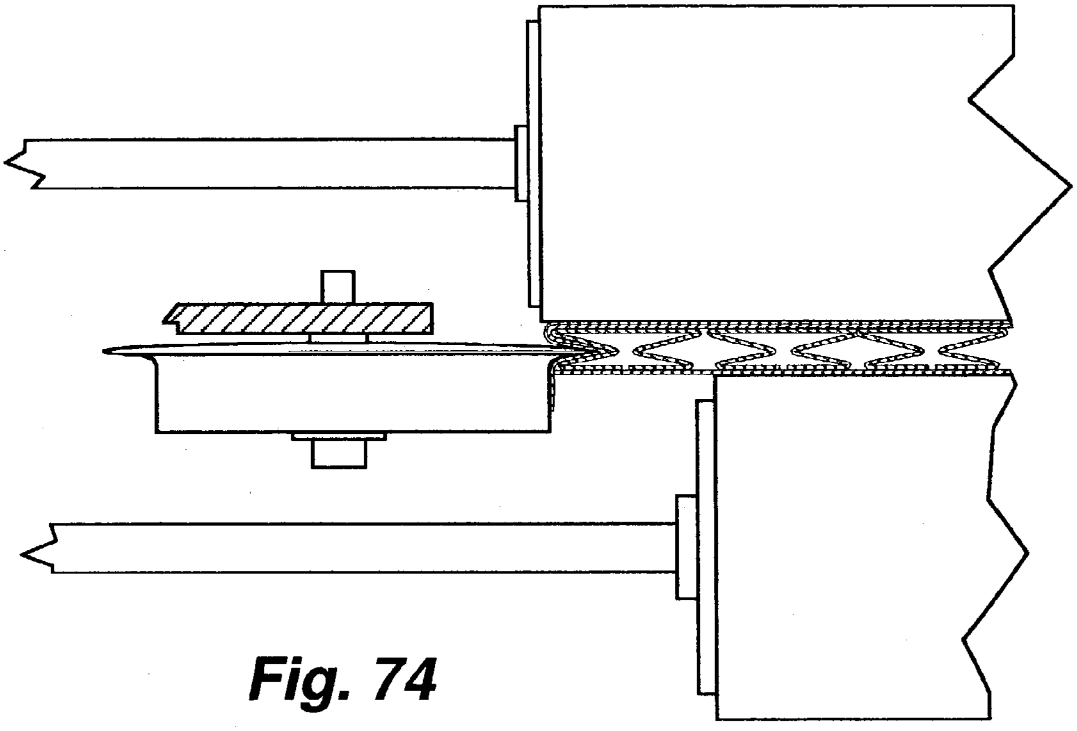
FIG. 74 is an enlarged fragmentary section taken along line 74—74 of FIG. 69.

When the laminate reaches the location illustrated in FIG. 74, it engages another roller 376 having a top edge 378 that is shaped substantially identically to the roller 372 shown at the location of FIG. 73, but in addition, the roller 376 has a cylindrical downward extension 380 therefrom of a slightly smaller diameter which engages the free edge 374 of the overlap and folds it vertically downwardly.

Figure 75:
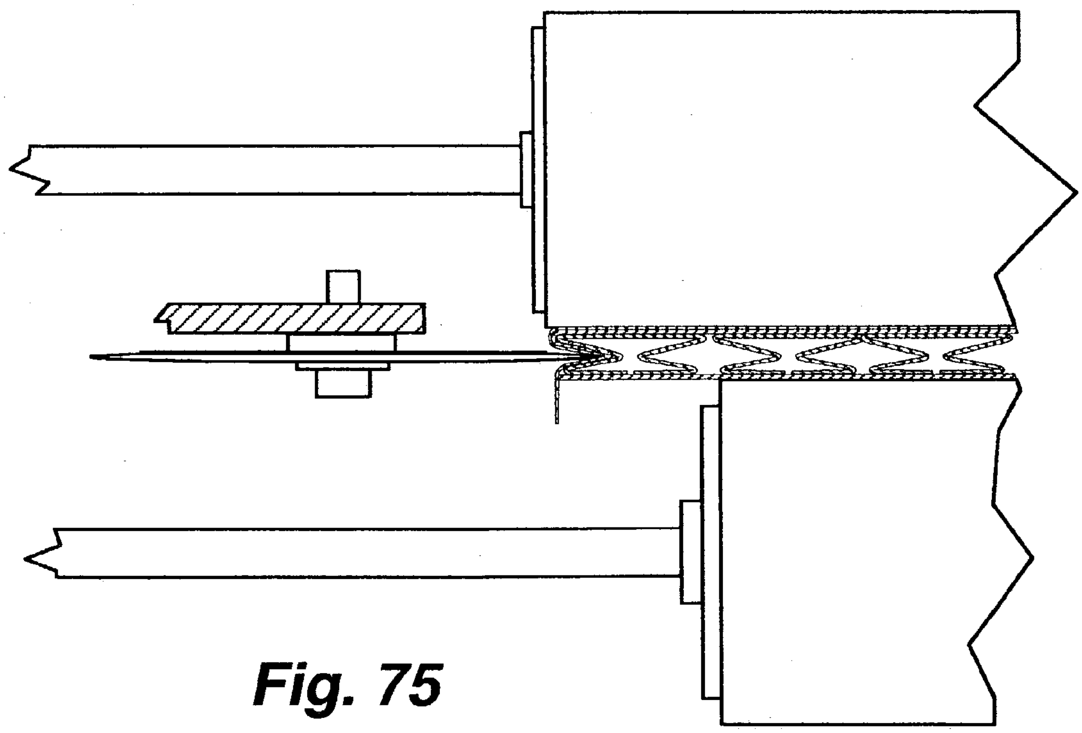
FIG. 75 is an enlarged fragmentary section taken along line 75—75 of FIG. 69.

When the laminate reaches the location shown in FIG. 75, it engages another roller 382 identical to that at the location shown in FIG. 73 which continues to retain the overlap in the V-shaped cavity 366 in engagement with the wall surfaces in the cavity, and as will be appreciated, the free edge 374 of the overlap at this location is directed straight downwardly.

Figure 76:
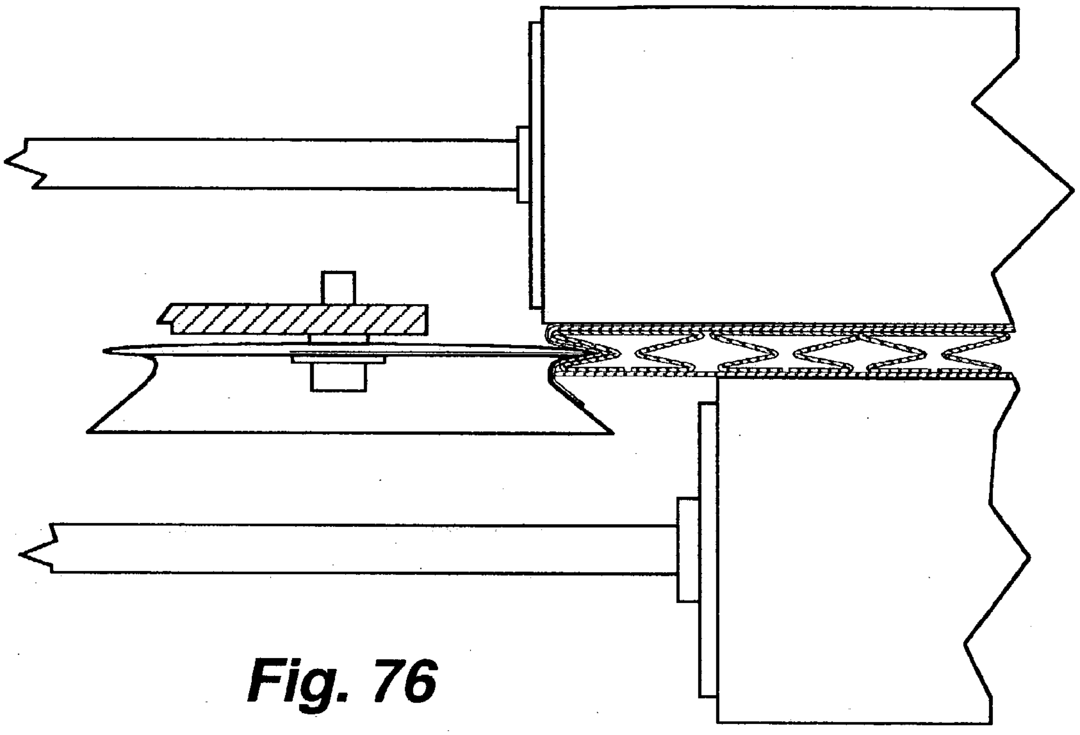
FIG. 76 is an enlarged fragmentary section taken along line 76—76 of FIG. 69.

When the laminate reaches the location illustrated in FIG. 76, it engages a roller 384 having a top surface 386 substantially identical to the rollers 372 and 382 shown at the locations of FIGS. 73 and 75 with the roller 384 having a downward extension 388 therefrom of substantially trapezoidal vertical cross section so as to define an outwardly opening cup-shaped surface 390 adapted to engage the free edge 374 of the overlap and bend it beneath the bottom sheet 94 of the laminate at a slight angle relative thereto.

When the laminate reaches the location illustrated in FIG. 77, it again engages a roller 392 of the type found at the locations illustrated at FIGS. 73 and 75, which again holds the overlap in the V-shaped cavity 366 with the free edge 374 of the overlap forming an underlying acute angle relative to the bottom layer 94 of the laminate.

Figure 77:
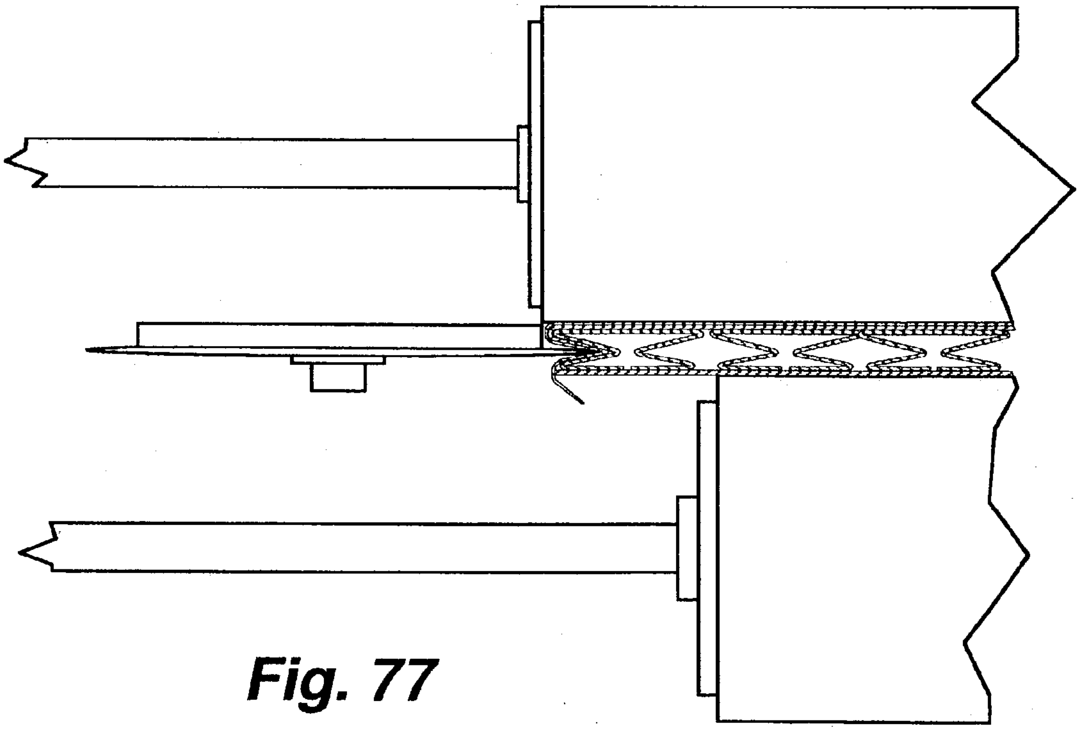
FIG. 77 is an enlarged fragmentary section taken along line 77—77 of FIG. 69.
Figure 78:
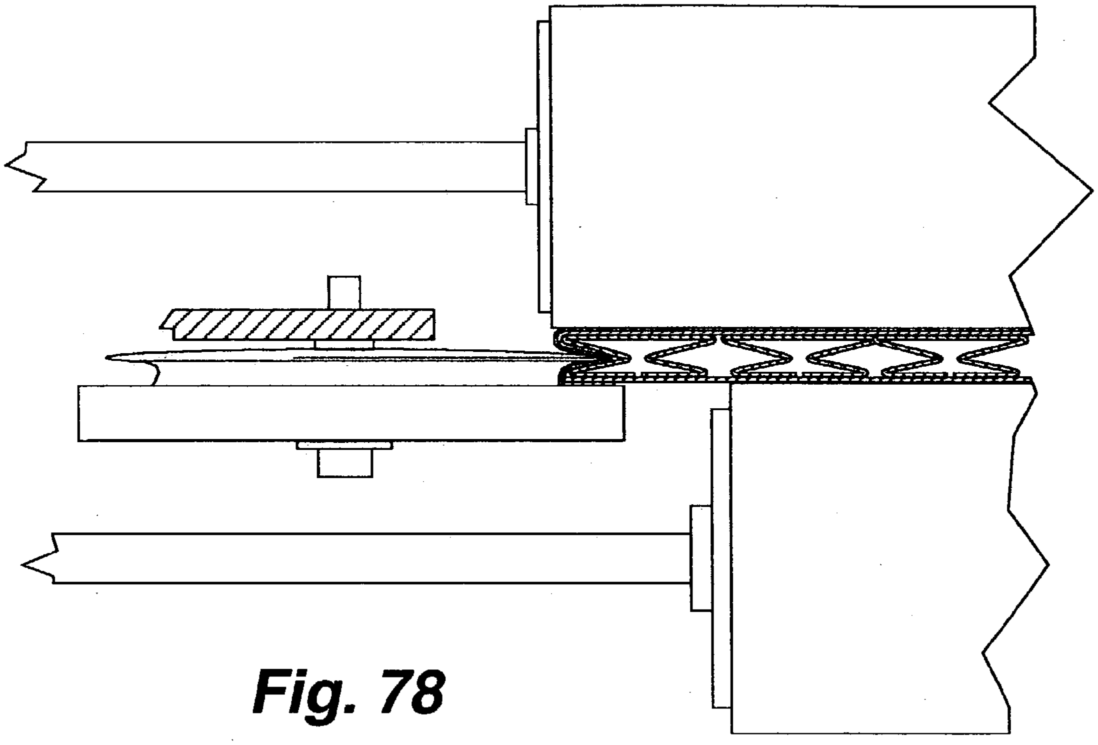
FIG. 78 is an enlarged fragmentary section taken along line 78—78 of FIG. 69.

When the laminate reaches the location illustrated in FIG. 78, it engages still another roller 394 having a top surface 396 of the general shape of the rollers used at the locations illustrated at FIGS. 73, 75, and 77 with an extension downwardly therefrom having an initial outwardly cup-shaped segment 398 that is circular in cross section and adapted to receive the lower outer corner of the outermost cellular structure 90 while confining the overlap 356 therein. Beneath the cup-shaped segment 398 there is a cylindrical section 400 adapted to abut and engage the lower surface of the bottom sheet 94 of the laminate while forcing the free edge of the overlap into engagement with the lower surface of the bottom sheet.

Figure 79:
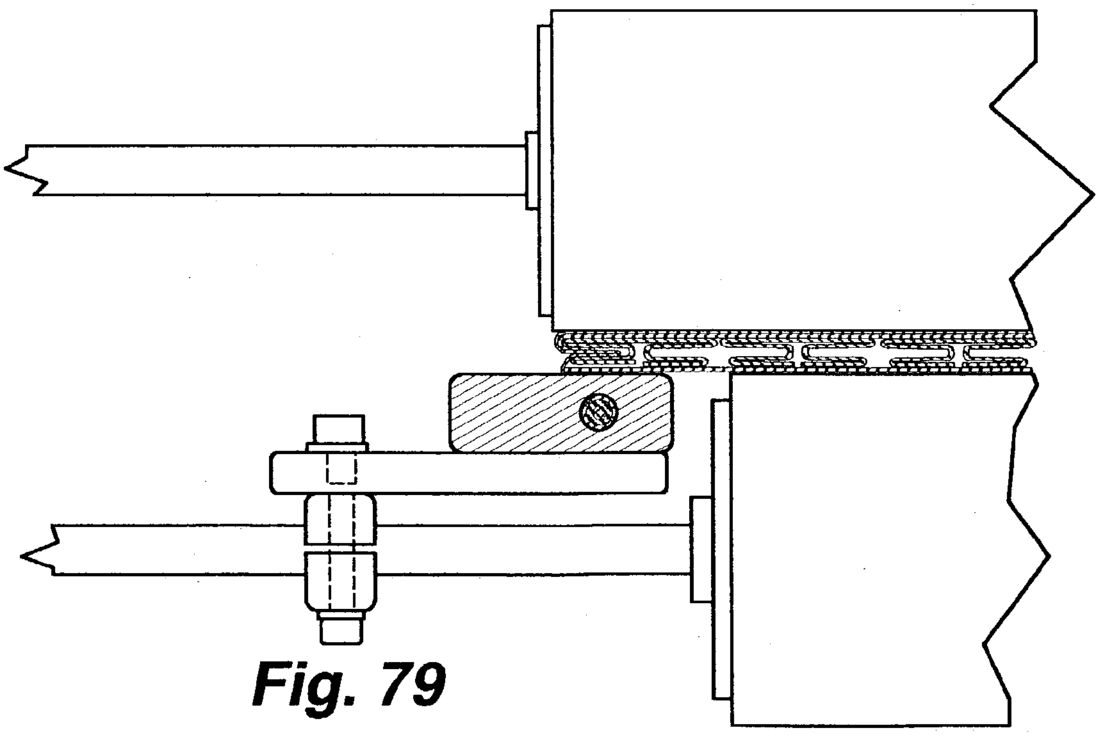
FIG. 79 is an enlarged fragmentary section taken along line 79—79 of FIG. 69.

When the laminate reaches the location illustrated in FIG. 79, it will be appreciated that the upper and lower rollers in the conveyor 228 are positioned slightly closer together and a heated anvil 402 is positioned to engage the lower surface of the outer edge of the laminate. The underside of the outermost decorative layer 358 of the upper sheet 92 where it overlaps the underlying layer 360 of the upper sheet has adhesive pre-applied thereto. With the overhang folded as illustrated in FIG. 79, the adhesive engages the lower surface of the bottom sheet 94 of the laminate. The heated anvil sets the adhesive to bond the overhang to the bottom sheet.

It will be appreciated from the above that the decorative layer 358 on the top surface of the upper sheet 92 of the laminate is now wrapped around the outer exposed edge of the outermost cellular structure 90 and in a manner so that the laminate can expand or remain compressed and still present a decorative outer surface to the laminate. This is desirable at any location where the side edge of the laminate is exposed giving a finished appearance to the laminate and any panel 84 cut therefrom as is probably best appreciated in FIGS. 80–82.

Figure 58:
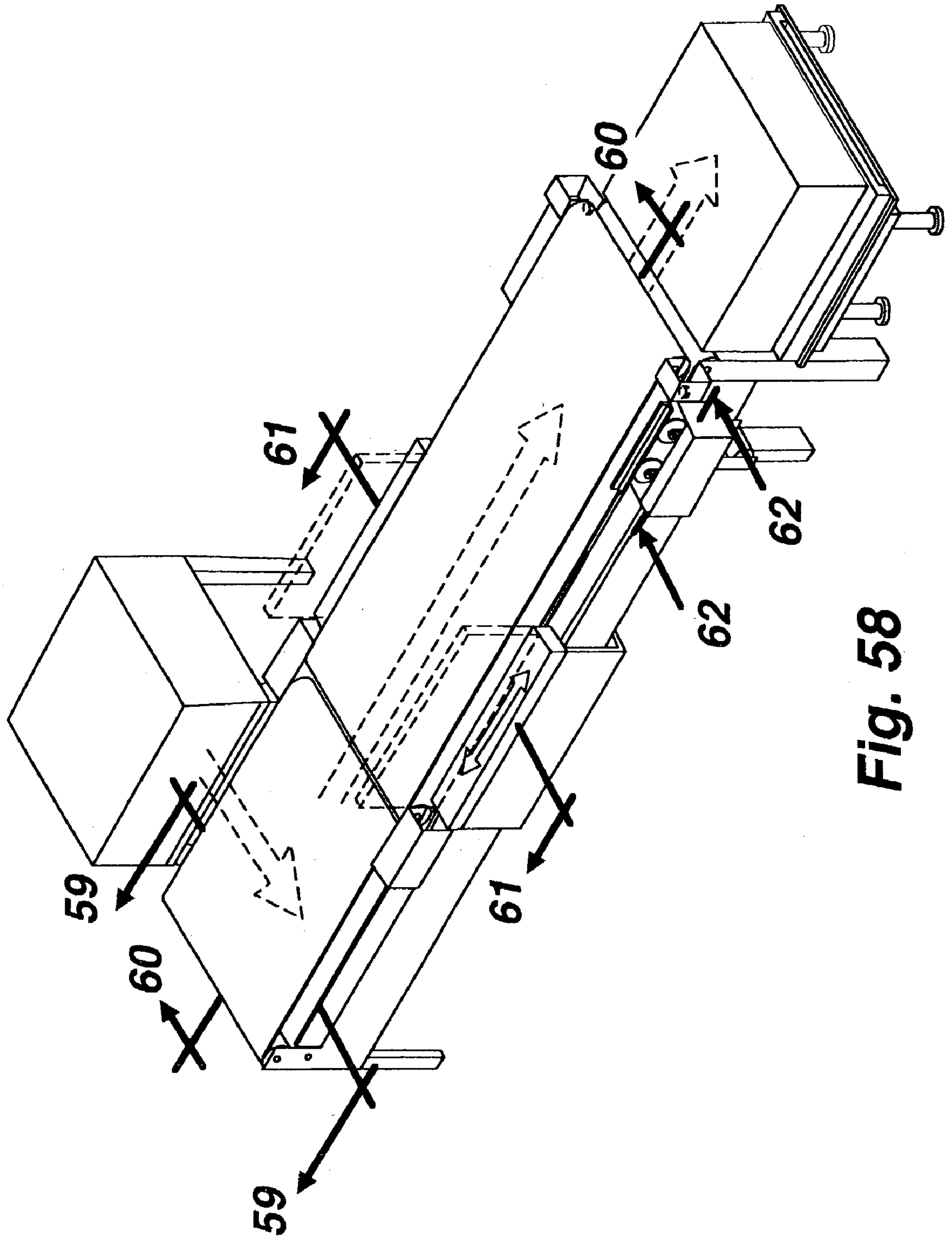
FIG. 58 is a diagrammatic isometric view of an alternative edge clip assembly station for the apparatus of the present invention.

An alternative to the edge-strip applicator station 86 described previously is shown in FIGS. 58–68. As best seen in FIG. 58, in the alternative edge strip applicator station 404 which is located at the same place as the applicator station 86, cut panels 84 are delivered from the downstream idler roller conveyor 228 transversely to the edge strip applicator station 404. In the edge strip applicator station, the panels are moved in a direction transversely to the movement of the laminate in the downstream roller conveyor 228 so that the cut panels are received between a pair 406 of upper and lower belt conveyors and delivered to a set 408 of belt conveyors and ultimately to the completion station 344 with the pair 406 of belt conveyors, the set 408 of belt conveyors and the completion station being in linear alignment. It is possible that the panels are delivered to and processed in the applicator station 404 at the same speed, but could be processed at a slower speed than they are delivered to the applicator station. If the speed of delivery to the applicator station is faster than the panels are processed in the station, an accumulator bin could be used as will be described later.

In the set 408 of belt conveyors, the panels 84 are received so that the cellular structures 90 in the panels open toward the lateral sides of the belt conveyors and are therefore properly positioned for receiving a clip or edge strip 409. While the panels are confined by the set 408 of belt conveyors, the edge strips are applied to the ends of the panels and notches are cut and formed in the panels so that the edges can be folded into abutting and confronting relationship with the open ends of the cellular structures at a later time. In fact, the panels are accumulated at the completion station 344 with the clips applied to opposite ends of the panels but without the clips being folded into confronting relationship with the open ends of the cellular structures. The panels are accumulated in this condition so that they can remain compressed for shipping purposes, whereby a significant number of panels can be confined in a single package to optimize the efficiencies of shipping.

Figure 59:
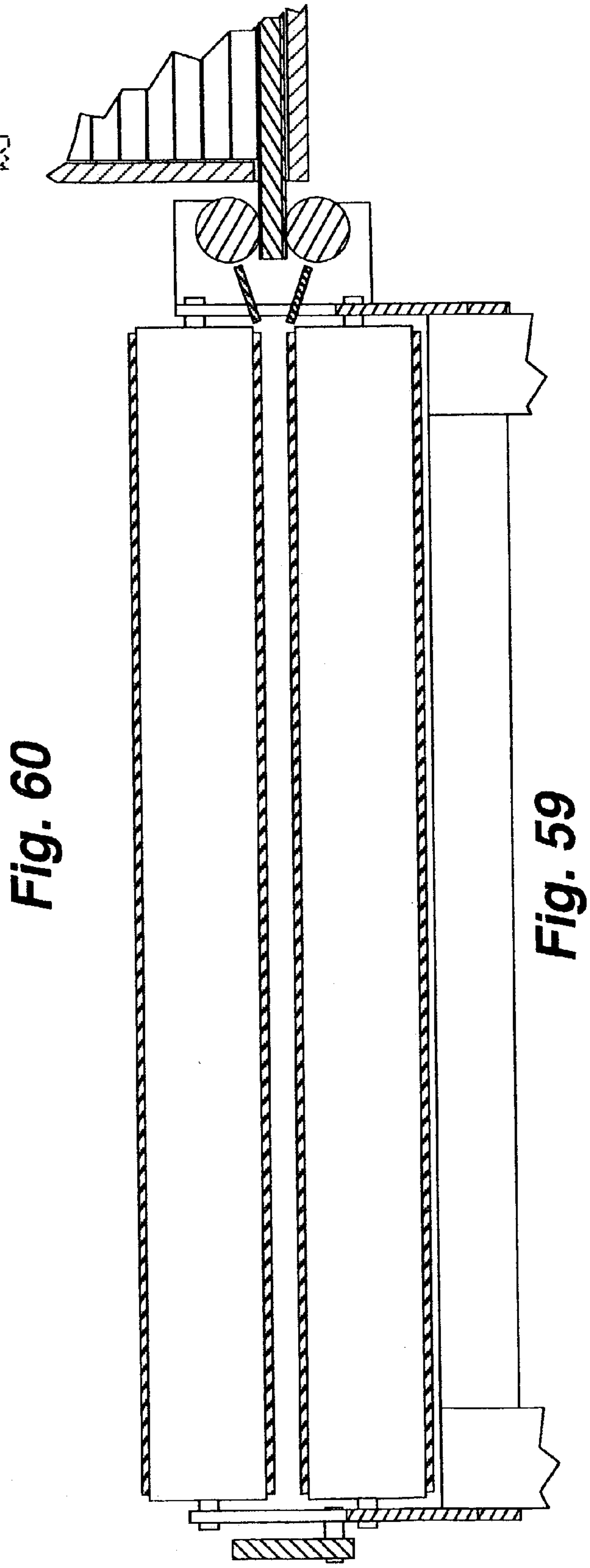
FIG. 59 is an enlarged fragmentary section taken along line 59—59 of FIG. 58.
Figure 59A:
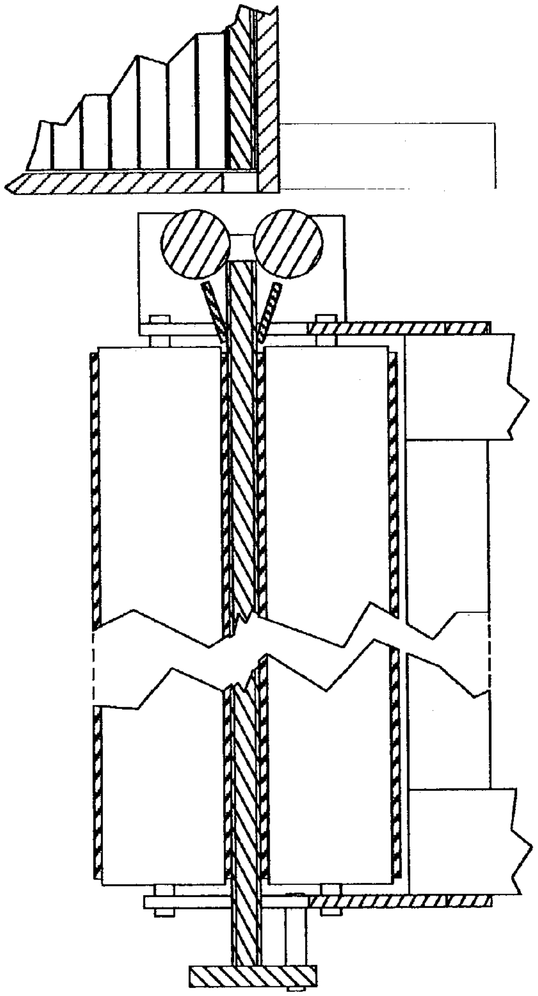
FIG. 59A is an enlarged fragmentary section similar to FIG. 59 with a panel inserted between the pair of belt conveyors.

With reference to FIG. 59A, it will be seen that cut panels 84 emanating from the downstream conveyor 228 are grabbed by a pair of upper and lower driven compression rollers 410 and advanced laterally between the pair 406 of belt conveyors in a direction transverse to the direction of movement of the pair 406 of belt conveyors. The panel is guided into the space between the pair of belt conveyors by a pair of inclined and converging guide bars 412 and the panel engages a stop plate 414 on the opposite side of the pair of belt conveyors to properly position each panel relative to the pair of belt conveyors. The pair of belt conveyors can be intermittently driven in a conventional manner to deliver the panels downstream to the set 408 of driven belt conveyors as needed.

Figure 61:
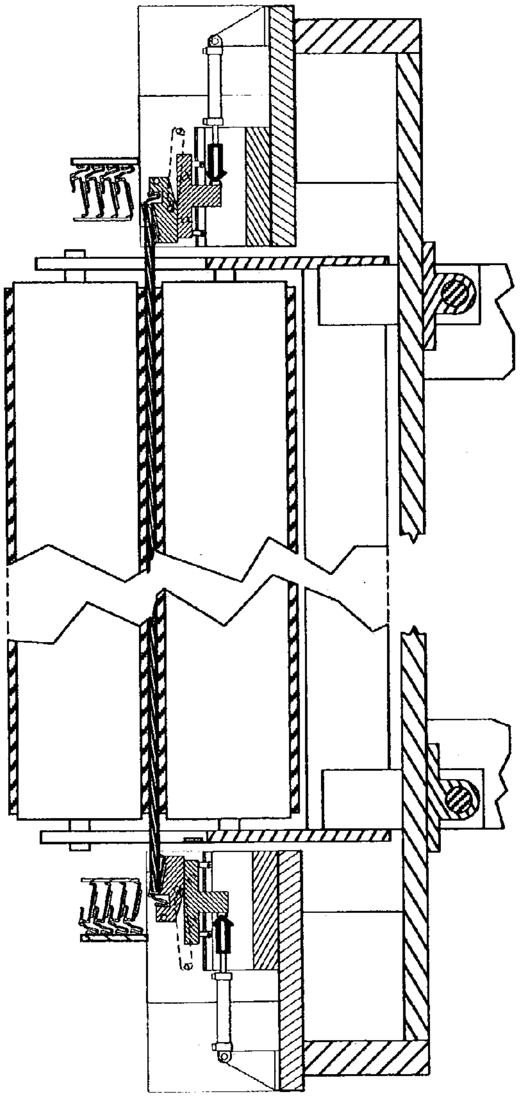
FIG. 61 is an enlarged fragmentary section with parts removed taken along line 61—61 of FIG. 58.

As will be appreciated by comparing FIGS. 59A, which is a section taken through the pair 406 of belt conveyors, and FIG. 61, which is taken through the set 408 of belt conveyors, the panel 84, which is partially compressed, when confined between the pair of belt conveyors is further compressed when introduced to the set of belt conveyors, which are positioned closer to each other. Further, and as mentioned previously, the panels are oriented so that the cellular structures 90 in the panels open at opposite lateral sides of the set of belt conveyors so that the open ends of the cellular structures are confined between the upper 92 and lower 94 sheet materials of the panels and are exposed for the attachment of rigidifying end clips 409. The process for attaching the clips to the ends of the panel is identical to that previously described in connection with the side edge folding station 80 so it will not be described again here. However, it should be appreciated that the mechanism for connecting the side edge clips is mounted in a housing 416 that is adapted to move in a downstream direction in synchronization with the movement of the set 408 of belt conveyors so the clip applicator is moving at the same speed as the panel. In this matter, the clips 409 can be mounted on the ends of a panel as it is being transferred downstream by the set 408 of belt conveyors. The mechanism for synchronizing this movement is conventional in nature and it is not felt necessary to fully describe this mechanism for an understanding of the invention.

After the clips 409 have been applied to the ends of each panel 84, the housing 416 for the edge strip applicator is moved rearwardly or upstream even though the set 408 of belts continue to move the panel downstream so the edge strip applicator housing is properly positioned to apply edge strips to the next succeeding panel as it is delivered to the set of belt conveyors.

Figure 60:
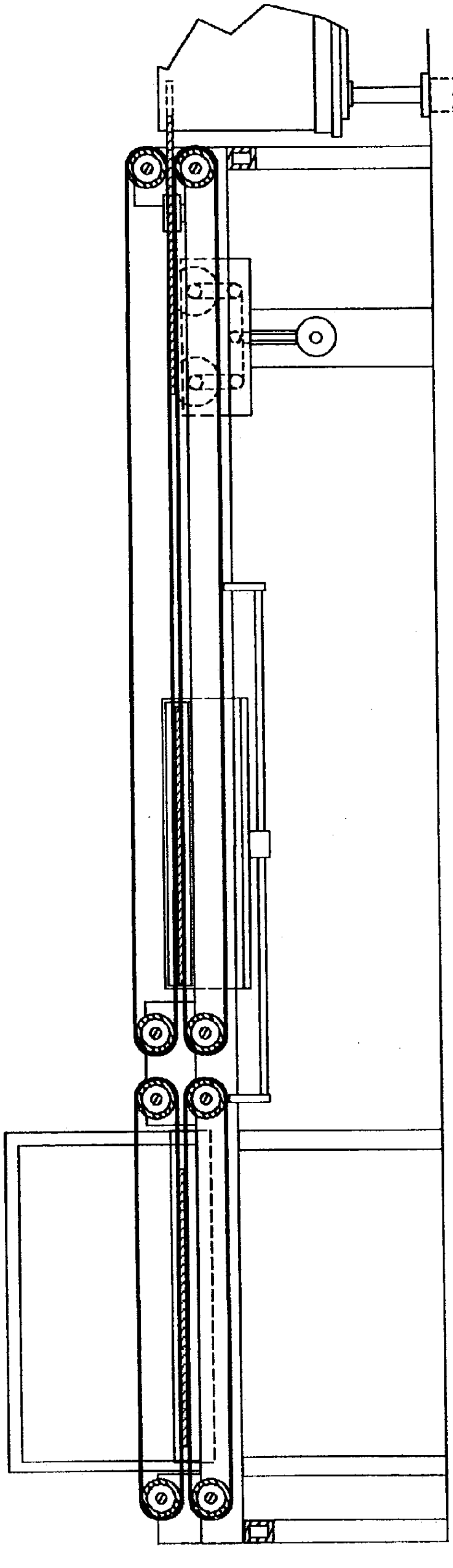
FIG. 60 is an enlarged fragmentary section taken along line 60—60 of FIG. 58.

As is best appreciated in FIG. 60, the set of drive belts includes three belts, an upper belt 418 being one continuous belt, and two longitudinally aligned lower belts 420 that in aggregate extend downstream the same length as the upper belt 418.

Figure 62:
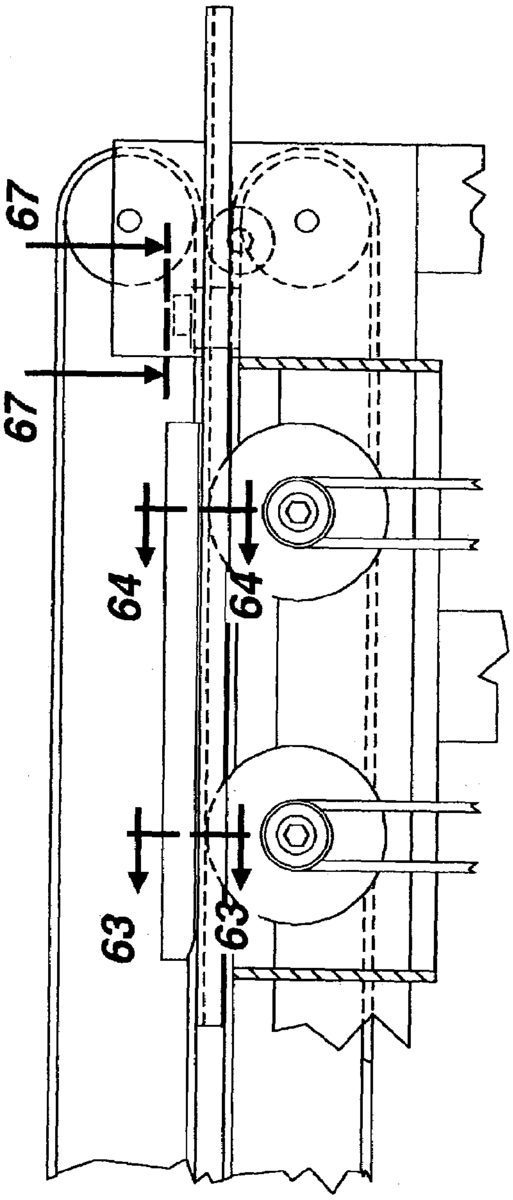
FIG. 62 is an enlarged fragmentary section taken along line 62—62 of FIG. 58.
Figure 65:
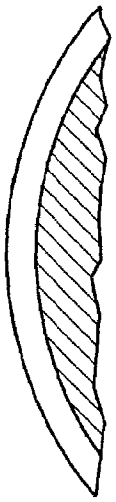
FIG. 65 is a fragmentary section taken along line 65—65 of FIG. 63.
Figure 66:
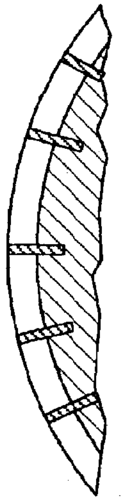
FIG. 66 is a fragmentary section taken along line 66—66 of FIG. 64.
Figure 64:
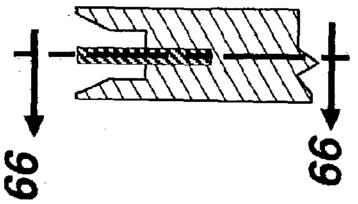
FIG. 64 is an enlarged fragmentary section taken along line 64—64 of FIG. 62.
Figure 63:
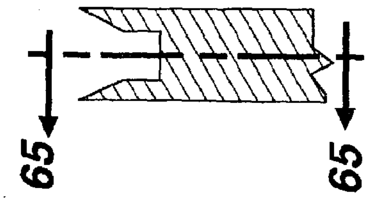
FIG. 63 is an enlarged fragmentary section taken along line 63—63 of FIG. 62.
Figure 67:
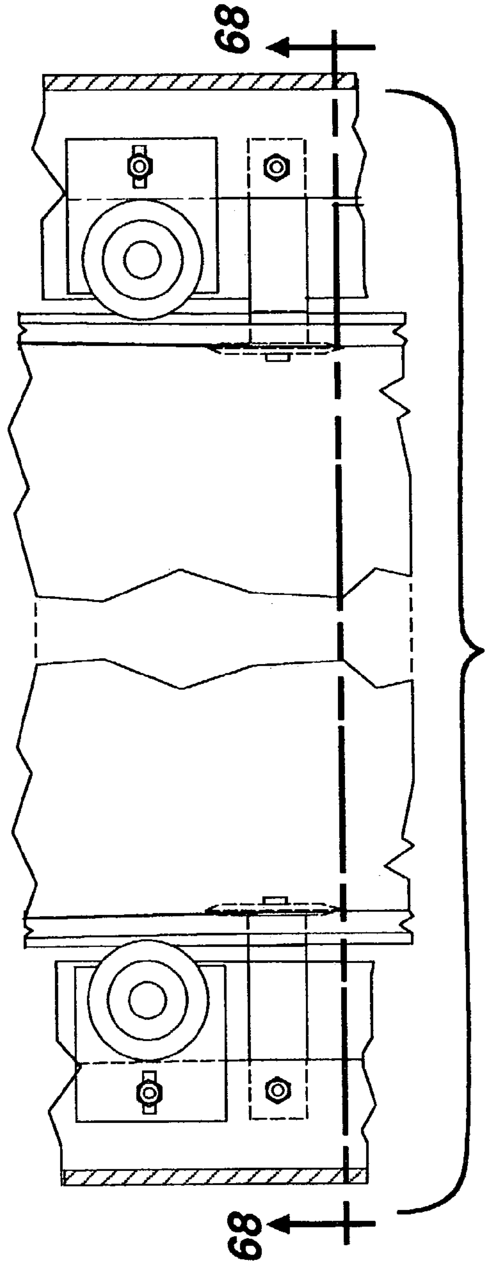
FIG. 67 is an enlarged fragmentary section with parts removed taken along line 67—67 of FIG. 62.
Figure 68:
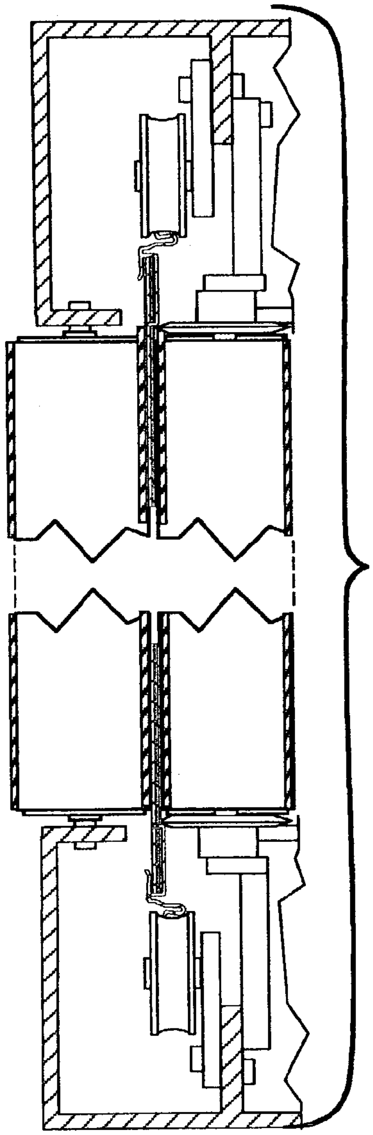
FIG. 68 is a fragmentary section with parts removed taken along line 68—68 of FIG. 67.

After the clips 409 have been placed on the ends of the panels, the notches 324 described previously must be formed in the undersurface of the panel along each end of the panel and adjacent to the clips so the ends of the panel can be folded as desired when the panels are expanded and placed in use. Rather than cutting a notch and cleaning the notch in one operation as previously described, it has been found that the notch can also be formed by cutting the notch with a cutting disk 422 and then cleaning the notch out with a successive notch cleaning disk 424 as shown in FIGS. 62–66. In FIG. 62, it can be appreciated that the panel first engages the cutting disk 422 that has a pair of spaced circumferential cutting edges 426 that cut the side edges of the notch as the panel is advanced over the cutting disk. Of course, the cutting disk is driven at a predetermined speed by a drive belt 428 and a motor (not shown) as with the cutting disk 326 described previously. As the panel progresses further downstream, it engages the notch cleaning disk 424 that is formed similarly to the cutting disk 326 previously described in that it has a pair of circumferential laterally spaced edges 428 but in the space between the edges there are a plurality of radial pins 430 so that as the cleaning disk is rotated, the pins with the cooperation of the spaced circumferential edges 428, clean out the material that was previously cut by the cutting disk 422. The spaced circumferential edges 428 of the cleaning disk do not need to be sharp as are the cutting edges 426 of the cutting disk but are merely provided to support the walls of the notch as it is being cleaned by the pins 430.

The panel 84 with the clips 409 mounted on the ends thereof and a notch 324 formed adjacent thereto to facilitate folding of the clipped ends of the panel, then approaches the downstream end of the set 408 of conveyor belts and adjacent to the end of the set of conveyor belts, the panel is engaged by a creasing disk 432 which forms a crease in the bottom surface of the upper sheet 92 along the edge of the notch to facilitate folding of the clipped ends of the panels.

After the crease is formed in the panels, the panels are ejected from the downstream end of the set 408 of conveyor belts where they are received in a receiver or accumulator at the completion station 344 for subsequent packaging. It will be appreciated that the panels are maintained in a compressed state during the aforedescribed processing and with the clipped ends of the panel projecting horizontally outwardly but in a position where they can be easily folded into abutting relationship with the open ends of the cellular structure of the panel once the panels have been expanded and are ready for use.

Figure 80:
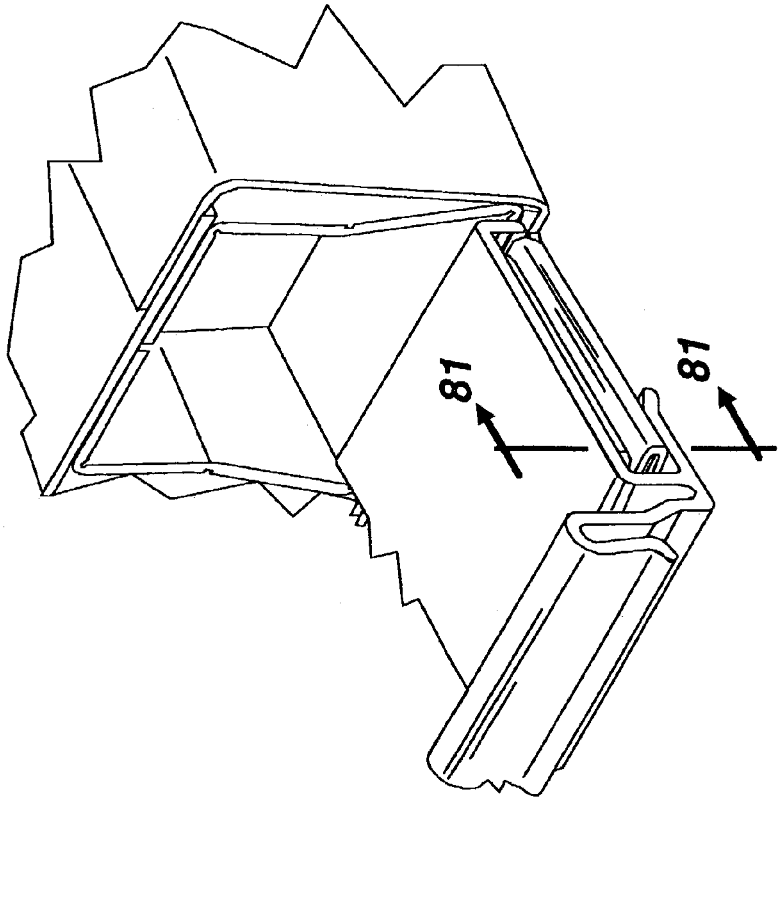
FIG. 80 is a fragmentary diagrammatic view of a corner of a panel formed in accordance with the present invention wherein an edge clip has been applied to the end of panel with the edge clip assembly apparatus shown in FIG. 58.
Figure 81:
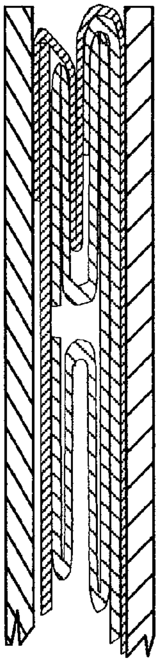
FIG. 81 is an enlarged fragmentary section taken along line 81—81 of FIG. 80.
Figure 82:
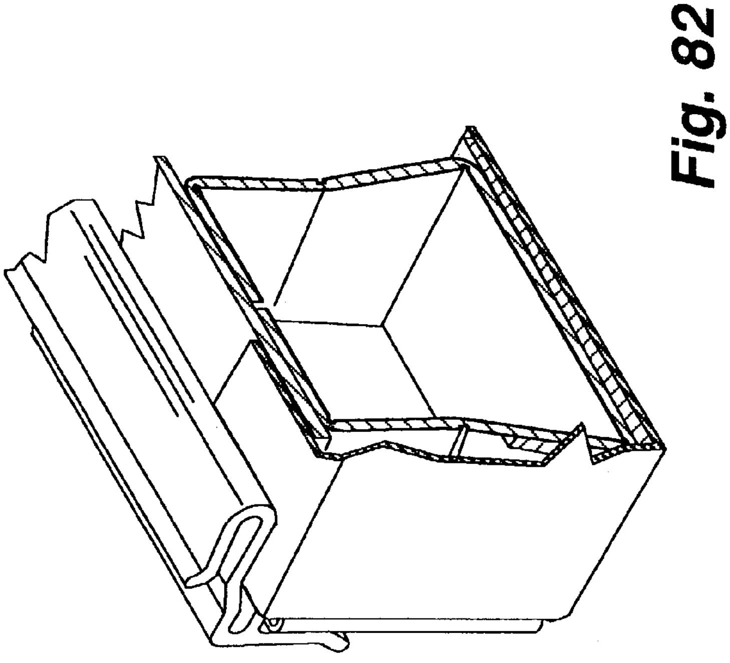
FIG. 82 is a fragmentary isometric showing the edge clip in FIG. 80 folded into engagement with the open end of the panel.

Referring to FIGS. 80–82, the mounting of the edge clip 409 to the end of a panel is illustrated. As will be appreciated, the clip 409 is slightly different than the clip 88 described previously in that the lip 434 is perpendicular to the main body 436 of the clip and the flange on the reverse side of the main body of the clip 88 has been removed.

FIG. 80 shows the clip 409 mounted on the end of a panel 84 that has been fully expanded but prior to the clipped end of the panel being folded into a closed abutting relationship with the end of the panel which is shown in FIG. 82.

FIG. 81 is a section taken from FIG. 80 which shows the compressed elements of the end of the panel being confined within the clip 409 so the edge of the panel is finished with the decorative layer 358 exposed to provide a more pleasing aesthetic look.

Figure 91:
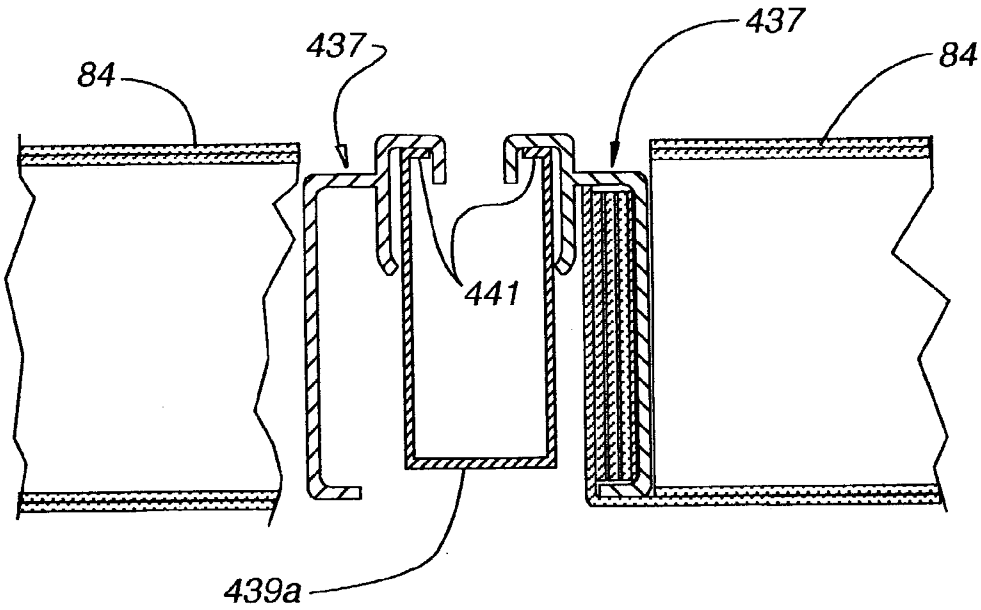
FIG. 91 is a fragmentary vertical section with parts removed illustrating a U-shaped support system and panels with side edge clips for cooperation therewith.
Figure 92:
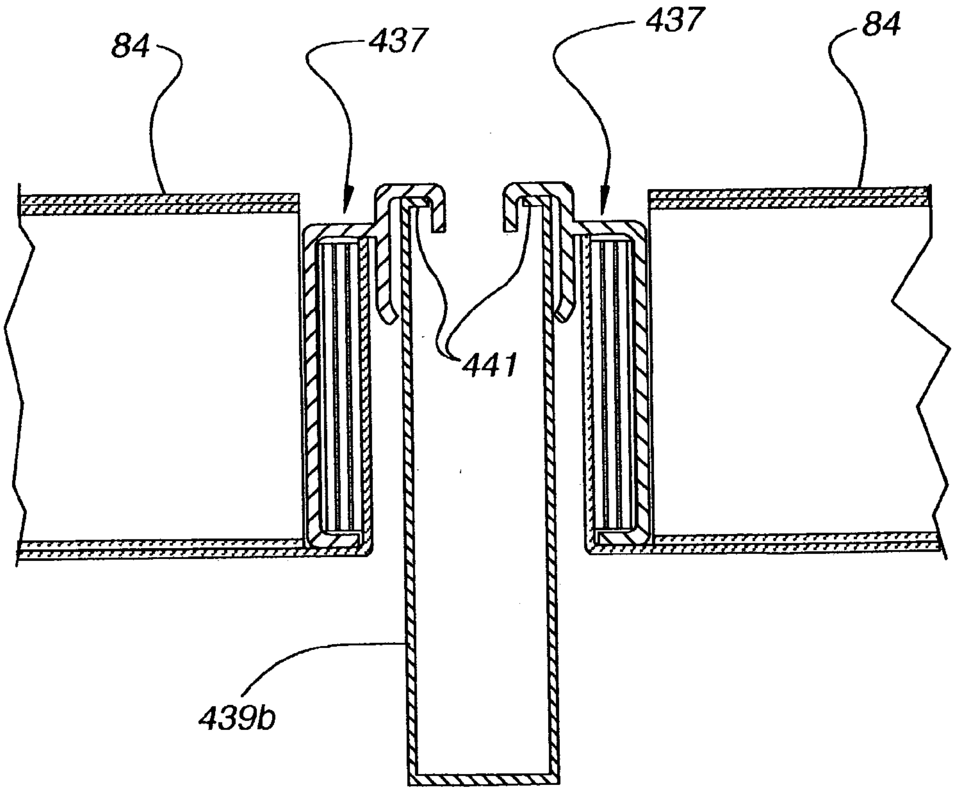
FIG. 92 is a fragmentary vertical section similar to FIG. 109 showing a deeper U-shaped support system.

Since all grid systems for supporting ceiling panels and the like are not inverted T-shaped in transverse cross-section, the edge clip for a panel 84 could have still a different configuration. By reference to FIGS. 91 and 92, a clip 437 is shown that is adapted to support and suspend ceiling panels 84 from a support structure that has support members 439*a* or 439*b* of channel U-shaped cross-section so as to open upwardly. The channel in the support member 439*a* of FIG. 91 is shallower than the channel in the support member 439*b* of FIG. 92 for aesthetic purposes. The channel has a pair of upper edges 441 on which the clips 437 can be releasably received. The clip for such an arrangement is not described herein in detail but is described in the afore-noted co-pending application entitled Compressible Structural Panel filed on even date herewith, which has been incorporated by reference.

With very minor changes to the afore-described apparatus, the clip 437 can be mounted on the side edges of panels 84 in the same manner as previously described.

Figure 83:
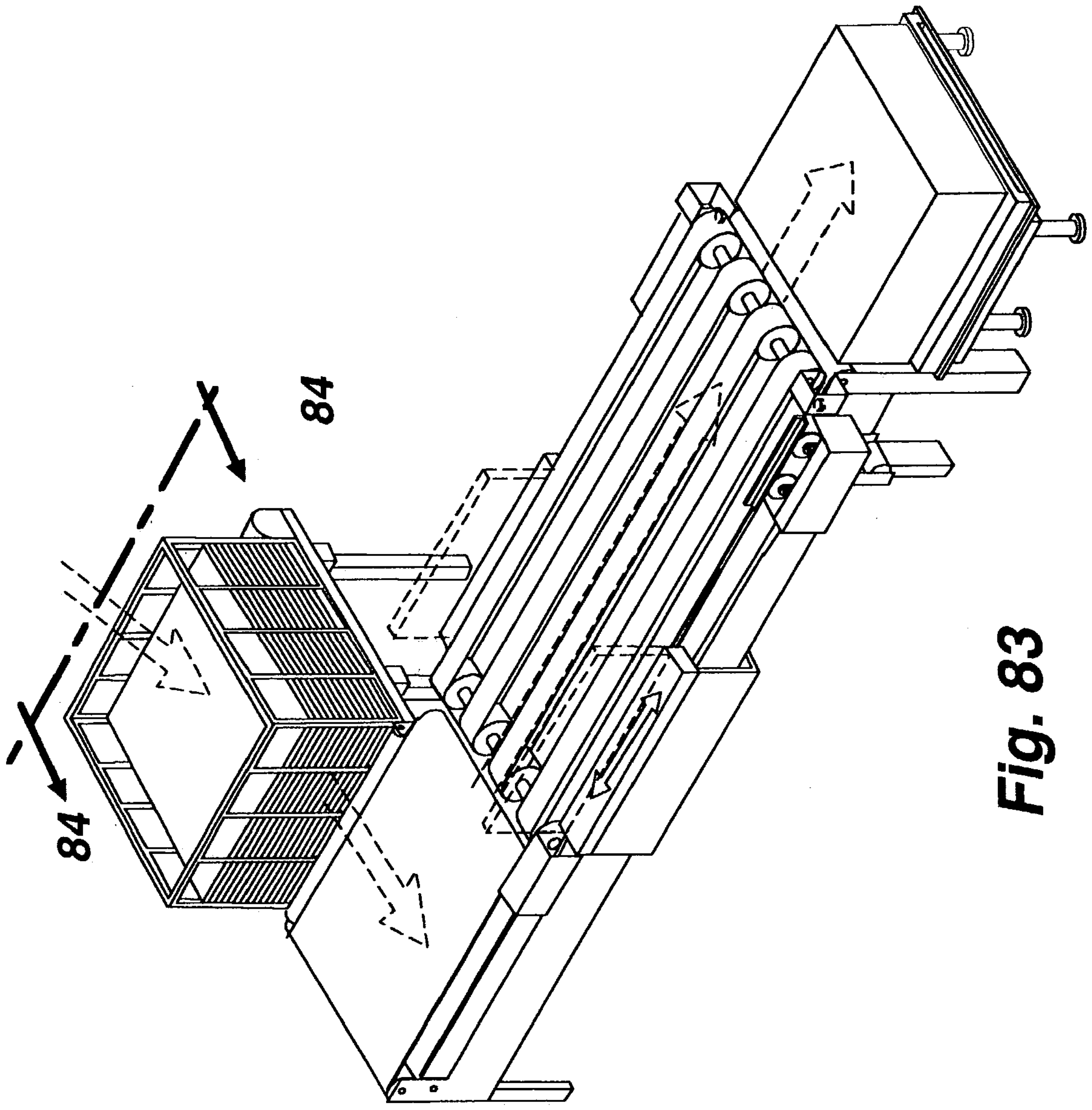
FIG. 83 is an isometric view of another embodiment of the edge clip assembly station.

As mentioned previously, if panels 84 are being formed at a faster rate than the end clips 409 can be attached to the ends of the panels, the panels can be accumulated, for example, in a bin 438 of the type shown in FIG. 83 which will be described in detail later. The bin is of a size to receive panels of a pre-established size so that the panels can accumulate in a vertical stack within the bin. When the end clip attaching station 80 or 404 is free to receive another panel to which end clips are to be attached, a panel is removed from the stack of panels in the bin and advanced between the pair 406 of conveyor belts as mentioned previously for further processing.

Figure 89:
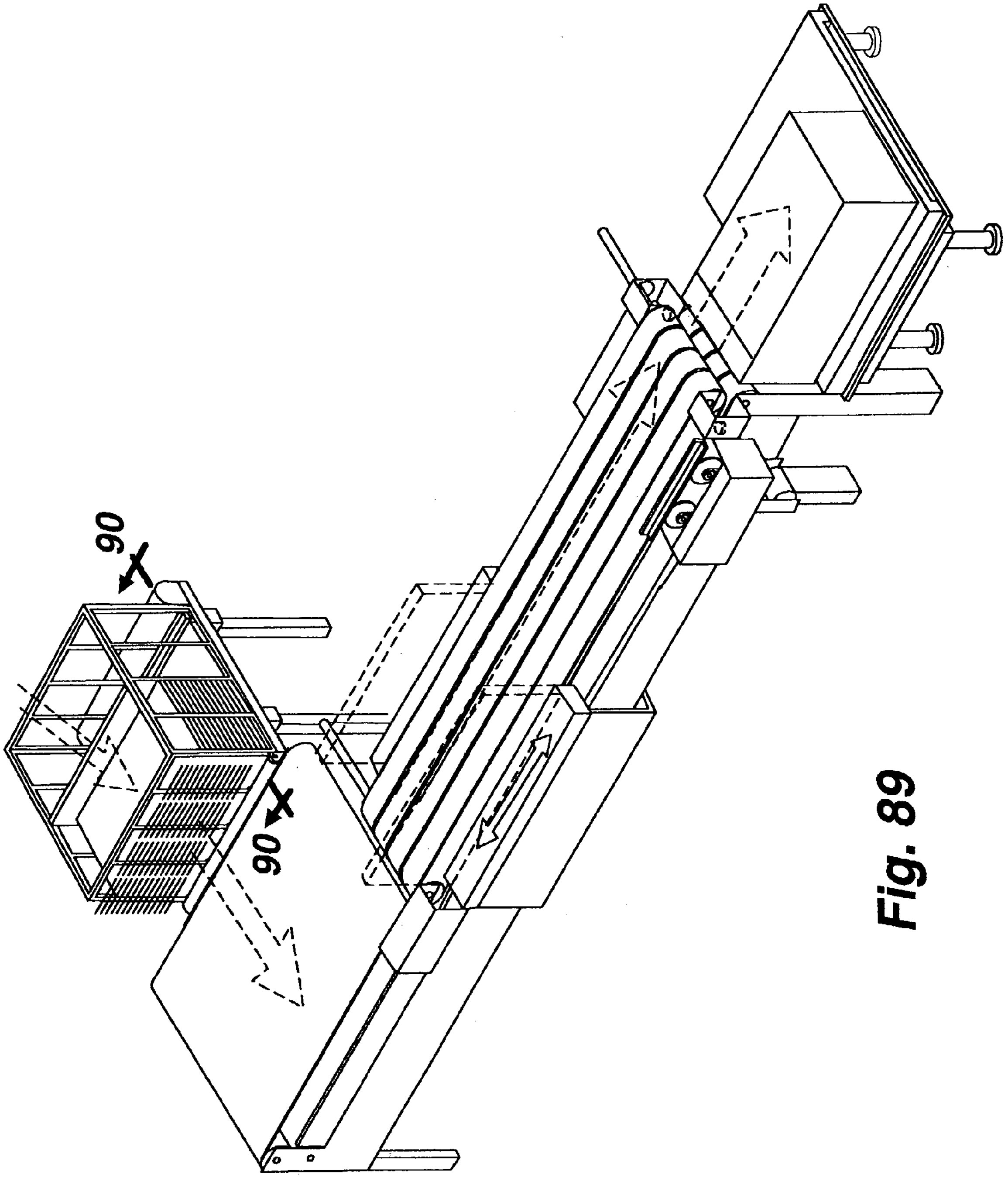
FIG. 89 is a diagrammatic isometric view of the edge clip assembly station shown in FIG. 83 with a set of drive belts having been moved laterally together to accommodate smaller panels.

The set 408 of drive belts may not simply be the three belts described previously, but rather each drive belt might be a group of side-by-side strip belts 440 which are mounted for transverse adjustable movement relative to each other to vary the effective width of the set 442 of strip belts so this system of belts is adapted to accommodate panels of different widths. When panels are of the type illustrated in FIG. 83, for example, the strip belts 440 are spaced laterally so that they desirably support the panel substantially from one end of the panel to the other with a slight panel overlap at opposite ends of the panel to accommodate the mounting of clips 409 on the panel as described previously. However, if the panels are of a smaller size such as illustrated in FIG. 89, and as will be further described later, the strip belts 440 can be moved laterally closer together to reduce the width of the set 442 of strip belts so as to desirably support the smaller panels again with a slight panel overlap along the ends of the panel so that the clip 409 can be mounted as described previously.

Figure 84:
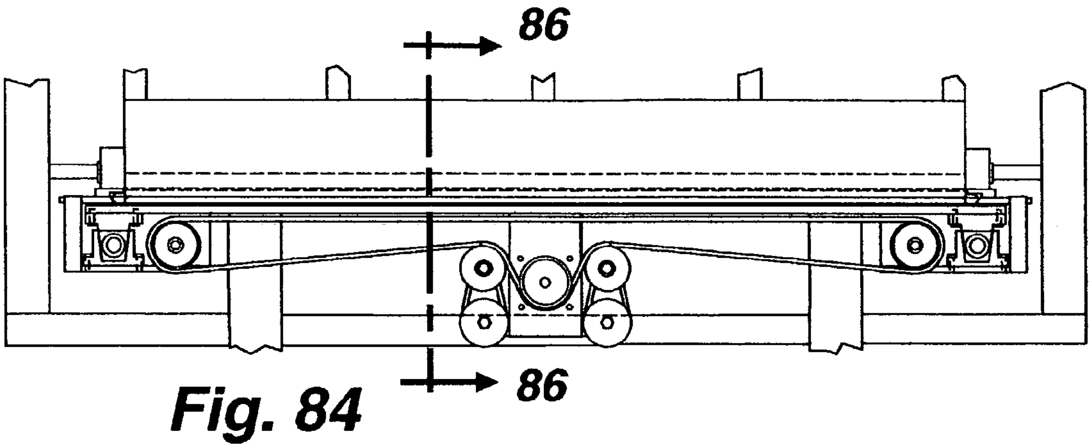
FIG. 84 is an enlarged fragmentary view taken along line 84—84 of FIG. 83.
Figure 85:
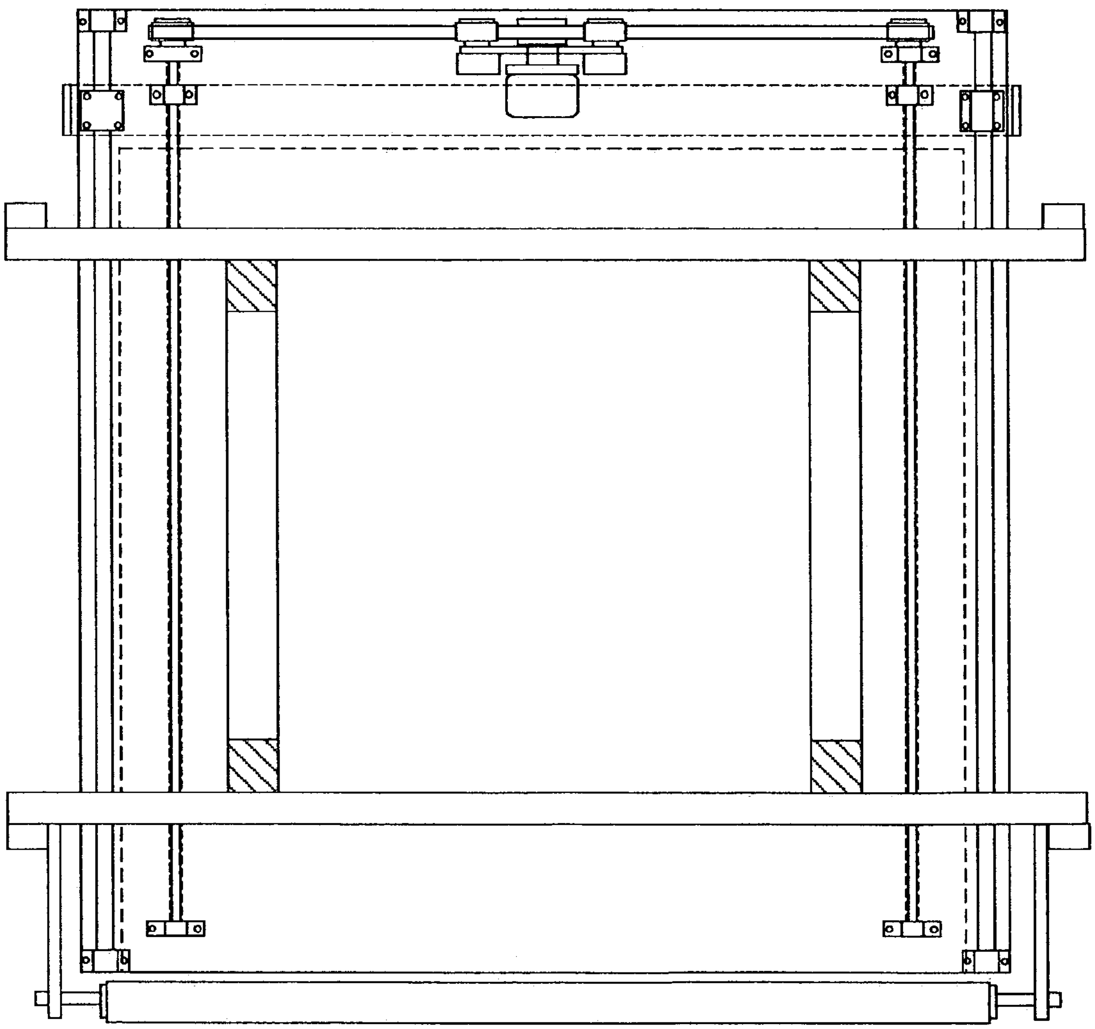
FIG. 85 is a bottom plan view of the bin shown in FIG. 83 for accumulating and distributing panels one at a time to the edge clip assembly station.
Figure 86:
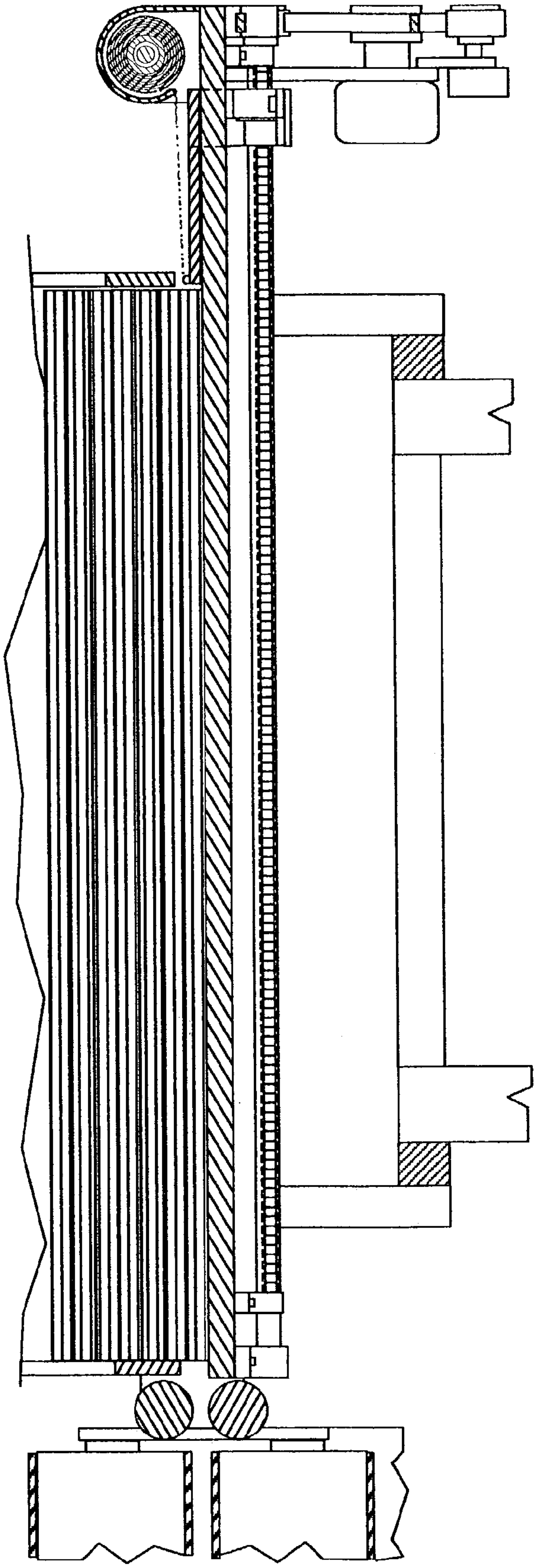
FIG. 86 is an enlarged section taken along line 86—86 of FIG. 84.

As is seen best in FIGS. 84–86, individual panels are selectively removed from the bin 438 by removing the lowermost panel 84 of a stack of panels in the bin and ultimately advancing the panel downstream between the pair 406 of conveyor belts in the edge strip applicator station. In order to remove one panel at a time from the bottom of a stack of panels, it will be appreciated from FIGS. 84–86 that a delivery system is provided in association with the bin which includes a pusher bar or plate 444 (FIG. 86) that is mounted on a sliding framework 446. The pusher bar is in turn reciprocally movable by a pair of threaded drive rods 448 such that rotation of the drive rods advances the pusher plate downstream to push the lowermost panel in the stack between the pair 406 of conveyor belts. The pusher bar can then be retracted by reversing the direction of rotation of the threaded drive rods 448 until the pusher bar is again positioned as illustrated in FIG. 86. This operation will be described in more detail hereafter.

As best seen in FIGS. 84 and 86, the threaded drive rods 448 are rotated by a belt system 450 that includes a timing belt 452 that engages timing wheels 454 at the upstream end of the threaded rods with the timing belt being driven by a motor 456 having a timing pulley 458 thereon and wherein a pair of tensioning pulleys 460 engage the timing belt to maintain the desired tension for predictable and reliable movement of the timing belt and the threaded drive rods. As can be appreciated by reference to FIG. 84, movement of the timing pulley 458 in a clockwise direction as viewed in FIG. 84 causes the drive rod wheels 454 to also rotate in a clockwise direction which, for example, might cause the pusher plate to move in a downstream direction. Of course, reversing the direction of movement of the timing pulley 458 causes a reverse rotational movement of the drive rods causing the pusher plate to return. The pusher plate is mounted on a bracket 462 that depends along each side of a support platform 464 for the panels and beneath that platform the bracket system carries a follower or block 466 at opposite ends of the bracket that includes mating threads to the drive rods so that rotational movement of the drive rods causes the threaded block to move along the length of the associated threaded drive rod. The bracket further includes pillow blocks 468 that receive an unthreaded guide rod 470 with the pillow blocks merely sliding along the guide rod and wherein there is a pillow block at opposite sides of the support platform on the sliding bracket. The guide rods, of course, are mounted beneath the support platform along opposite lateral sides thereof. In FIG. 85, structural framework 472 for supporting the support platform as well as the bin and the other operating components are shown.

Figure 87:
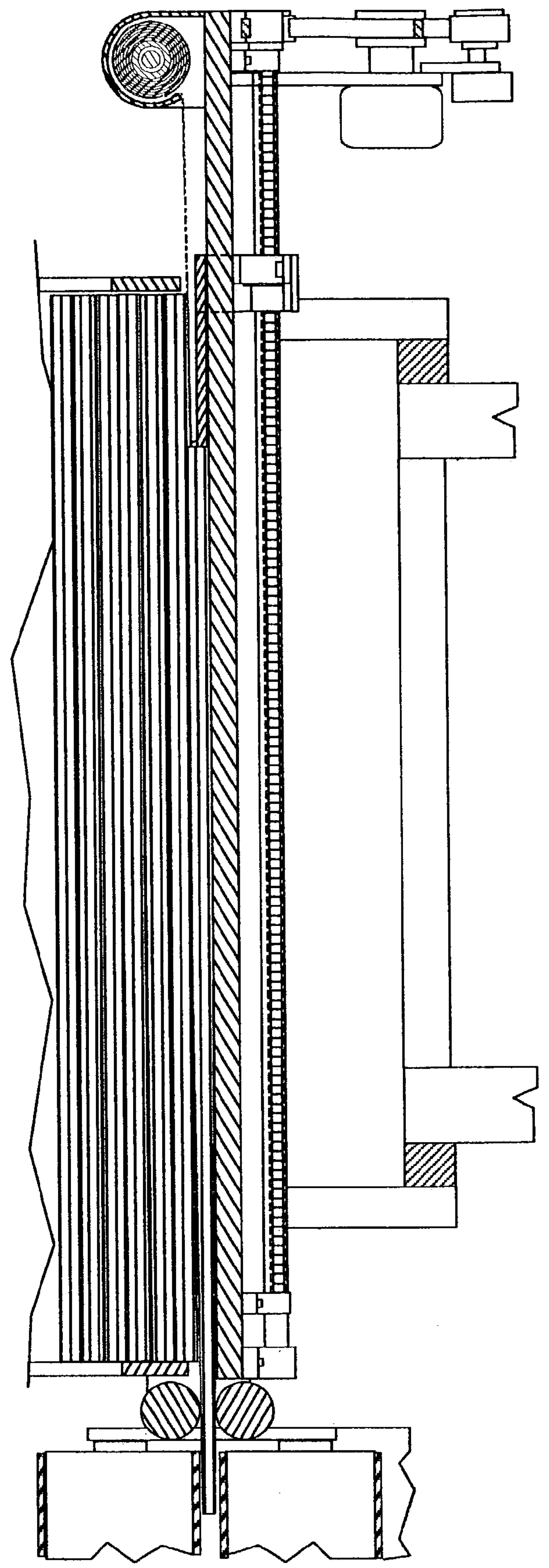
FIG. 87 is a section similar to FIG. 86 with the lowermost panel in the bin having been advanced slightly to the left.
Figure 88:
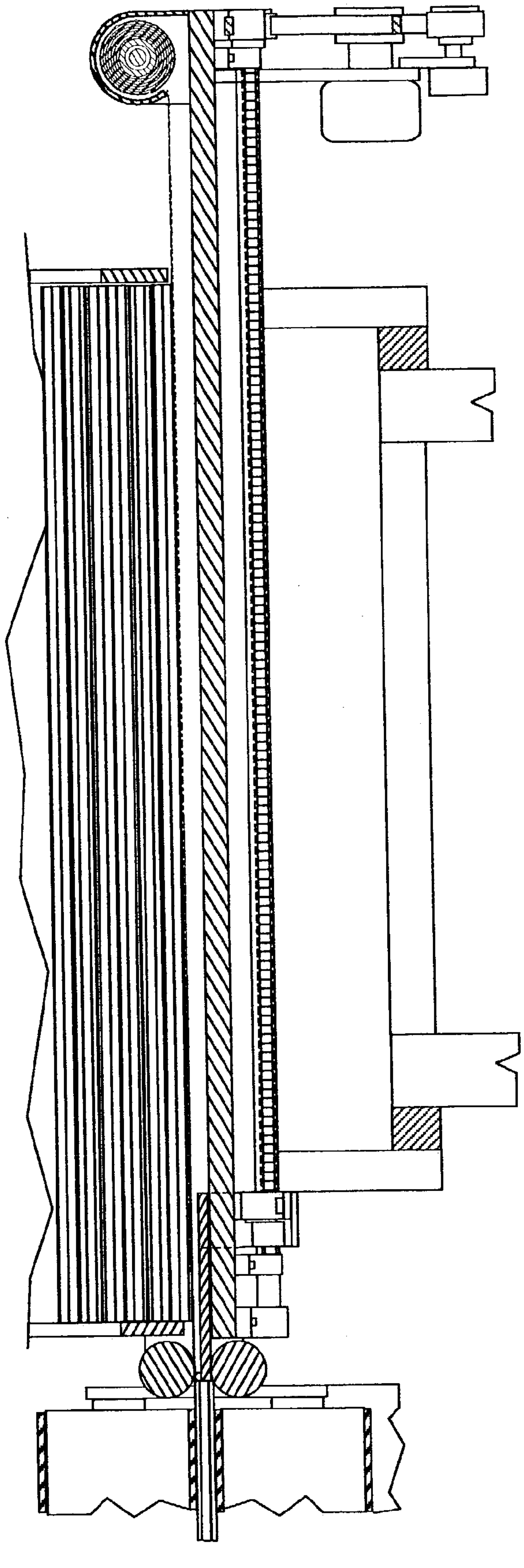
FIG. 88 is a section similar to FIG. 86 and 87 with the lowermost panel in the bin having been fully advanced into the edge clip applicator station.

In operation, as probably best seen in FIGS. 86–88, the pusher plate 444 in FIG. 86 is shown in a fully retracted position with its leading edge being attached to the leading edge of a roll of flexible fabric material 474 which is utilized to support the stack of panels during a removal operation. The roll of fabric material is mounted on a spring-biased roller 476 at the upstream end of the support platform 464 with the roller being biased toward a retracted position but wherein the bias on the roller can be overcome by movement of the pusher plate in a downstream direction. As the pusher plate is retracted, however, the fabric is recoiled onto the roller.

When it is time to advance a panel 84 from the bin 438 into the pair 406 of belt conveyors, the motor 456 is energized rotating the drive rods 448 in a clockwise direction, for example, which causes the threaded blocks 466 at the opposite ends of the brackets to move downstream and moving with them the bracket 462 on which they are supported and the pusher plate 444. The pusher plate, which is thinner from top to bottom than the individual panels in the stack of panels, engages the upstream end of the lowermost panel and pushes the panel in a downstream direction between the pair of compression rollers 410, which compress the panel to the desired thickness for delivery between the pair 406 of belt conveyors. By referencing FIG. 87, it will be seen that the pusher plate has begun pushing the lowermost panel into the space between the pair 406 of belt conveyors and in FIG. 88, the panel has been fully advanced into position between the pair of belt conveyors and against the abutment or stop plate 414 (not seen) that was described previously. At this point in time, the direction of the motor is reversed causing the pusher plate and its associated bracket to retract back to the position illustrated in FIG. 86. In FIG. 88, it will be appreciated that the flexible fabric 474 is supporting the remaining stack of panels in the bin giving the slide plate room to retract without frictionally engaging the lowermost panel.

Figure 90:
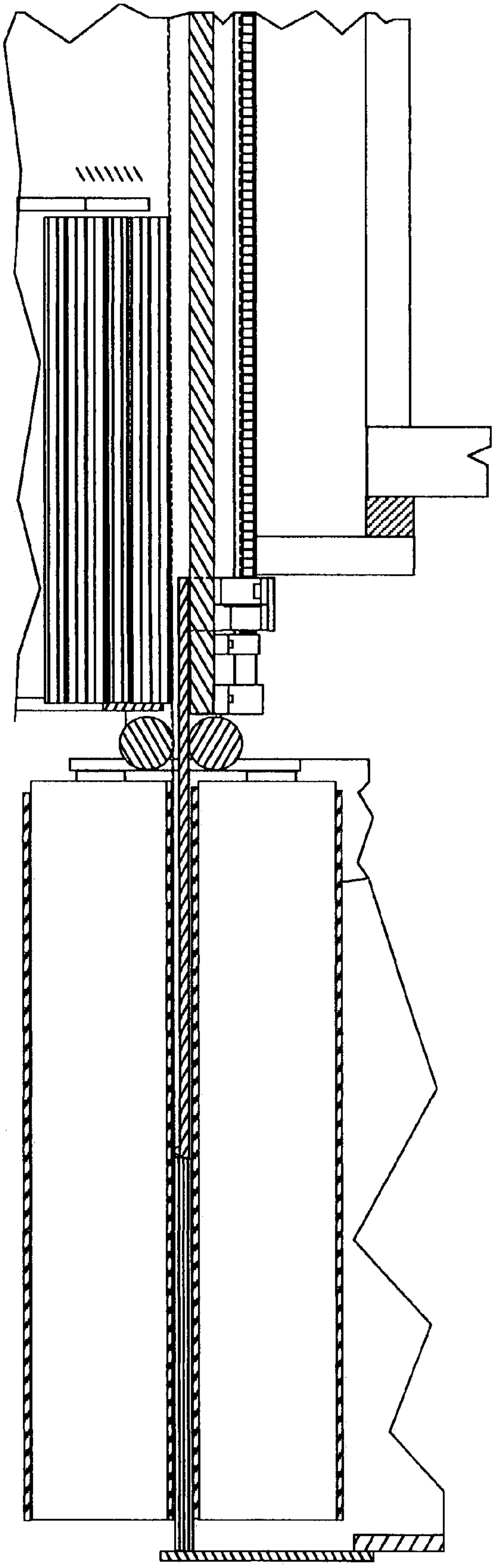
FIG. 90 is a section taken along line 90—90 of FIG. 89 with a small panel having been fully inserted into the edge clip assembly station.

FIG. 89, as mentioned previously, illustrates the system when used with panels 478 of a smaller dimension than those shown in FIGS. 83–88 and, as will be appreciated, the panels 478 are neatly stacked within the bin 438 that has received a vertical divider 480 to form a compartment in the bin of a size to receive and neatly stack panels being delivered thereto. When dealing with panels of this smaller size, a pusher plate 482, as seen in FIG. 90, is provided with a larger dimension so that when fully retracted, the downstream edge of the pusher plate is positioned adjacent to the upstream end of the lowermost panels 478 in a desired position for engaging the panel. Movement of the pusher plate in a downstream direction as described previously, causes the downstream end of the pusher plate to push the panel into the space between the pair 406 of belt conveyors until the panel engages the stop plate 414 so that it is desirably positioned for further processing in receiving clips on its opposite ends.

As mentioned previously, and as seen in FIG. 89, the strip belts 440 for the set 408 of conveyor belts which receive the panels 478 from the pair 406 of belt conveyors have been laterally moved together so that in aggregate they are of a desired width for processing the smaller panels in a manner such that the panels can overlap opposite sides of the strip belts for receiving clips 409 in the manner described previously.

It will be appreciated from the above that methods and apparatus for forming compressible structural panels of the type described in the aforenoted pending application entitled Compressible Structural Panel have been described which are accomplished in a single machine and in a reliable manner so that panels of predetermined size and configuration can be manufactured in a continuous operation and with a finish appropriate for use in building structures.

Although the present invention has been described with a certain degree of particularity, it is understood that the present disclosure has been made by way of example, and changes in detail or structure may be made without departing from the spirit of the invention as defined in the appended claims.

What is claimed is:

1. A method of making a compressible cellular laminate that is biased to expand when compressed, said cellular laminate having opposed sheet materials separated by resilient, compressible cellular structures such that said cellular laminate can be compressed by moving one of said opposed sheet materials perpendicularly toward the other sheet material with no translative movement of the sheet materials, comprising the steps of:

providing a laminate station, providing a plurality of strips of flexible material positioned in side-by-side parallel relationship for downstream movement along a path of travel toward said laminating station; providing two supplies of sheet materials adjacent to said path of travel, advancing said plurality of strips of material in a downstream direction, providing a folding system for engagement with said strips into a cellular material, said folding system progressively folding each of said strips into a cellular structure having an open side and a closed side, said cellular structures being resilient, compressible, and biased to expand when compressed, confining each of said cellular structures in at least a partially compressed condition until they reach said laminating station, feeding said sheet materials into engagement with the open and closed sides of said side-by-side expandable at least partially compressed cellular structures at said laminating station and securing said sheet materials to said structures at said laminating station to form a laminate having elongated side-by-side cellular structures secured to said sheet materials.

2. The method of claim 1 further including the step of maintaining said structures in said at least partially compressed condition while in said laminating station.

3. The method of claim 1 further including rollers progressively folding each of said strips into a cellular structure.

4. The method of claim 3 wherein at least some of said rollers have axes of rotation which are perpendicular to each other.

5. The method of claim 1 wherein said cellular structures are confined in at least a partially compressed condition with rollers on opposite sides of said cellular structures.

6. The method of claim 5 wherein said rollers extend transverse to said cellular structures and said path of travel.

* * * * *